(12) United States Patent
Puzio et al.

(10) Patent No.: US 8,381,830 B2
(45) Date of Patent: Feb. 26, 2013

(54) POWER TOOL WITH INTEGRATED BIT RETENTION DEVICE

(75) Inventors: Daniel Puzio, Baltimore, MD (US); Aris C. Cleanthous, Baltimore, MD (US); Daniel L. Krout, Abingdon, MD (US); Robert G. Kusmierski, York, PA (US)

(73) Assignee: Black & Decker Inc., Newark, DE (US)

( * ) Notice: Subject to any disclaimer, the term of this patent is extended or adjusted under 35 U.S.C. 154(b) by 273 days.

(21) Appl. No.: 12/769,981

(22) Filed: Apr. 29, 2010

(65) Prior Publication Data

US 2010/0282485 A1 Nov. 11, 2010

Related U.S. Application Data

(60) Provisional application No. 61/175,583, filed on May 5, 2009.

(51) Int. Cl.
  *B23B 31/10* (2006.01)
  *B25F 5/00* (2006.01)

(52) U.S. Cl. ............ 173/29; 173/48; 173/132; 173/217; 279/22; 279/75; 408/240

(58) Field of Classification Search .............. 173/20, 173/29, 178, 48, 217, 131, 132, 170, 171, 173/47; 279/22, 30, 75, 905, 107, 82, 4.04, 279/19.4; 408/240
  See application file for complete search history.

(56) References Cited

U.S. PATENT DOCUMENTS

| | | |
|---|---|---|
| 1,119,276 A | 12/1914 | Griffith et al. |
| 1,124,981 A | 1/1915 | Weaver |
| 1,138,465 A | 5/1915 | Fegley et al. |
| 1,656,450 A | 1/1928 | Steuer |
| 1,860,998 A | 5/1932 | Drazick |
| 2,348,611 A | 5/1944 | Davidson |
| 2,409,899 A | 10/1946 | Resina |
| 3,019,027 A | 1/1962 | Klein et al. |
| 3,398,965 A | 8/1968 | Cox |
| 3,436,086 A | 4/1969 | Glenzer |
| 3,599,765 A | 8/1971 | Turner, III et al. |
| 3,726,533 A | 4/1973 | Lafferty, Sr. |
| 3,732,026 A * | 5/1973 | Peters ................... 408/124 |
| 3,767,218 A | 10/1973 | Linthicum et al. |
| 3,788,658 A | 1/1974 | Benjamin et al. |
| 3,929,343 A | 12/1975 | Wanner et al. |
| 4,002,348 A | 1/1977 | Johnson |

(Continued)

FOREIGN PATENT DOCUMENTS

DE 1789996 6/1959
DE 1161817 1/1964

(Continued)

*Primary Examiner* — Scott A. Smith
(74) *Attorney, Agent, or Firm* — Harness, Dickey & Pierce, P.L.C.

(57) ABSTRACT

A power tool having a housing, an electric motor disposed in the housing, and a spindle drivingly attached to the electric motor. The spindle includes a cavity adapted for receiving a bit therein and a window extending through the spindle in communication with the cavity. The power tool further has a retention device including a bit engaging member disposed within the housing and operable to extend through the window and retain a bit within the cavity. The power tool still further has an actuator operable by a user externally of the housing to disengage the bit engaging member from a bit received in the cavity and, finally, a mechanical interconnection system operably coupled between the actuator and the retention device to actuate the retention device in response to the actuator, wherein the mechanical interconnection is disposed within the housing.

25 Claims, 36 Drawing Sheets

U.S. PATENT DOCUMENTS

| | | | |
|---|---|---|---|
| 4,068,559 A | 1/1978 | Schmid, Jr. et al. | |
| 4,131,165 A | 12/1978 | Wanner et al. | |
| 4,184,692 A | 1/1980 | Benson et al. | |
| 4,309,042 A | 1/1982 | Fauth et al. | |
| 4,317,578 A | 3/1982 | Welch | |
| 4,347,753 A | 9/1982 | Claussen et al. | |
| 4,502,824 A | 3/1985 | Dohse et al. | |
| 4,577,875 A | 3/1986 | Miyakawa et al. | |
| 4,588,335 A | 5/1986 | Pearson, Jr. | |
| 4,629,375 A | 12/1986 | Lieser | |
| 4,669,932 A | 6/1987 | Hartley | |
| 4,692,073 A | 9/1987 | Martindell | |
| 4,701,083 A | 10/1987 | Deutschenbaur et al. | |
| 4,793,053 A | 12/1988 | Zuccaro et al. | |
| 4,824,298 A | 4/1989 | Lippacher et al. | |
| 4,858,939 A | 8/1989 | Riggs | |
| 5,000,631 A | 3/1991 | Deutschenbaur et al. | |
| 5,013,194 A | 5/1991 | Wienhold | |
| 5,062,749 A | 11/1991 | Sheets | |
| 5,188,378 A | 2/1993 | Erlenkeuser | |
| 5,284,069 A | 2/1994 | Wellman | |
| 5,398,946 A | 3/1995 | Quiring | |
| 5,447,397 A | 9/1995 | Asano | |
| 5,584,689 A * | 12/1996 | Loge | 433/128 |
| 5,709,391 A | 1/1998 | Arakawa et al. | |
| 5,709,393 A | 1/1998 | von Keudell et al. | |
| 5,934,384 A | 8/1999 | Wang | |
| 5,951,024 A | 9/1999 | Montjoy et al. | |
| 5,951,026 A | 9/1999 | Harman, Jr. et al. | |
| 5,984,596 A | 11/1999 | Fehrle et al. | |
| 5,996,452 A | 12/1999 | Chiang | |
| 5,997,225 A | 12/1999 | Young et al. | |
| 6,053,675 A | 4/2000 | Holland et al. | |
| 6,074,140 A | 6/2000 | Cook | |
| 6,079,716 A | 6/2000 | Harman, Jr. et al. | |
| 6,126,370 A | 10/2000 | Wheeler et al. | |
| 6,135,462 A | 10/2000 | Robison | |
| 6,179,300 B1 * | 1/2001 | Baumann et al. | 279/19.4 |
| 6,193,242 B1 | 2/2001 | Robison | |
| 6,199,872 B1 | 3/2001 | Hasan | |
| 6,224,303 B1 | 5/2001 | Wheeler et al. | |
| 6,234,491 B1 | 5/2001 | Wheeler | |
| 6,261,035 B1 | 7/2001 | Moores, Jr. et al. | |
| 6,270,085 B1 | 8/2001 | Chen et al. | |
| 6,293,559 B1 | 9/2001 | Harman, Jr. et al. | |
| 6,311,989 B1 * | 11/2001 | Rosanwo | 279/75 |
| 6,325,393 B1 | 12/2001 | Chen et al. | |
| 6,343,901 B2 | 2/2002 | Wheeler et al. | |
| 6,354,177 B2 | 3/2002 | Peters | |
| 6,364,033 B1 * | 4/2002 | Hung et al. | 173/217 |
| 6,382,636 B1 | 5/2002 | Walker | |
| 6,390,739 B1 | 5/2002 | O'Banion | |
| 6,457,916 B2 | 10/2002 | Wienhold | |
| 6,464,234 B2 | 10/2002 | Frauhammer et al. | |
| 6,474,656 B1 | 11/2002 | Thomas | |
| 6,520,050 B1 | 2/2003 | Gildroy | |
| 6,543,959 B1 | 4/2003 | Jore | |
| 6,622,597 B2 | 9/2003 | Chen | |
| 6,637,755 B2 | 10/2003 | Chen et al. | |
| 6,651,990 B2 | 11/2003 | Higasi et al. | |
| 6,666,114 B1 | 12/2003 | Lin | |
| 6,688,610 B2 | 2/2004 | Huggins et al. | |
| 6,695,321 B2 | 2/2004 | Bedi et al. | |
| 6,722,667 B2 | 4/2004 | Cantlon | |
| 6,755,423 B2 | 6/2004 | Chiu | |
| 6,786,685 B2 * | 9/2004 | Schaub et al. | 408/240 |
| 6,834,864 B2 | 12/2004 | Girardeau | |
| 6,860,489 B2 | 3/2005 | Chen | |
| 6,863,280 B2 | 3/2005 | Chiu | |
| 6,902,358 B2 | 6/2005 | Thomas | |
| 6,929,266 B2 | 8/2005 | Peters et al. | |
| 6,973,858 B2 | 12/2005 | Huang | |
| 6,986,517 B2 | 1/2006 | Lin | |
| 7,063,332 B2 | 6/2006 | Muller | |
| 7,086,813 B1 | 8/2006 | Boyle et al. | |
| 7,111,530 B2 | 9/2006 | Huang | |
| 7,121,774 B2 | 10/2006 | Hirt et al. | |
| 7,156,187 B1 * | 1/2007 | Townsan | 173/1 |
| 7,159,493 B1 | 1/2007 | Huang | |
| 7,222,862 B2 | 5/2007 | Buchholz et al. | |
| 7,250,023 B2 | 7/2007 | Bai | |
| 7,287,449 B2 | 10/2007 | Abel et al. | |
| 7,290,470 B1 | 11/2007 | Peters | |
| 7,306,396 B1 | 12/2007 | Chen | |
| 7,308,948 B2 | 12/2007 | Furuta | |
| 7,316,404 B1 | 1/2008 | Walker | |
| 7,380,612 B2 | 6/2008 | Furuta | |
| 7,380,613 B2 | 6/2008 | Furuta | |
| 7,387,054 B2 | 6/2008 | Rajotte | |
| 7,424,841 B2 | 9/2008 | Liu | |
| 7,500,811 B2 * | 3/2009 | Pfob | 408/56 |
| 7,503,734 B2 | 3/2009 | Puzio | |
| 7,597,155 B2 | 10/2009 | Ullrich et al. | |
| 7,654,779 B2 | 2/2010 | Sasaki et al. | |
| 7,810,817 B1 | 10/2010 | Gao | |
| 7,918,286 B2 * | 4/2011 | Nagasaka et al. | 173/93 |
| 2001/0033777 A1 | 10/2001 | Peters | |
| 2003/0057661 A1 | 3/2003 | Thomas | |
| 2003/0230862 A1 | 12/2003 | Peters et al. | |
| 2004/0013488 A1 | 1/2004 | Schaub et al. | |
| 2004/0094909 A1 | 5/2004 | Chiu | |
| 2005/0036844 A1 | 2/2005 | Hirt et al. | |
| 2006/0048613 A1 | 3/2006 | Abel et al. | |
| 2006/0097464 A1 | 5/2006 | Strauch et al. | |
| 2006/0111723 A1 | 5/2006 | Chapolini et al. | |
| 2007/0152408 A1 | 7/2007 | Peters | |
| 2007/0204730 A1 | 9/2007 | Rajotte | |
| 2008/0072718 A1 | 3/2008 | Liu | |
| 2008/0184852 A1 | 8/2008 | Peters | |
| 2008/0184854 A1 | 8/2008 | Peters | |
| 2009/0008886 A1 | 1/2009 | Shu | |
| 2010/0282485 A1 | 11/2010 | Puzio et al. | |
| 2010/0308547 A1 | 12/2010 | Fukinuki et al. | |

FOREIGN PATENT DOCUMENTS

| | | |
|---|---|---|
| DE | 2117628 A1 | 10/1972 |
| DE | 2629472 | 1/1978 |
| DE | 2934428 | 3/1981 |
| DE | 3243389 | 5/1984 |
| DE | 3324756 | 1/1985 |
| DE | 4210911 A1 | 10/1993 |
| DE | 4243650 | 6/1994 |
| DE | 4403906 A1 | 9/1994 |
| DE | 4427933 A1 | 11/1995 |
| DE | 19932369 | 1/2001 |
| DE | 20106986 | 9/2001 |
| DE | 10105406 A1 | 8/2002 |
| DE | 10219418 A1 | 11/2003 |
| DE | 202008011435 U1 | 1/2009 |
| DE | 202008015046 U1 | 3/2009 |
| DE | 102007048822 A1 | 4/2009 |
| DE | 202009001905 U1 | 7/2009 |
| DE | 202009009115 U1 | 11/2009 |
| DE | 202009017128 U1 | 3/2010 |
| EP | 0134975 | 3/1985 |
| EP | 0175088 A1 | 3/1986 |
| EP | 0325087 A1 | 7/1989 |
| EP | 0462257 | 12/1991 |
| EP | 00959587 A2 | 11/1999 |
| EP | 1043101 A2 | 10/2000 |
| EP | 1123172 A1 | 8/2001 |
| EP | 1218135 A1 | 7/2002 |
| EP | 1369194 A2 | 12/2003 |
| EP | 1375071 A2 | 1/2004 |
| EP | 1409207 A2 | 4/2004 |
| EP | 1557254 A1 | 7/2005 |
| EP | 1671729 A2 | 6/2006 |
| EP | 1690618 | 8/2006 |
| EP | 1803515 A2 | 7/2007 |
| EP | 1880801 A1 | 1/2008 |
| EP | 1897658 A1 | 3/2008 |
| EP | 01913150 A2 | 4/2008 |
| EP | 1955819 A1 | 8/2008 |
| EP | 1955820 A1 | 8/2008 |
| EP | 2067577 A1 | 6/2009 |

| | | | | | | |
|---|---|---|---|---|---|---|
| EP | 2151304 A2 | 2/2010 | | WO | WO-01/64400 A1 | 9/2001 |
| GB | 2275216 A | 8/1994 | | WO | WO-03018263 | 3/2003 |
| JP | 2004106473 A | 4/2004 | | WO | WO-2004028402 A2 | 4/2004 |
| WO | WO-00/00314 A1 | 1/2000 | | | | |
| WO | WO-0115842 A1 | 3/2001 | | * cited by examiner | | |

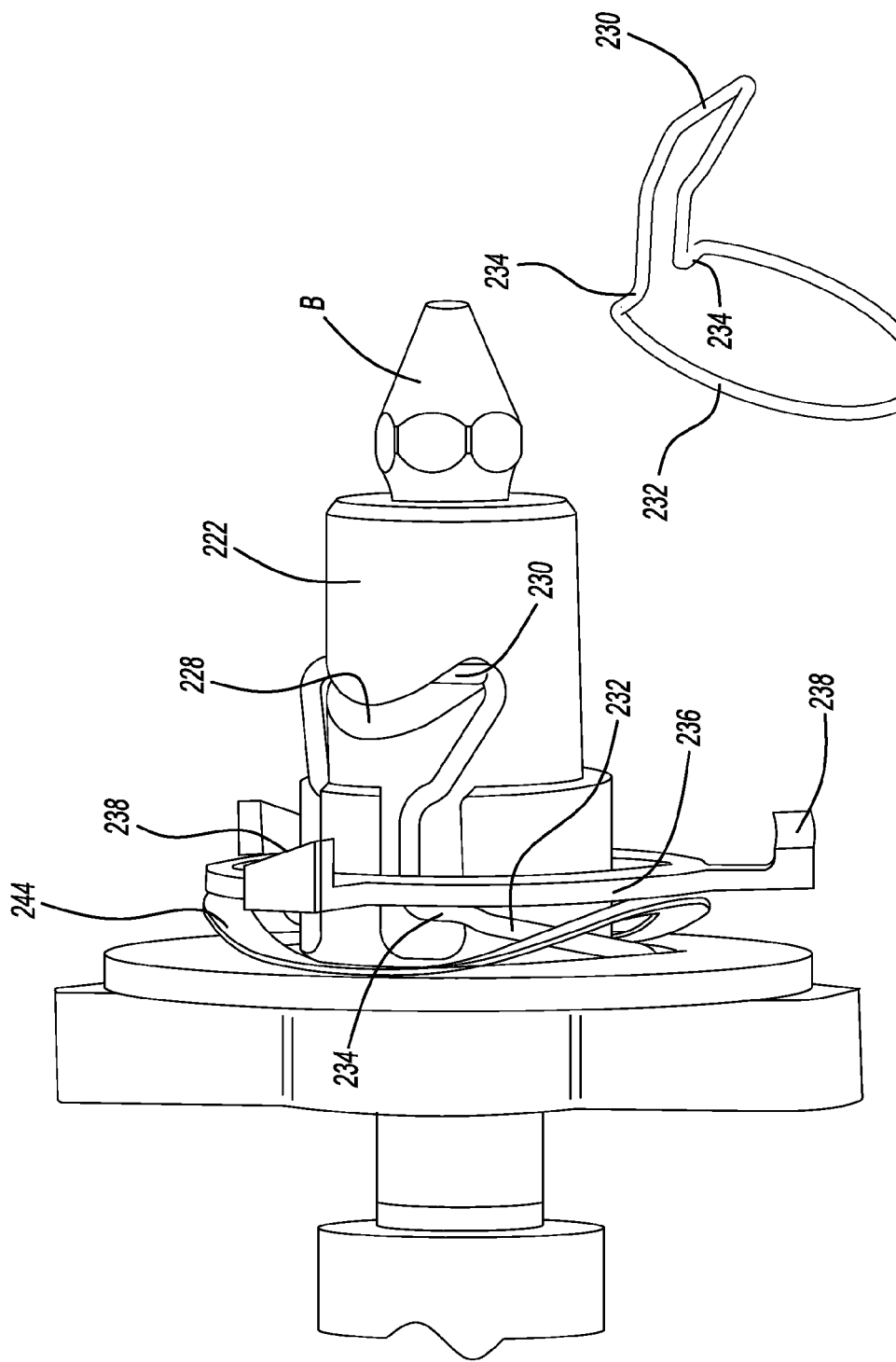

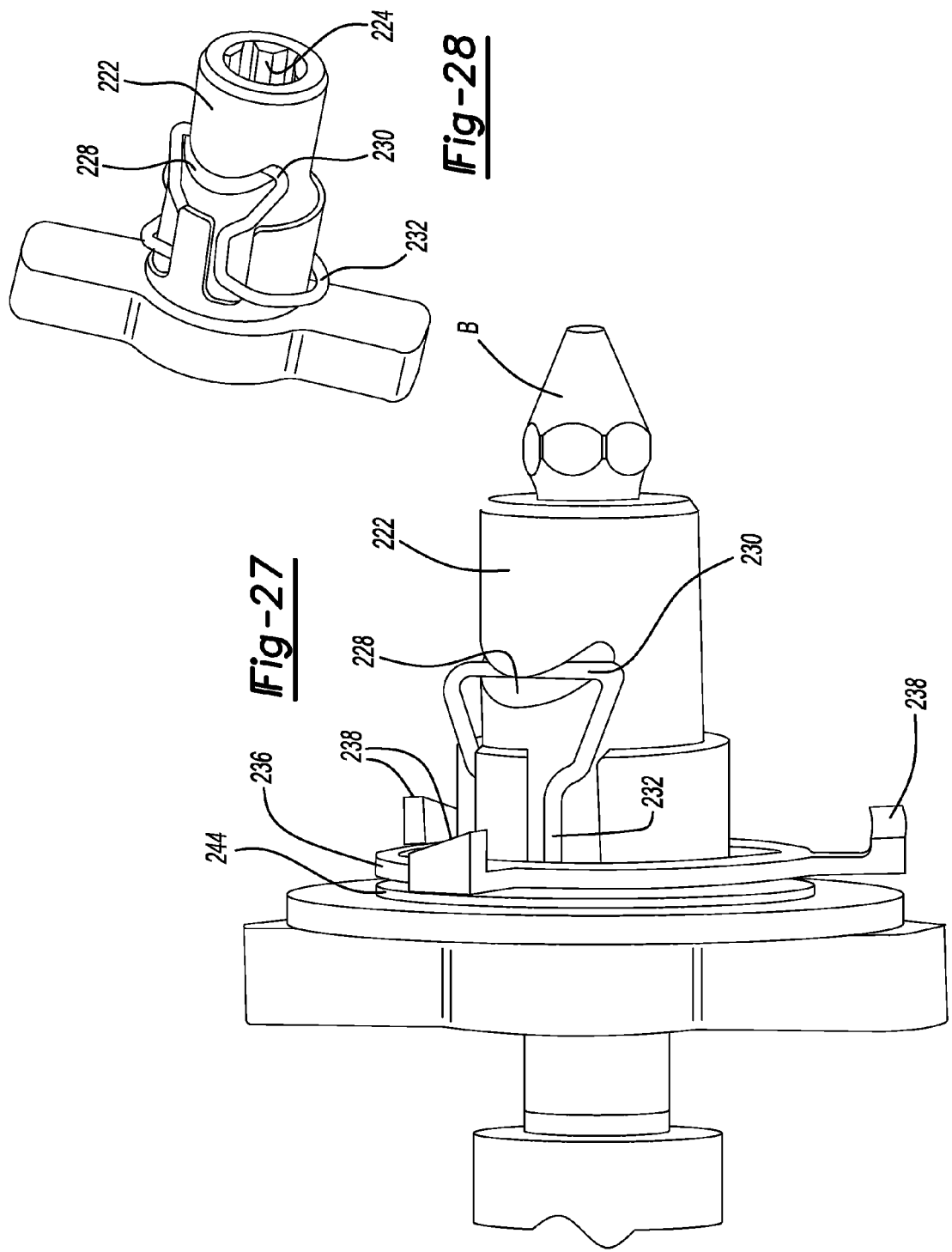

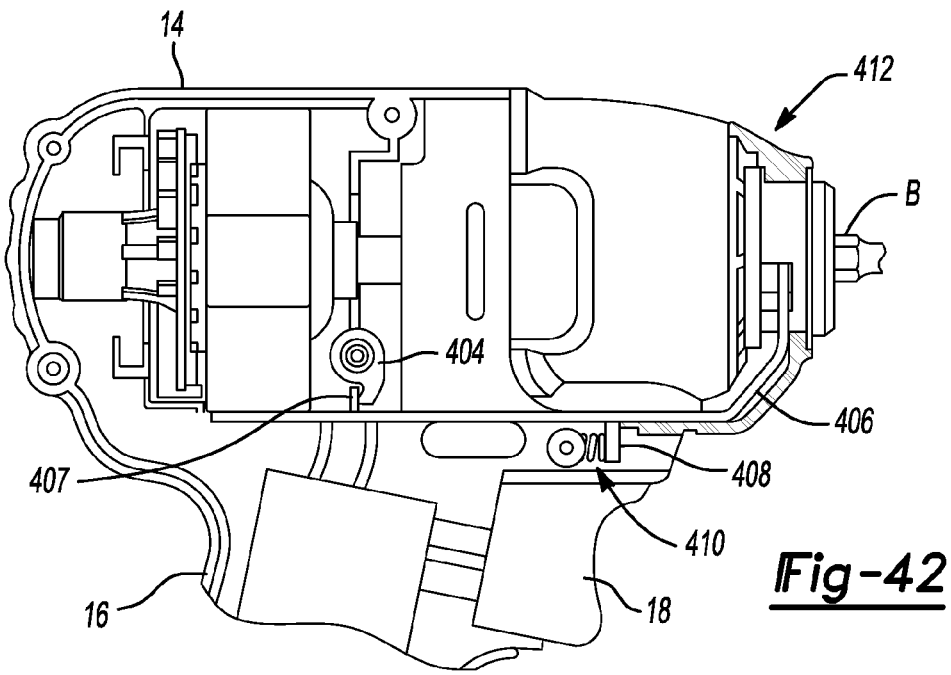
*Fig-42*
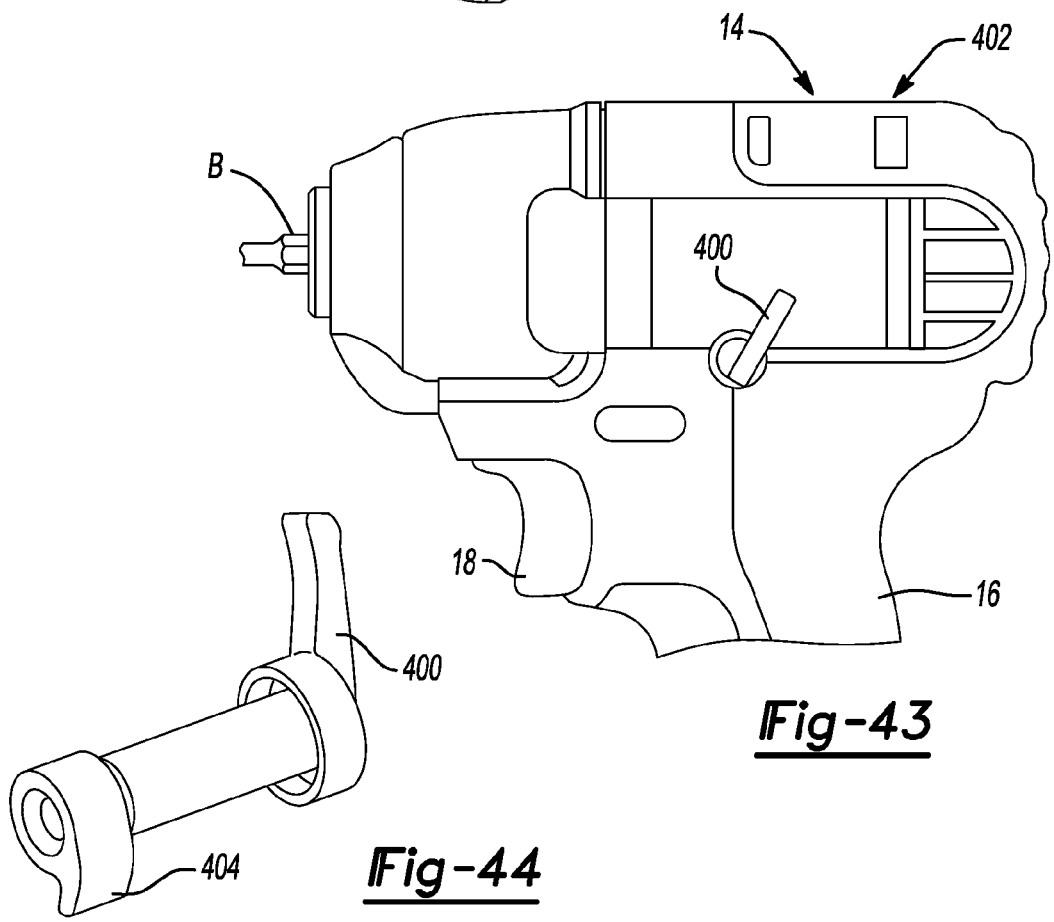
*Fig-43*
*Fig-44*

POWER TOOL WITH INTEGRATED BIT RETENTION DEVICE

CROSS-REFERENCE TO RELATED APPLICATIONS

This application claims the benefit of U.S. Provisional Application No. 61/175,583, filed May 5, 2009. The entire disclosure of the above application is incorporated herein by reference.

FIELD

The present disclosure relates to power tools and more particularly to power tools having an integrated bit retention device configured for rapid and easy insertion and removal of a tool bit from the power tool.

BACKGROUND

This section provides background information related to the present disclosure which is not necessarily prior art.

Removable bit holders for power tools have become increasingly common, especially as the need and desirability of wider versatility in the use of power tools and hand tools has increased. Such removable bit holders are removably mounted to a power tool and allow the power tool to be used with any of a number of interchangeable bits. This, in turn, has resulted in demands for greater speed, convenience and ease of insertion and removal of tool bits from such bit holders.

In one exemplary type of such conventional removable bit holders, one or more detent balls are positioned within a hollow, barrel-shaped tool bit holder body and are resiliently biased into engagement with a circumferentially-extending groove or recess on the shank of the tool bit. Although this basic design has performed well, removable bit holders of this type have been found to be inordinately expensive and difficult to manufacture due to the relatively large number of parts required, as well as frequently requiring the operator to actuate a sleeve, collar or other component part with one hand while using their other hand for the insertion and the removal of the tool bit. The insertion and removal of the tool bit can be cumbersome as the user has to remove their hand from the hand grip of the tool to manipulate the sleeve and insert or remove the tool bit while also holding onto the power tool.

The use of removable bit holders for power tools also undesirably increases the length of the power tool, making it more difficult to handle while performing a task and adversely affecting the ability of the user to use/access fasteners and drilling applications in tight spaces.

SUMMARY

This section provides a general summary of the disclosure, and is not a comprehensive disclosure of its full scope or all of its features.

The system of the present disclosure provides an integrated bit retention mechanism for a power tool such as a drill, impact driver or a powered screw driver. The power tool includes a housing or a gear case with an integrated retention assembly for holding a bit with a hex fitting at its proximal end. An actuator device mounted to the tool housing can be operated to release the bit from the retention mechanism. The bit retention mechanism is "drop-in-to-load", meaning that the actuator device does not need to be actuated to the release position in order to load a bit into the holder.

According to one aspect of the present disclosure, a power tool, includes a housing having an electric motor disposed in the housing. A spindle is drivingly attached to the electric motor and has a cavity adapted for receiving a bit therein and a window extending through the spindle in communication with the cavity. A retention device including a bit engaging member is disposed within the housing and operable to extend through the window and retain a bit within the cavity. An actuator is operable by a user externally of the housing to disengage the bit engaging member from a bit received in the cavity.

According to a further aspect of the present disclosure, a power tool includes a housing having a front end. A rotary drive mechanism is disposed within the housing. A spindle is disposed within the housing adjacent the front end and configured to be driven about a spindle axis by the rotary drive mechanism, the spindle including a cavity adapted to receive a bit therein. A bit retention assembly includes a movable bit engaging member configured to retain a bit in the cavity, wherein the bit retention assembly is completely disposed within the housing. An actuator is coupled to the housing and operable by the user to disengage the bit engaging member from a bit received in the cavity.

According to some embodiments, a power tool is provided having a housing; an electric motor disposed in the housing; a spindle drivingly attached to the electric motor, the spindle having a cavity adapted for receiving a bit therein and a window extending through the spindle in communication with the cavity; a retention device including a bit engaging member disposed within the housing and operable to extend through the window and retain a bit within the cavity; an actuator operable by a user externally of the housing to disengage the bit engaging member from a bit received in the cavity; and a mechanical interconnection system operably coupled between the actuator and the retention device to actuate the retention device in response to the actuator, the mechanical interconnection being disposed within the housing.

According to some embodiments, a power tool is provided wherein the actuator includes a nose piece rotatably mounted to the housing and wherein rotation of the nose piece causes disengagement of the bit engaging member from a bit received in the cavity.

According to some embodiments, a power tool is provided wherein the housing includes a hand grip portion, the hand grip portion including a trigger on a forward portion thereof for activating the electric motor, the actuator including a tab disposed adjacent to the trigger and engageable by a user's finger to mechanically disengage the bit engaging member from a bit received in the cavity.

According to some embodiments, a power tool is provided wherein the tab is movable in a rotatable direction relative to the housing.

According to some embodiments, a power tool is provided wherein the tab is movable in an axial direction relative to an axis of the spindle.

According to some embodiments, a power tool is provided wherein the housing includes a hand grip portion, the hand grip portion including a trigger on a forward portion thereof for activating the electric motor, the actuator including a first tab disposed on a first side of the housing and a second tab disposed on a second side of the housing, the first and second tabs each being engageable by a user's finger to disengage the bit engaging member from a bit received in the cavity.

According to some embodiments, a power tool is provided that further comprises a hand grip and a switch coupled to the housing so that the hand grip can be gripped by the user's hand and the switch can be actuated by a user's thumb or finger to activate the electric motor, the actuator being positioned on the housing so that the actuator can be actuated by a user's finger or thumb on the same hand without changing a position of the user's hand on the hand grip.

According to some embodiments, a power tool is provided wherein the bit engaging member includes a clip and the window is an angled slot in the spindle that receives the clip.

According to some embodiments, a power tool is provided wherein the actuator includes an annular ring surrounding the spindle and including a first and a second slot, a shift ring surrounding the annular ring and including a shift wire supported thereon and engaging the first and second slots in the annular ring, the annular ring engaging the bit engaging member and being movable to a disengaged position to allow the bit engaging member to disengage a bit received in the cavity.

According to some embodiments, a power tool is provided wherein the shift ring includes a cam surface thereon for causing axial movement of the shift ring in response to activation of the actuator.

According to some embodiments, a power tool is provided wherein the actuator includes a nose piece rotatably mounted to the housing, the nose piece engaging the cam surface of the shift ring wherein rotation of the nose piece causes axial movement of the shift ring.

According to some embodiments, a power tool is provided wherein the bit engaging member is a ball disposed at least partially within the window and operable to extend through the window and retain the bit within the cavity.

According to some embodiments, a power tool is provided wherein the mechanical interconnection system comprises a moveable sleeve having a stop member, the stop member being engagable with the ball to move the ball into an engaged and a disengaged position relative to the bit.

According to some embodiments, a power tool is provided wherein the stop member has at least one ramping surface urging the ball toward a radially inward direction.

According to some embodiments, a power tool is provided wherein the stop member has an opposing pair of ramping surfaces each separately urging the ball toward a radially inward direction depending upon a size of the bit.

According to some embodiments, a power tool is provided that further comprises a nose cover releasably coupled to the housing; and an LED light assembly mounted between the nose cover and the housing.

According to some embodiments, a power tool is provided that further comprises a front bearing adjacent a front end of the housing, the front bearing supporting the spindle, the retention device being located rearward of the front bearing.

According to some embodiments, a power tool is provided that further comprises a rear bearing rearward of the front bearing, the rear bearing further supporting the spindle, the retention device located frontward of the rear bearing.

According to some embodiments, a power tool is provided having a housing; an electric motor disposed in the housing; a spindle drivingly attached to the electric motor, the spindle having a cavity adapted for receiving a bit therein and a window extending through the spindle in communication with the cavity; a retention device including a bit engaging member disposed within the housing and operable to extend through the window and retain a bit within the cavity; an actuator operable by a user externally of the housing to disengage the bit engaging member from a bit received in the cavity; and a lock-out system selectively inhibiting the operation of the actuator to generally prevent disengagement of the bit from the bit engaging member in a lock-out position and permit disengagement of the bit from the bit engaging member in an unlock position upon actuation of the actuator by the user.

According to some embodiments, a power tool is provided comprising a housing having a front end; a rotary drive mechanism disposed within the housing; a spindle disposed within the housing adjacent the front end and configured to be driven about a spindle axis by the rotary drive mechanism, the spindle including a cavity adapted to receive a bit therein; a front bearing adjacent the front end for supporting the spindle; a bit retention assembly including a bit engaging member configured to extend through an opening in the spindle to retain a bit in the cavity, wherein the bit retention assembly is located rearward of the front bearing; and an actuator system coupled to the housing and operable by the user to disengage the bit engaging member from a bit received in the cavity.

According to some embodiments, a power tool is provided comprising a housing having a front end; a rotary drive mechanism disposed within the housing; a spindle disposed within the housing adjacent the front end and configured to be driven about a spindle axis by the rotary drive mechanism, the spindle including a cavity adapted to receive a bit therein and an opening extending through the spindle in communication with the cavity; a front bearing adjacent the front end for supporting the spindle; a bit retention assembly including a ball disposed at least partially within the opening and configured to extend through the opening to retain a bit in the cavity, the bit retention assembly permitting drop-in type loading, the bit retention assembly being located rearward of the front bearing; an actuator extending from the housing and movable in a direction generally parallel to the spindle axis, the actuator being operable by the user to disengage the bit engaging member from a bit received in the cavity; and a mechanical interconnection system operably coupled between the push-type actuator and the bit retention assembly to actuate the bit retention assembly in response to the push-type actuator, the mechanical interconnection being disposed within the housing and having a moveable sleeve and a stop member extending from the moveable sleeve, the stop member engagable with the ball to selectively move the ball into an engaged position to retain the bit in the cavity, wherein the push-type actuator need not be actuated in order to load a bit into the cavity.

According to some embodiments, a power tool is provided wherein the actuator includes a shift mechanism surrounding the spindle and engaging the bit engaging member and being movable to a disengaged position to allow the bit engaging member to disengage a bit received in the cavity.

According to some embodiments, a power tool is provided wherein the shift mechanism includes a cam surface thereon for causing axial movement of the shift mechanism in response to activation of the actuator, wherein the actuator includes a nose piece rotatably mounted to the housing, the nose piece engaging the cam surface of the shift mechanism wherein rotation of the nose piece causes axial movement of the shift mechanism.

According to some embodiments, a power tool is provided wherein the shift mechanism includes at least one shift wire engaging a helical groove in the housing for causing axial movement of an annular member engaging the bit engaging member in response to activation of the actuator, wherein the actuator includes a nose piece rotatably mounted to the housing, the nose piece engaging the shift wire of the shift mechanism wherein rotation of the nose piece causes axial movement of the annular member to disengage the bit engaging member from a bit received in the cavity.

According to some embodiments, a power tool is provided wherein the bit engaging member includes a clip and the window is an angled slot in the spindle that receives the clip.

According to some embodiments, a power tool is provided wherein the clip includes a bit engaging portion and a spring portion surrounding a portion of the spindle and engaging the shift mechanism and a shoulder portion on the spindle for biasing the bit engaging portion toward an interior of the angled slot.

According to some embodiments, a power tool is provided wherein the window is an angled slot in the spindle and the bit engaging member includes a clip having a bit engaging portion received in the angled slot and a spring portion for biasing the bit engaging portion toward an interior of the angled slot.

According to some embodiments, a power tool is provided wherein the spring portion surrounds a portion of the spindle and engages a shift mechanism and a shoulder portion on the spindle, wherein the shift mechanism is axially movable in response to activation of the actuator to cause the bit engaging portion to disengage a bit received in the cavity.

According to some embodiments, a power tool is provided wherein the bit engaging member includes a pin extending through the window and supported in a slot of a cone member.

According to some embodiments, a power tool is provided wherein the shift mechanism includes at least one shift wire engaging a helical groove in the housing for causing axial movement of the cone member in response to activation of the actuator, wherein the actuator includes a nose piece rotatably mounted to the housing, the nose piece engaging the shift wire of the shift mechanism wherein rotation of the nose piece causes axial movement of the cone member to disengage the bit engaging member from a bit received in the cavity.

According to some embodiments, a power tool is provided wherein the at least one shift wire is supported by a shift ring rotatably supported by the housing.

According to some embodiments, a power tool is provided wherein the shift ring is connected to a torsion spring which is connected to the housing and is rotationally engaged with the nose piece.

According to some embodiments, a power tool is provided that further comprises a nose magnet attached to the power tool at a position forward of the spindle.

According to some embodiments, a power tool is provided that further comprises a lock-out feature selectively preventing or at least inhibiting translation of the actuator when a forward-reverse command button is in a predetermined position to prevent disengagement of bit retention assembly.

According to some embodiments, a power tool is provided wherein the lock-out feature selectively prevents or at least inhibits translation of the actuator when the forward-reverse command button is in a intermediate neutral position.

According to some embodiments, a power tool is provided wherein the lock-out feature selectively prevents or at least inhibits translation of the actuator when the forward-reverse command button is in either the forward drive or reverse drive positions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 26 is a perspective view of components of the bit retention mechanism show in FIG. 22 with the mechanism in an engaged position;

FIG. 26A is a perspective view of a clip spring member according to principles of the present disclosure;

FIG. 27 is a perspective view similar to FIG. 26, illustrating the bit retention mechanism shown in a released position;

FIG. 28 is a perspective view of a spindle and spring clip according to the principles of the present disclosure;

FIG. 42 is a partial cut-away side view of a power tool having an integrated bit retention mechanism according to the fifth embodiment showing the bit retention mechanism in an engaged position;

FIG. 43 is an opposite side view of the power tool shown in FIG. 42 illustrating a thumb lever for actuating the bit mechanism;

FIG. 44 is a perspective view of a thumb lever/cam sub-assembly for use with the power tool of FIG. 42;

Figure 64:
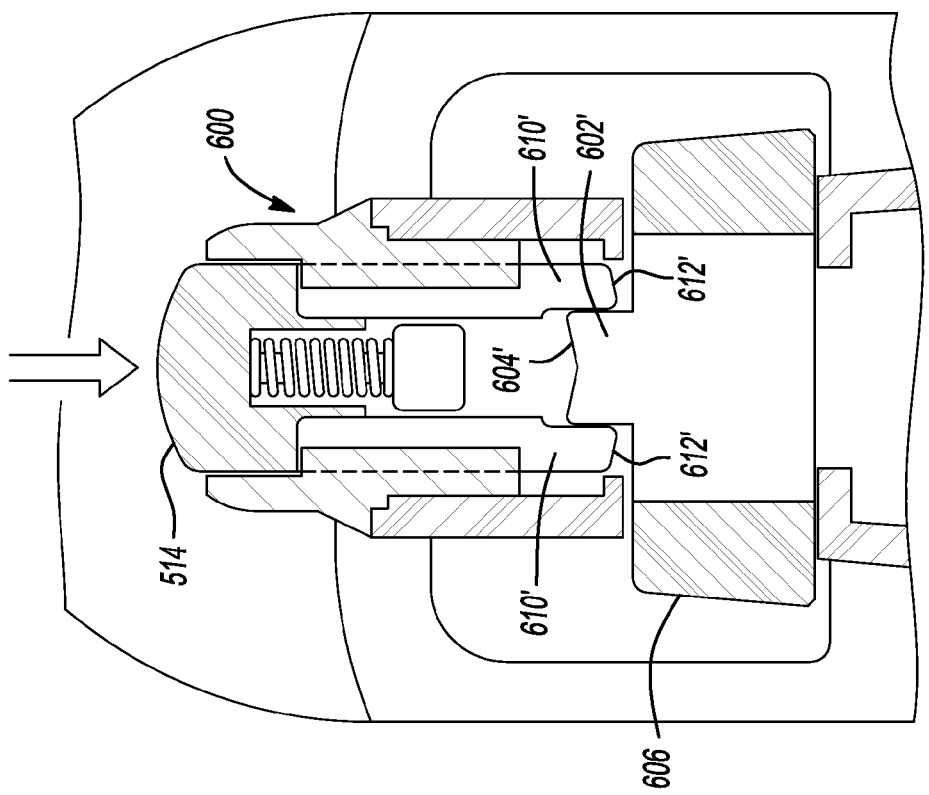
Figure 63:
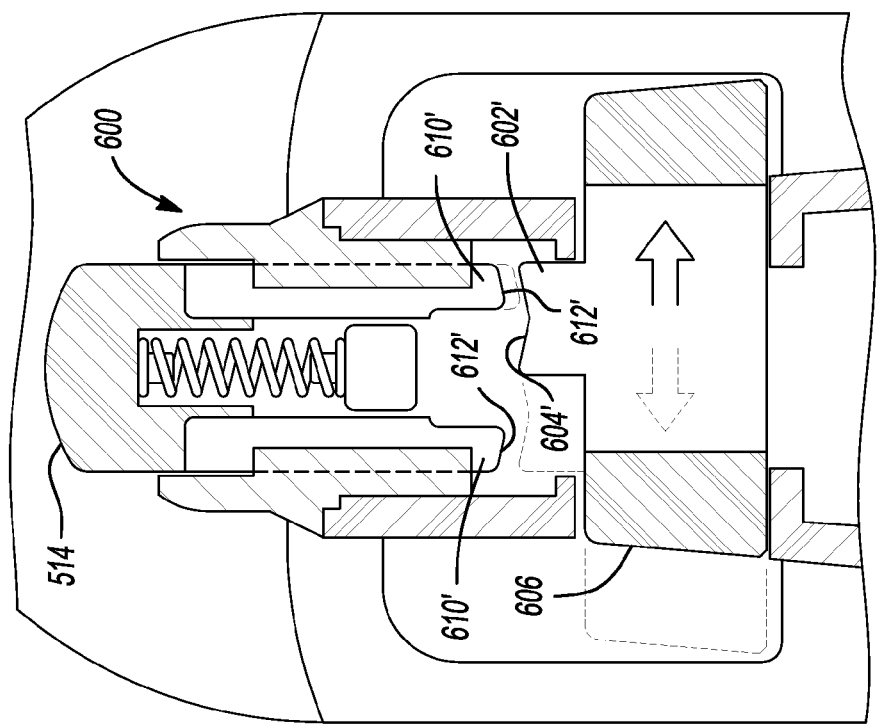

FIG. 63 is a detailed partial cross-sectional view of a forward-reverse lock-out feature illustrating a lock-out condition when a forward-reverse command button is in either a forward drive position (shown in phantom) and a reverse drive position; and FIG. 64 is a detailed partial cross-sectional view of the forward-reverse lock-out feature of FIG. 63 illustrating a release condition when the forward-reverse command button is in a neutral position.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 30:
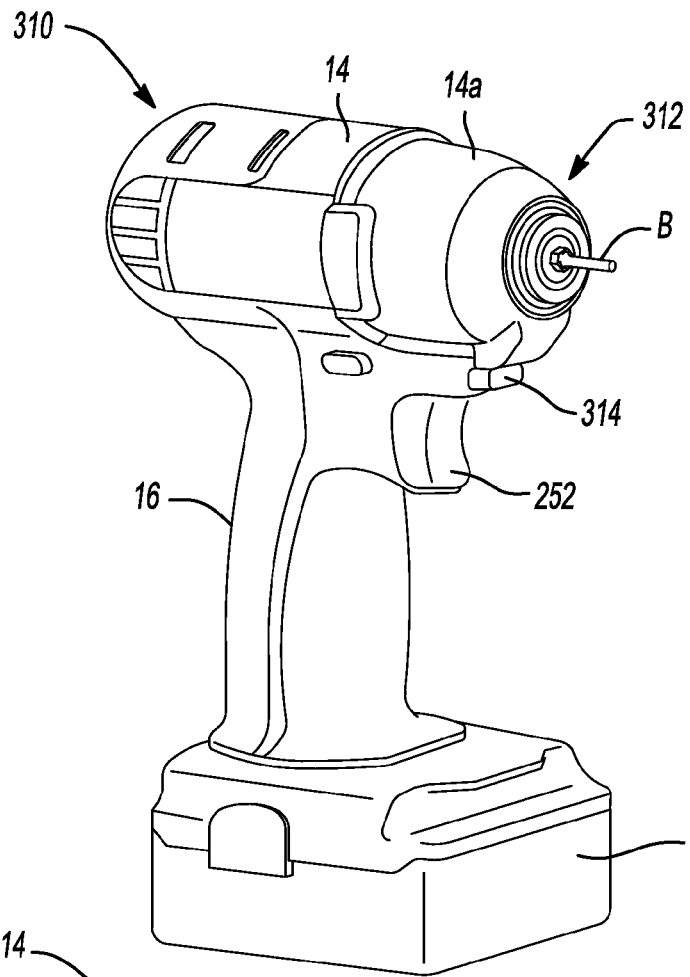
FIG. 30 is a perspective view of a power tool with an integrated bit retention device according to a fourth embodiment according to the principles of the present disclosure.

With reference to FIGS. 1-9, a power tool 10 having an integrated bit retention mechanism 12 for retaining a tool bit B will now be described. The power tool 10 includes a housing 14 which encloses a motor (an exemplary motor is shown in FIG. 42) and includes a hand grip portion 16 and a trigger 18 disposed on a forward end of the hand grip portion 16. The trigger 18 is operable by a user to activate the motor that in turn drives a drive shaft 20 that can be either connected to or integrally formed with a spindle 22. The spindle 22 can include a polygonal cavity 24 designed for receiving a hexagonal or other polygonal shaped shank portion 26 of the tool bit B. The power tool 10 can be battery operated (an exemplary battery pack 27 is shown in FIG. 30) or alternatively it can be a corded power tool.

Figure 8:
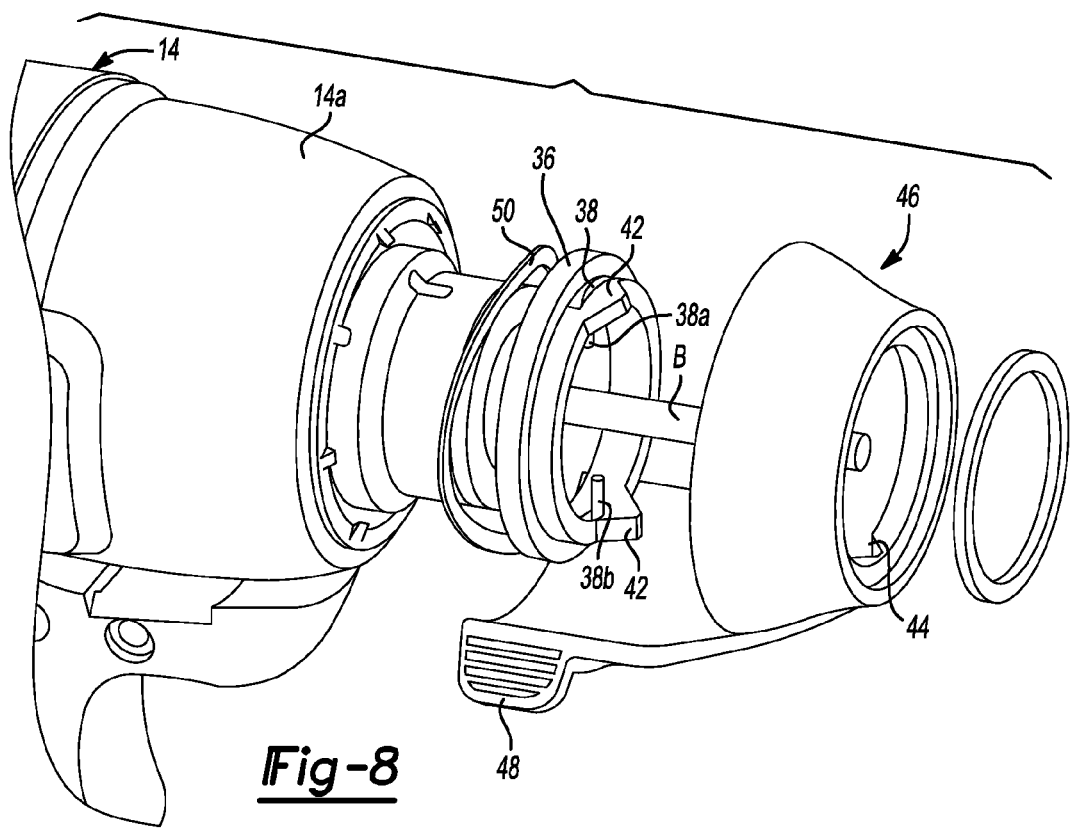
FIG. 8 is an exploded perspective view showing some of the components assembled to the power tool.

The bit retention mechanism 12 is integrated into a forward housing portion 14a and includes a clip 28 that is received in an angled slot 30 (FIG. 6) extending through the spindle 22 and in communication with the cavity 24 therein. The clip 28 is biased toward a forward position by a compression spring 32 that forces the clip 28 downward along the angled slot 30 so as to engage a bit B received in the cavity 24. A cup member 34 (FIGS. 1 and 5) surrounds the spindle 22 and receives the clip 28 therein. A shift ring 36 surrounds the cup 34 and includes a shift wire 38 (FIG. 7) having two ends 38a, 38b, that are received in slots 40 provided in the cup 34. The shift ring 36 includes cam surfaces 42 which engage associated cam surfaces 44 provided on an interior side of a nose ring 46, as illustrated in FIG. 8. The nose ring 46 can define a portion of the housing 14.

Figure 9:
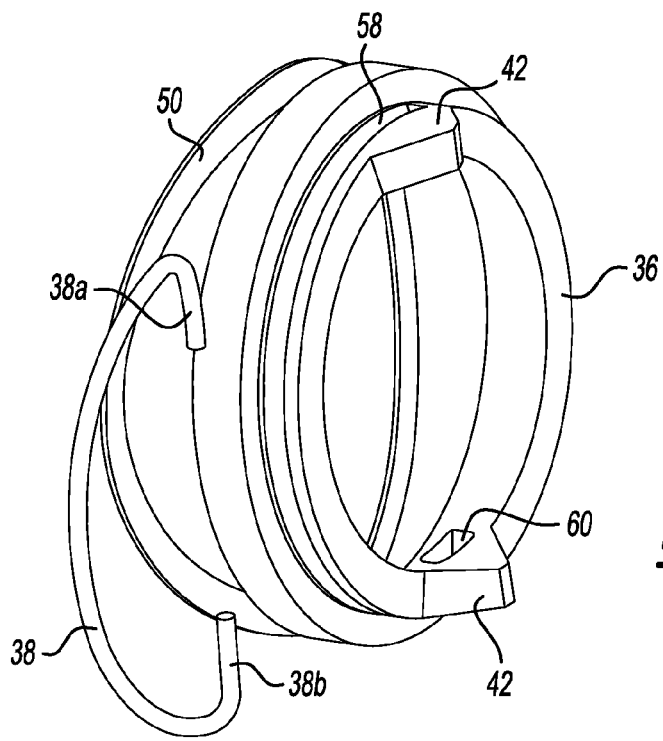
FIG. 9 is a perspective view of the shift ring, shift wire and return spring according to the principles of the present disclosure.

The shift ring 36 includes an annular body portion and cam portions 42 extending forwardly thereof, as illustrated in FIG. 9. The shift ring can include a recessed groove 58 as illustrated in FIG. 9 that is adapted to receive the shift wire 38 therein. The shift ring 36 further includes a pair of apertures 60 at the ends of the recessed groove 58 to receive the ends 38a, 38b of the shift wire 38 there through. The ends 38a, 38b of the shift wire 38 provide a connection between the shift ring 36 and the cup member 34 with the ends 38a, 38b being inserted into slots 40 and the cup member 34.

Figure 3:
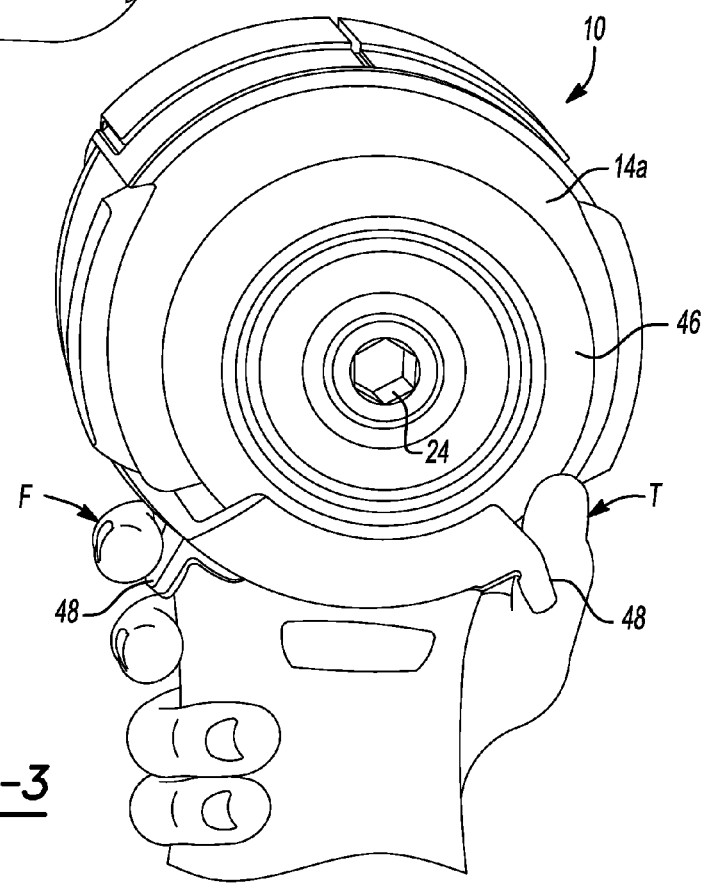
FIG. 3 is a front view of the power tool shown in FIG. 1.
Figure 4:
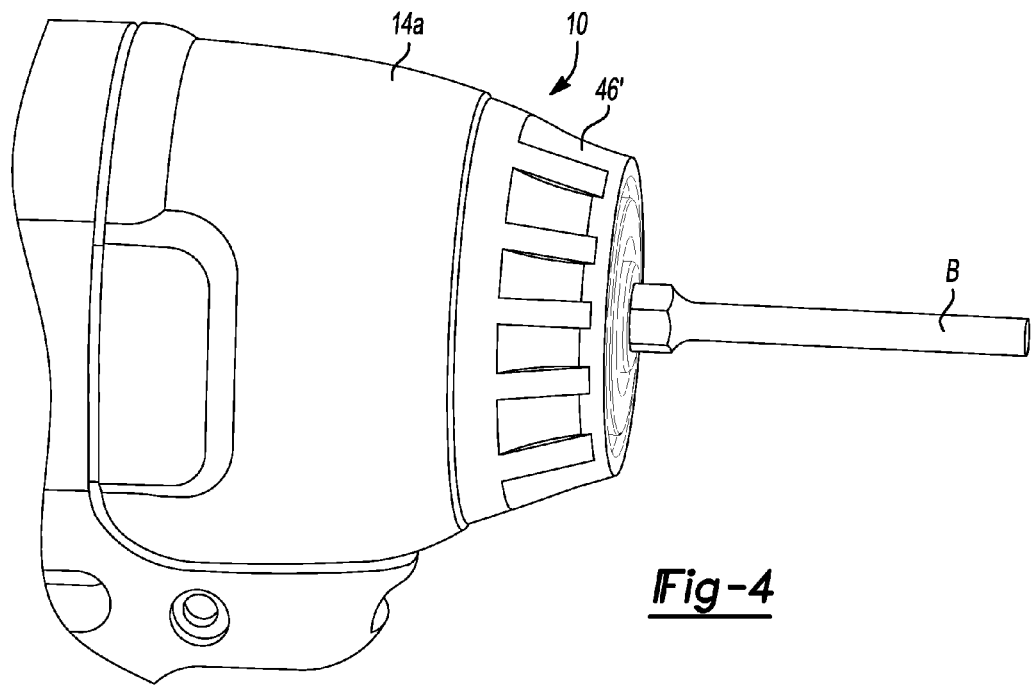
FIG. 4 is a perspective view of an alternative configuration of the power tool according to the principles of the present disclosure.
Figure 5:
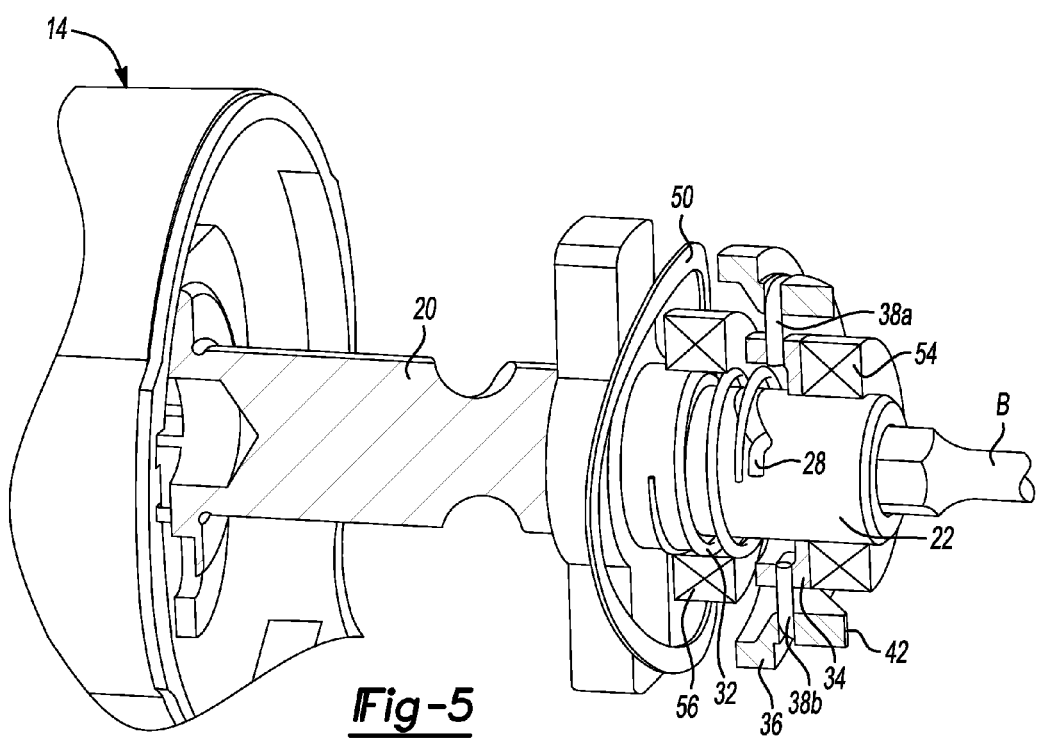
FIG. 5 is an exploded perspective view showing components of the bit retention device of FIG. 1.
Figure 6:
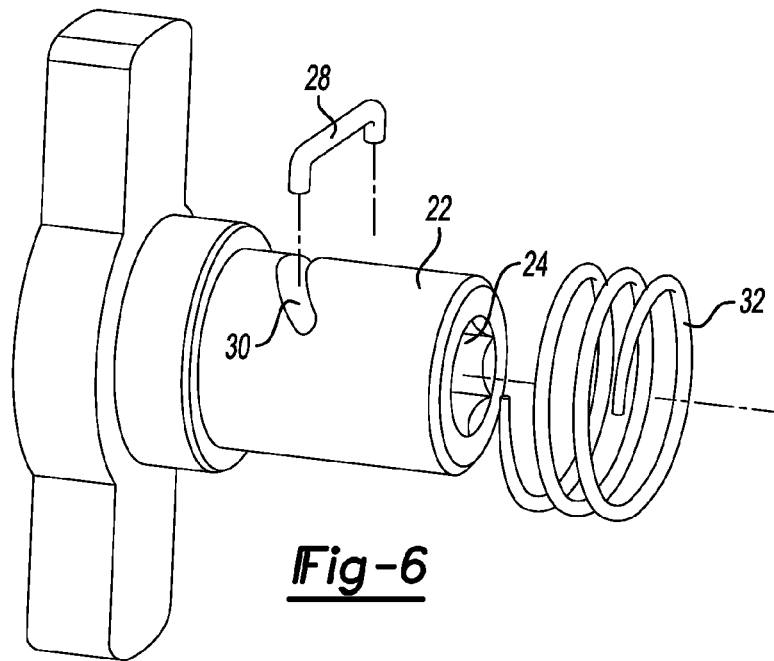
FIG. 6 is an exploded view of a drive spindle and spring clip assembly for retaining a bit within the cavity of the drive spindle.
Figure 7:
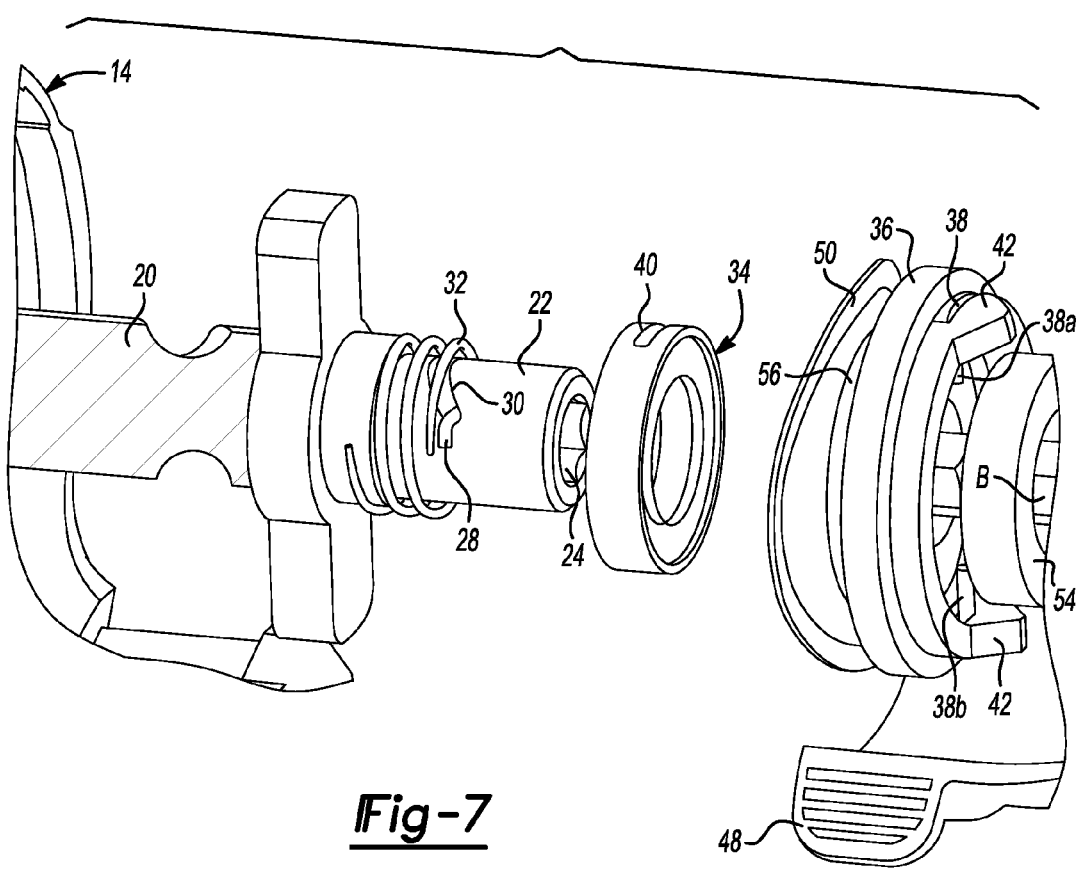
FIG. 7 is an exploded perspective view of the components of the bit retention mechanism according to the principles of the present disclosure.

The nose ring 46 can include one or more actuating tabs 48, two of which are illustrated in FIG. 3. Alternatively, as illustrated in FIG. 4, the nose ring 46' can be provided with a knurled or other textured surface to facilitate rotation of the nose ring 46' by a user's hand. According to one aspect of the present disclosure, the actuator tab 48 attached to the nose ring 46 can be located in a position adjacent to the trigger 18 so that while the user is holding on to the hand grip portion 16 of the housing 14, the user's finger F (shown in FIG. 3) can be lifted off of the trigger 18 so as to engage the actuating tab 48 without having to reposition their hand on the hand grip portion 16, thus allowing actuation of the actuator tab 48 while maintaining control of the tool 10 via the hand grip portion 16. Alternatively, the user can use his or her thumb T as shown in FIG. 3, to actuate the actuator tab 48 on the other side of the tool 10, again while maintaining control of the tool 10 via the hand grip portion 16.

A return spring 50 biases the shift ring 36 in a forward direction toward the nose ring 46. The return spring 50 can be in the form of a wave spring or compression spring or other type of spring mechanism to allow the shift ring 36 to be pressed forward against the nose ring 46. The return spring 50 can be disposed against a forward portion of the housing 14a and against a rearward surface of the shift ring 36.

Figure 1:
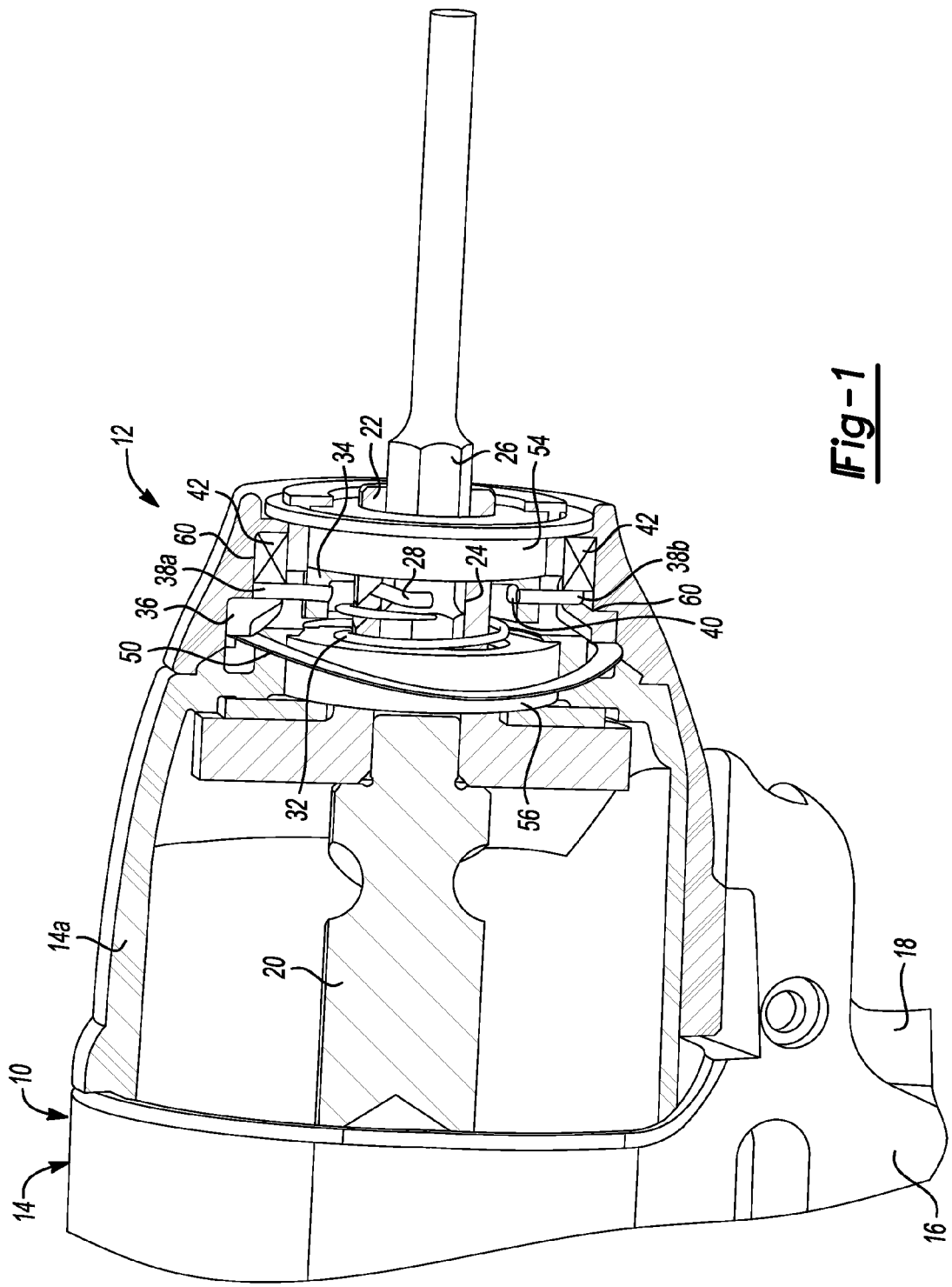
FIG. 1 is a partial cutaway perspective view of a power tool with an integrated bit retention device according to the principles of the present disclosure.
Figure 2:
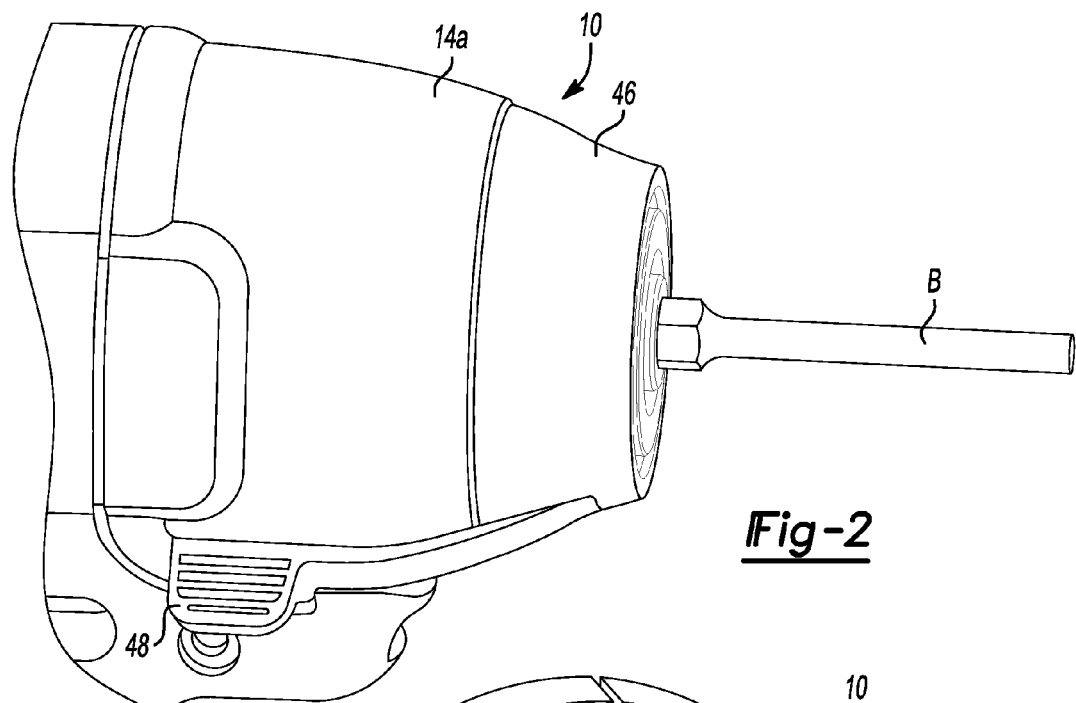
FIG. 2 is a side view of the power tool shown in FIG. 1.

The spindle 22 as shown in FIG. 1 is formed as an anvil of an impact driver. However, it should be understood that the spindle 22 can be utilized in a drill or power screwdriver or other screwdriver. The spindle 22 is supported by a forward bearing set 54 and a rearward bearing set 56 which are each received in the forward housing portion 14a so as to be rotatably supported therein. The entire bit retention mechanism 12 can be disposed axially between the forward end of the forward bearing set 54 and the forward end of the rearward bearing set 56. The bit retention mechanism 12 can also be completely disposed within the housing 14 wherein the nose ring 46 defines a portion of the housing 14.

In operation a user who is holding onto the hand grip portion 16 of the housing 14 can use an index finger F or a thumb T (FIG. 3) to engage one of the actuating tabs 48 in order to rotate the nose ring 46 relative to the forward housing portion 14a. The rotation of the nose ring 46 causes the cam portion 44 on the interior side of the nose ring to ride up the corresponding cam surface 42 of the shift ring 36 causing the shift ring 36 to move rearward against the biasing force of the return spring 50. The shift wire 38 which is connected between the shift ring 36 and the cup member 34 via ends 38a, 38b, then causes the cup member 34 to slide rearward along the spindle 22 and presses the clip 28 up the angled slot 30 of the spindle 22 to cause the clip 28 to disengage from a bit B received in the polygonal cavity 24. As the cup member 34 is moved rearward, the compression spring 32 is compressed. When the clip member 28 is disengaged from the bit B, the user's second hand can be utilized to remove the bit B from the bit retention device.

As the actuating tab 48 is released by the user, the return spring 50 biases the shift ring 36 in a forward direction causing the cam surface 42 to slide forward along cam surfaces 44 of the nose ring 46 causing the nose ring 46 to rotate to its starting position. Furthermore, the compression spring 32 presses forward on the clip 28 causing the clip 28 to move forward in the angled slot 30 to an engaged position while the cup member 34 is also biased to a forward position.

It is noted that upon insertion of a bit B into the polygonal cavity 24, the proximal end of the bit B engages the clip member 28 and tends to cause the clip 28 to move upward along the angled slot 30 until the clip 28 clears the end of the bit B so that the bit B can be further inserted. The rearward movement of the clip 28 causes the compression spring 32 to compress while the clip 28 is moved rearward along the angled slot 30 and when the clip member 28 clears the end of the bit B, the compression spring 32 presses the clip 28 forward and downward along angled slot 30 so that the clip member 28 can lockingly engage against a surface of the bit B that is inserted into the cavity 24.

It is noted that the insertion of the bit B does not require actuation of the actuating tab 48 attached to the nose ring 46 in order to properly receive a bit B. This is referred to as "drop-in-to-load" bit insertion. This facilitates easier operation by the user who can simply push the bit B into the cavity 24 in order to retain the bit B within the tool.

With reference to FIGS. 10-21, a power tool 110 having an integrated bit retention mechanism 112 will now be described for retaining a bit B within the power tool 110. Bit retention mechanism 112 includes a spindle 122 adapted for connection with a driveshaft of a motor (not shown). The spindle 122 includes a polygonal cavity 124 for receiving the tool bit B therein.

A pin member 128 is slidably received in an angled window 130 that extends through the spindle 122 and communicates with the polygonal cavity 124. The pin 128 is supported in a slot 131 disposed in a cone member 132. The cone member 132 is disposed against a compression spring 134 which seats against a shoulder 136 on the spindle 122. The compression spring 134 acts to bias the cone member 132 in a forward direction which tends to cause the pin 128 to move to a rearward position in the slot 131 and in a radially inward position to engage with the bit B received in the polygonal cavity 124. The spindle 122 is supported within a forward portion of the housing 14a by a forward bearing assembly such as a needle bearing assembly 140 and by a rearward bearing assembly 142.

Figure 13:
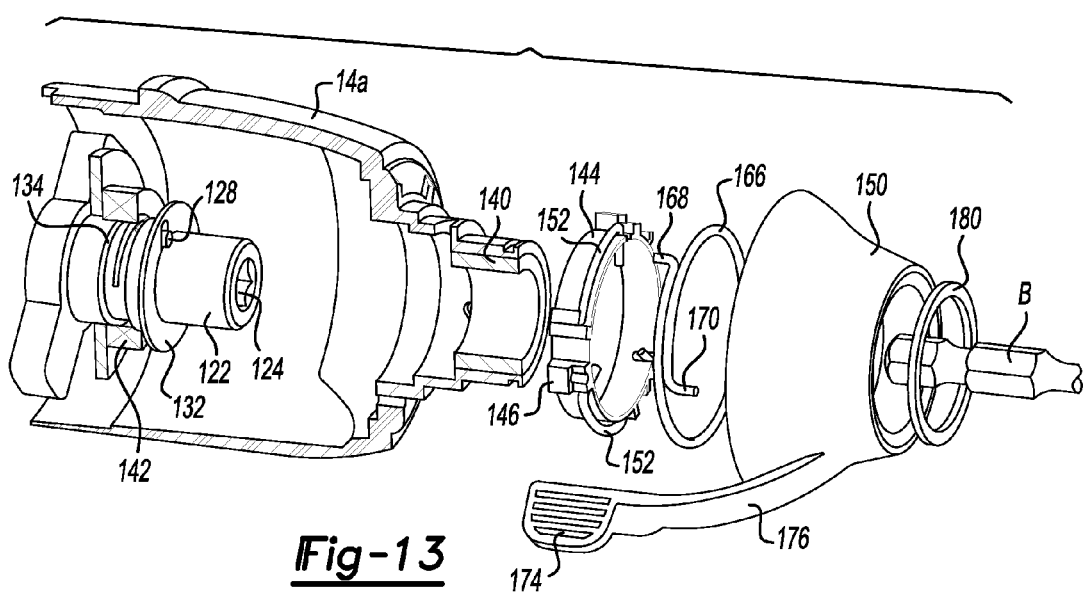
FIG. 13 is an exploded perspective view of the components of the bit retention mechanism shown in FIG. 10.
Figure 14:
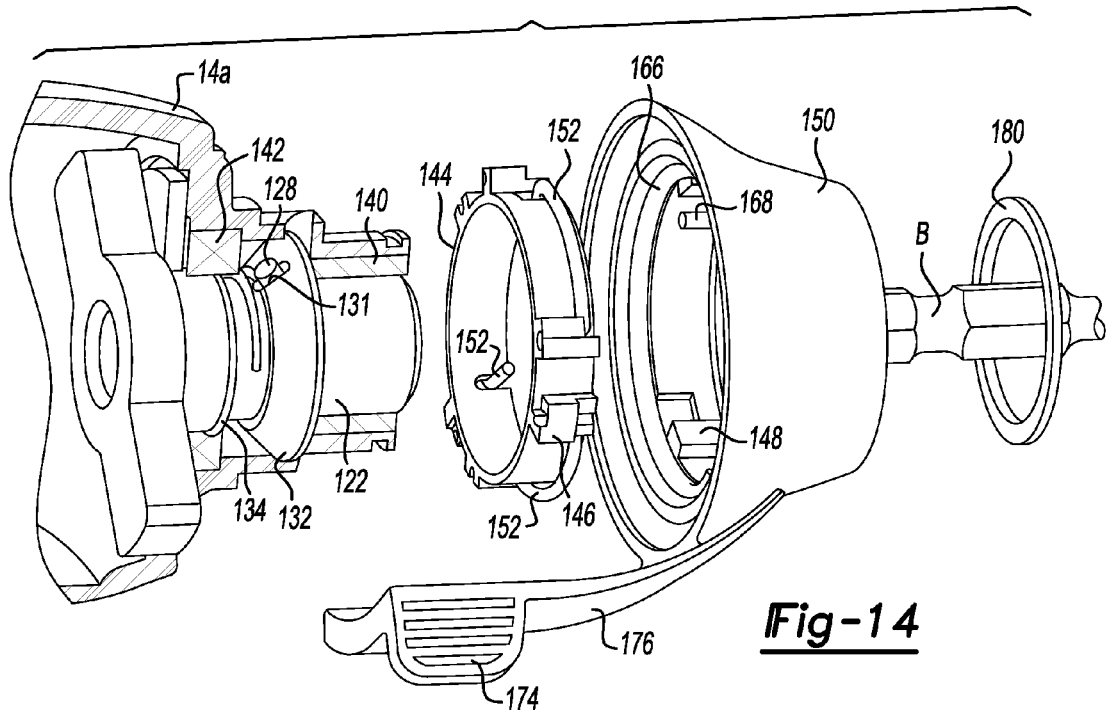
FIG. 14 is an exploded perspective view from a rearward angle illustrating the components of the bit retention mechanism shown in FIG. 10.
Figure 15:
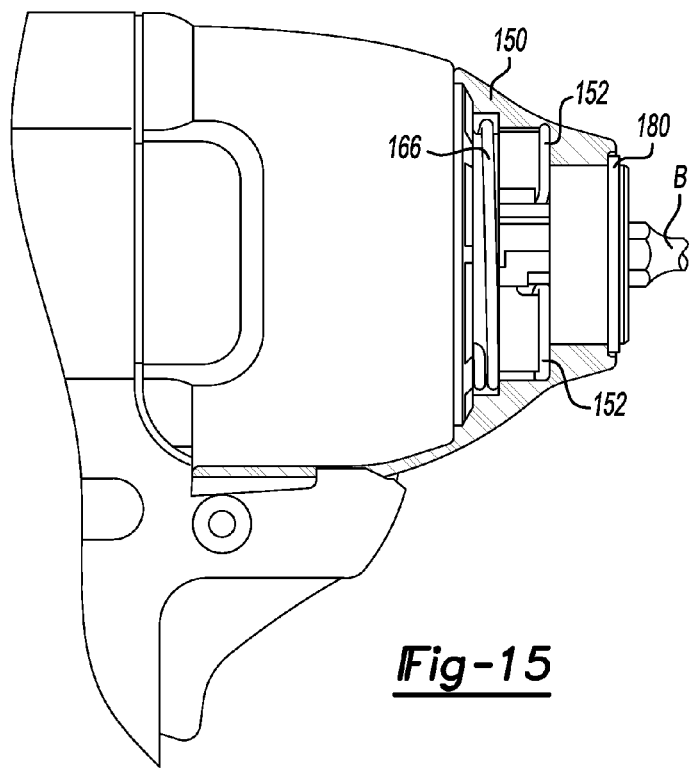
FIG. 15 is a partial cutaway view illustrating the shift ring, shift wire and torsion spring utilized with the bit retention mechanism shown in FIG. 10.
Figure 16:
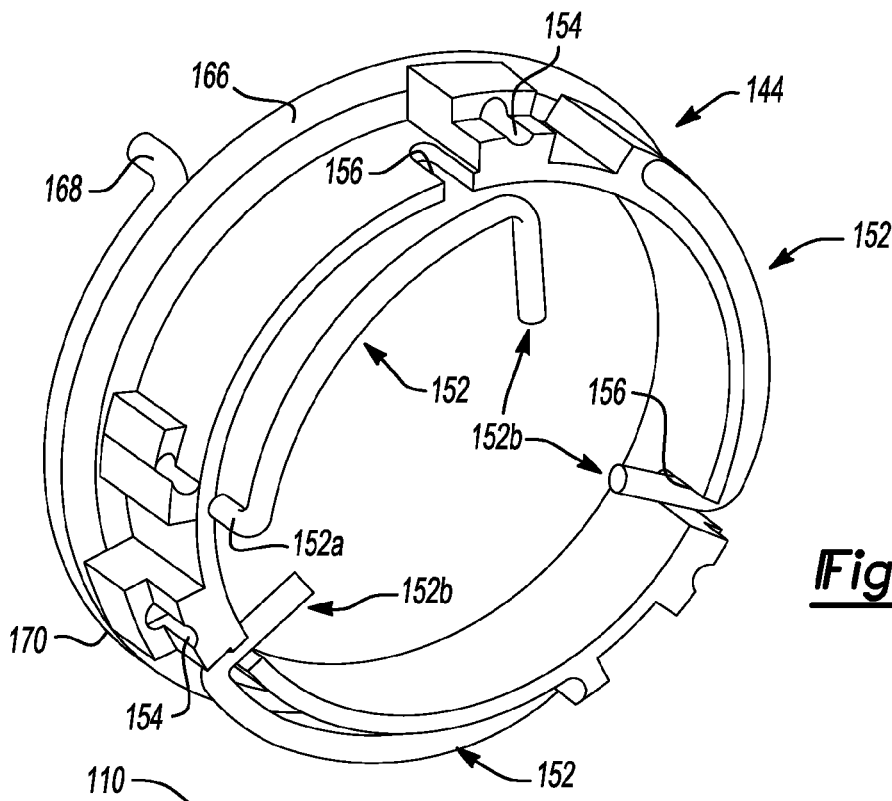
FIG. 16 is a perspective view of the shift ring, shift wires and torsion spring removed from the tool.
Figure 17:
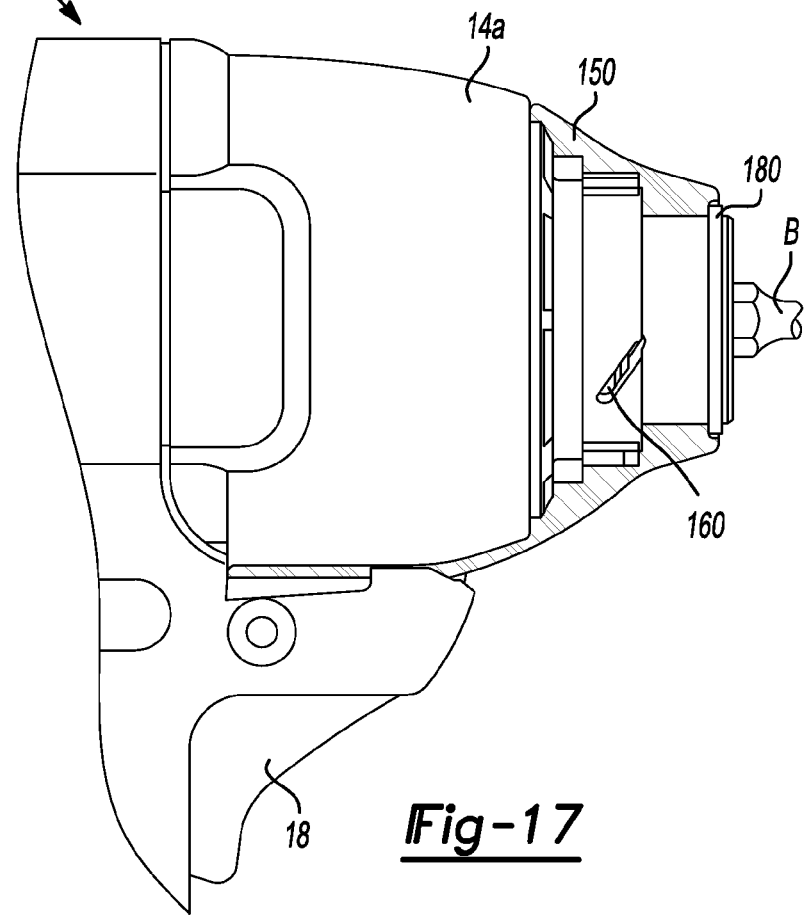
FIG. 17 is a partial cutaway view of the power tool with integrated bit retention mechanism for illustrating a helical slot in the power tool housing provided for engagement with the shift wires according to the principles of the present disclosure.
Figure 18:
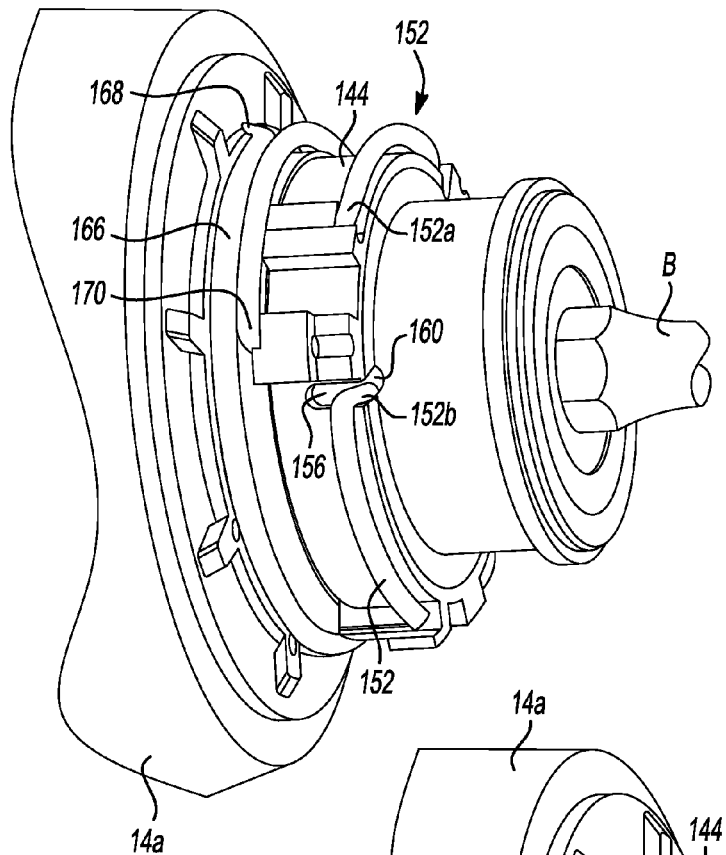
FIG. 18 is a perspective view of the bit retention mechanism with the nose ring removed for illustrative purposes.
Figure 19:
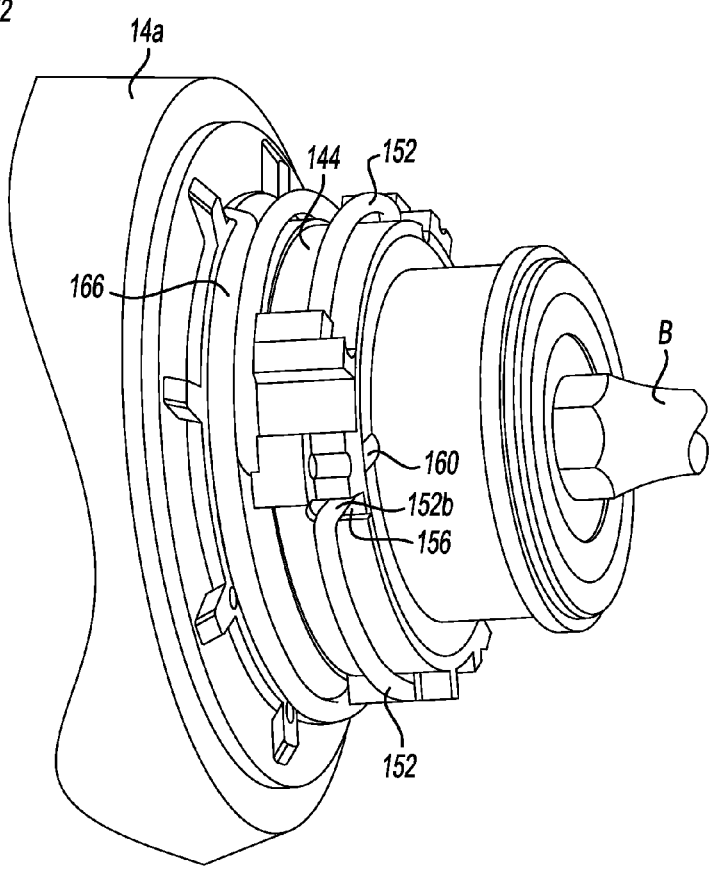
FIG. 19 is a further perspective view of the bit retention mechanism with the nose ring removed for illustrating the shift ring and shift wires in a disengaged position according to the principles of the present disclosure.

A shift ring 144 is rotatably supported on an exterior surface of the forward portion 14a of the housing 14. The shift ring 144, as illustrated in FIGS. 13 and 14, includes external features 146 which rotationally engage with internal features 148 of a nose ring 150. A plurality of shift wires 152 are supported by the shift ring 144 which includes a plurality of axially extending apertures 154 (one of which is shown in FIG. 16) for receiving an axially extending portion 152a of the shift wires 152 and the shift ring 144 includes a plurality of axially extending slots 156 for receiving a radially inwardly extending portion 152b of the shift wires 152. The axially ending slots 156 allow axial translational movement of the radially inwardly extending ends 152b of the shift wires 152 relative to the shift ring 144. The radially inwardly extending end portions 152b of the shift rings 152 are further received in helical slots 160 that are disposed in the housing as illustrated in FIGS. 17-19. It is noted that FIG. 17 illustrates the housing with the nose ring and shift ring cut away in order to better illustrate the slot 160 therein. The illustration in FIG. 18 show the radially inwardly extending end portion 152b of the shift wires 152 being received in the axially extending slot 156 of the shift ring 152 and further received in the helical slots 160 of the forward housing portion 14a. As illustrated in FIG. 19, the shift ring 144 is pivoted in a counter-clockwise direction as compared to FIG. 18, and the radially inwardly extending portion 152b of the shift wires 152 are illustrated as being translated rearward along helical slot 160 as well as rearward along axial slot 156 of the shift ring 144.

Figure 10:
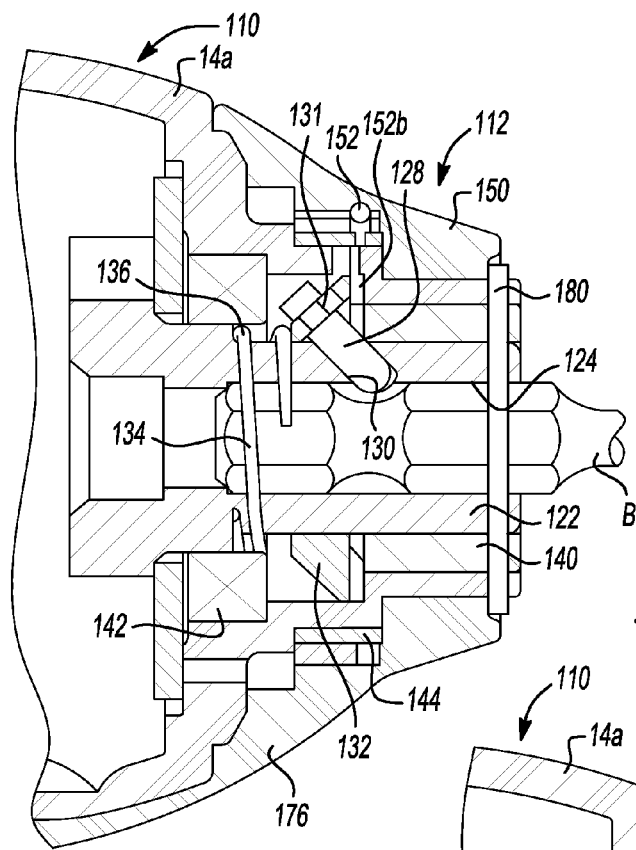
FIG. 10 is a cross-sectional view of a power tool having an integrated bit retention mechanism according to a second embodiment of the present disclosure.
Figure 11:
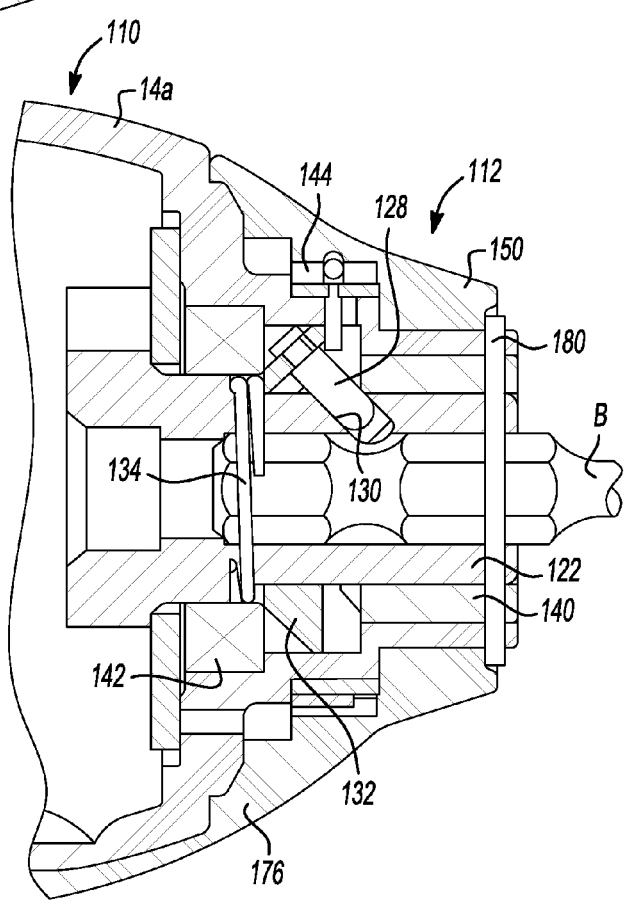
FIG. 11 is a cross-sectional view similar to FIG. 10, with the bit retention mechanism shown in a released state.
Figure 12:
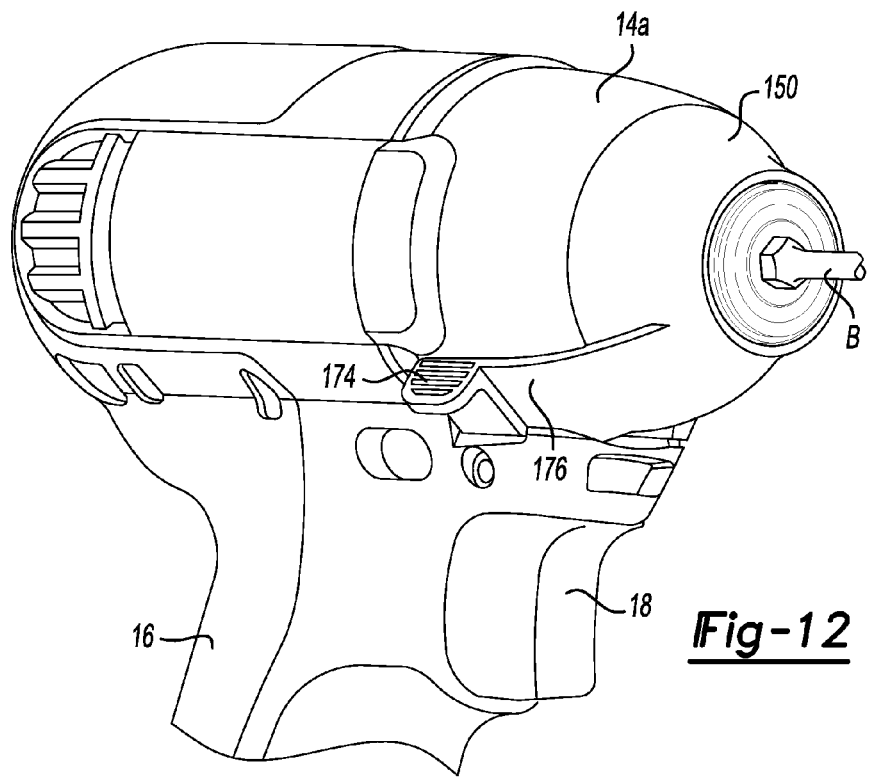
FIG. 12 is a front perspective view of the power tool with bit retention mechanism as illustrated in FIG. 10.

As illustrated in FIG. 10, the radially inwardly extending portions 152b of the shift wires 152 engage a forward end of the cone member 132 such that when the nose ring 150 is pivoted, the rotation of the nose ring 150 is translated to the shift ring 144 via internal features 148 engaging external features 146 thus causing the radially inwardly extending end portions 152b of shift wires 152 to translate axially rearward along helical grooves 160 thereby causing cone member 132 to translate rearwardly thereby pulling the pin member 128 out of engagement with the bit B received in the polygonal cavity 124. As the cone member 132 is moved rearwardly, the compression spring 134 is compressed such that when the actuator tab 174 is released, the compression spring 134 biases the cone member forward so that the pin 128 is moved to its engaged position.

The shift ring 144 is connected to a torsion spring 166 as shown in FIGS. 18-19. The torsion spring 166 has one end 168 that is engaged with the housing 14a and a second end 170 that is engaged with the shift ring 144 so that the torsion spring 166 biases the shift ring 144 in a clockwise direction as illustrated in FIG. 18. Upon counter-clockwise rotation of the nose ring 150, the shift ring 144 is caused to rotate counter-clockwise due to engagement of the internal features 148 and external features 146. Upon counter-clockwise rotation of the shift ring 144, the torsion spring 166 is rotationally loaded and tends to bias the shift ring 144 and nose ring 150 to the engaged position when the actuator tab is released.

In the embodiment shown in FIGS. 10-21, the nose ring 150 is provided with a single actuating tab 174, as illustrated in FIG. 14, which is connected to the nose ring 150 by an arm 176 which extends rearwardly from the nose ring 150 and supports the actuator tab 174 in a position adjacent to the trigger 18. A retainer ring 180 secures the nose ring 150 on the housing 14a. The entire bit retention mechanism 112 can be disposed axially between the forward end of the forward bearing set 140 and the forward end of the rearward bearing set 142. The bit retention mechanism 112 can also be completely disposed within the housing 14 wherein the nose ring 150 defines a portion of the housing 14.

Figure 20:
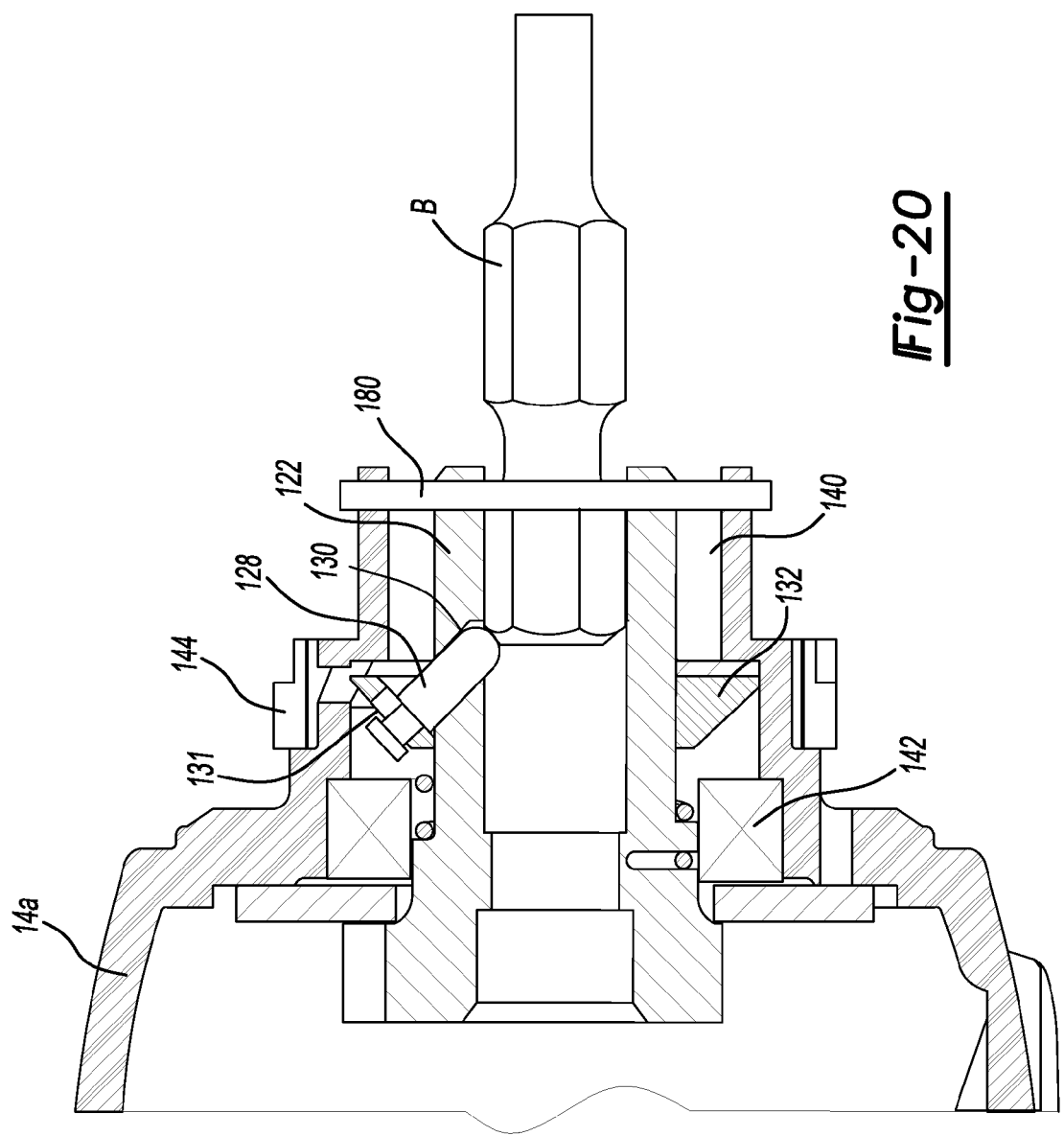
FIG. 20 is a cross-sectional view similar to FIG. 10, illustrating the insertion of a bit into the bit retention mechanism according to the principles of the present disclosure.
Figure 21:
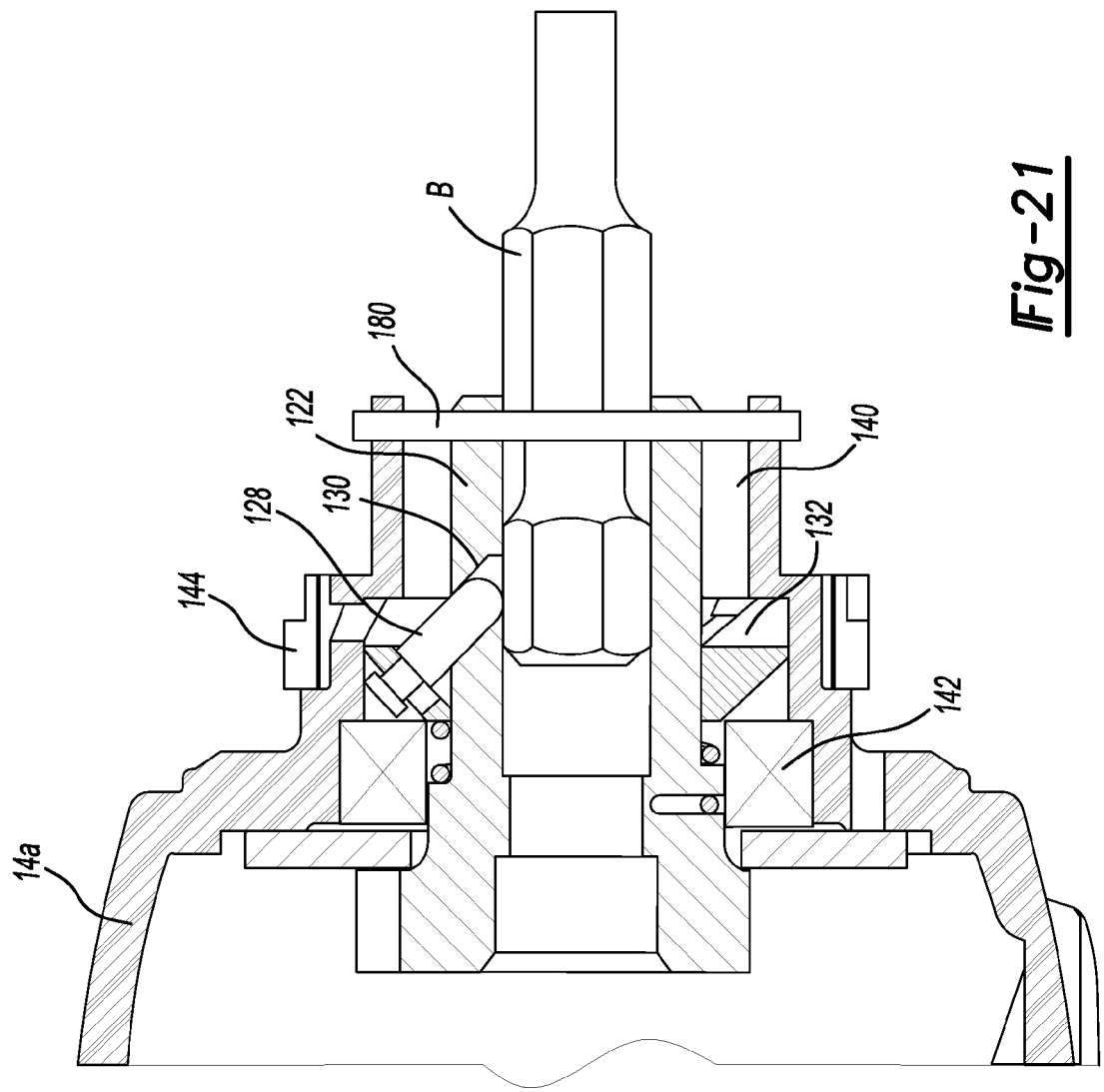
FIG. 21 is a further cross-sectional view similar to FIG. 20 but illustrating the bit being inserted further into the bit retention mechanism.

With reference to FIG. 20, upon "drop-in-to-load" insertion of a bit B into the polygonal cavity 124 of the spindle 122, the end of the bit B engages the pin 128 and then forces the pin B radially outward along the angular window 130 causing the pin 128 to travel upward along the slot 131 in the cone member and further causing the cone member 132 to move axially rearward against the compression spring 134 until the bit B clears the end of the pin 128 and can be inserted further into the cavity 124. Once the bit B is fully inserted, the pin 128 is able to move forward and radially inward into the recessed ball groove of the tool bit B, thereby allowing the compression spring 134 to push the cone member 132 forward into its engaged position. Therefore, the insertion of a bit B into the bit retention mechanism 112 can be done without activation of the actuation tab 174. It is noted that the actuation tab 174 is located such that a left hand user can actuate the tab 174 using his or her thumb while a right handed user can actuate the tab 174 using his or her index finger.

With reference to FIGS. 22-29, a further embodiment of a power tool 210 having an integrated bit retention mechanism 212 according to the principles of the present disclosure will now be described.

The power tool 210 again includes a housing 14 having a hand grip portion 16 and enclosing a motor that drives a driveshaft which is engaged with a spindle 222 of the bit retention mechanism 212. The spindle 222 includes a polygonal cavity 224 for receiving a tool bit B therein. The spindle 222 includes an angled slot 228 which communicates with the polygonal cavity 224. The angled slot 228 receives a bit retention member therein that can include a clip portion 230 integrally formed with a spring portion 232 that biases the clip portion 230 to the forward innermost position of the angled slot 228. As illustrated in FIGS. 26 and 26A, spring portion 232 includes two shoulder portions 234 which are disposed against a shift ring 236 which surrounds the spindle 222.

The shift ring 236 includes a plurality of cam surfaces 238 which can project forward and engage with corresponding cam surfaces 240 disposed on an interior surface of a nose ring 242. A return spring 244 is disposed against a rearward surface of the shift ring 236 for biasing the shift ring 236 in a forward direction.

Figure 23:
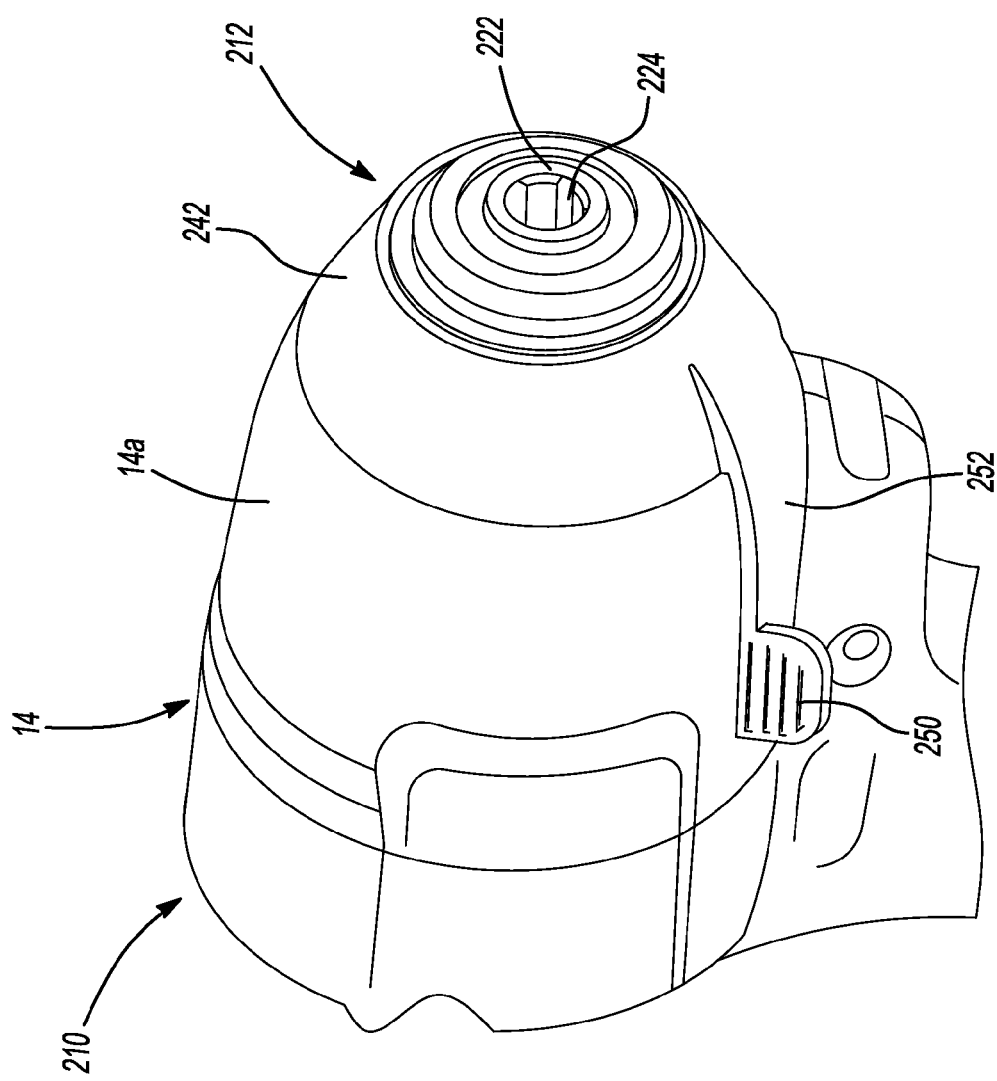
FIG. 23 is a front perspective view of the power tool having an integrated bit retention mechanism according the embodiment shown in FIG. 22.
Figure 24:
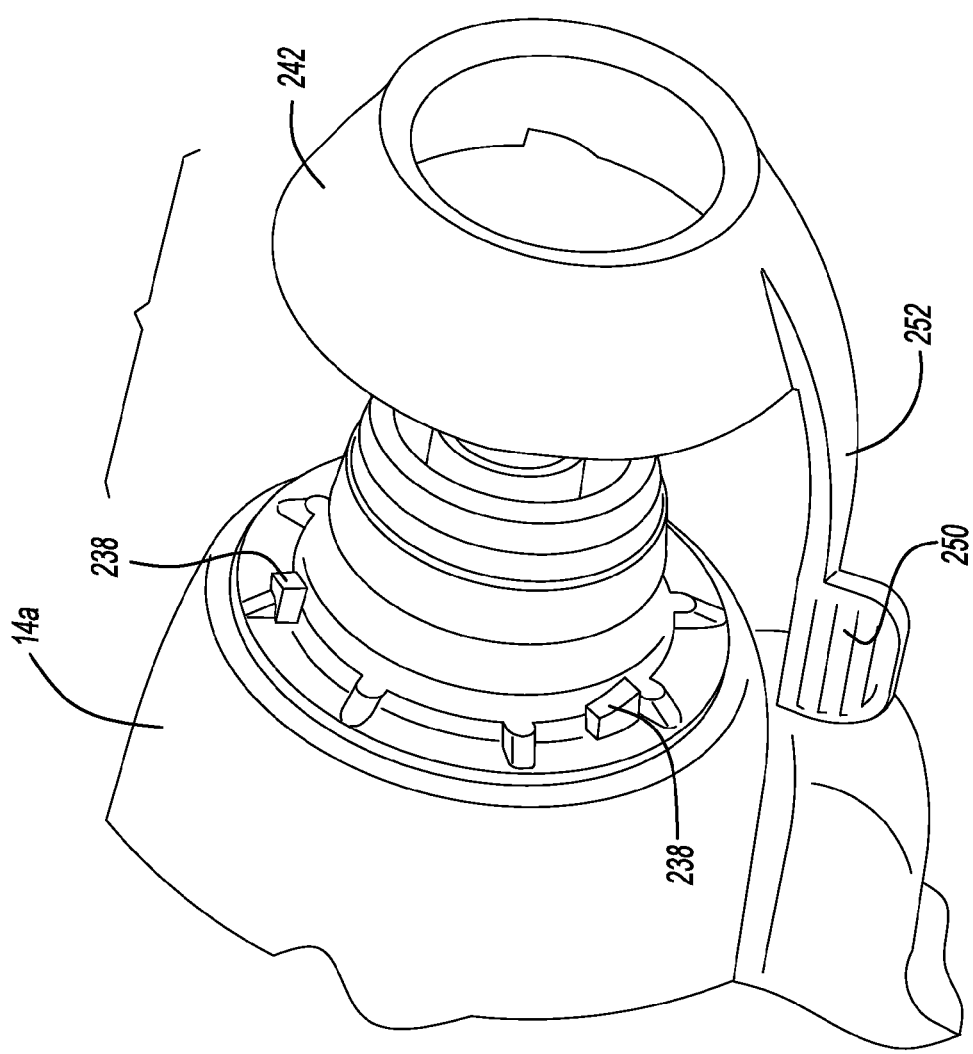
FIG. 24 is a partially exploded perspective view of the bit retention mechanism shown in FIG. 22.
Figure 25:
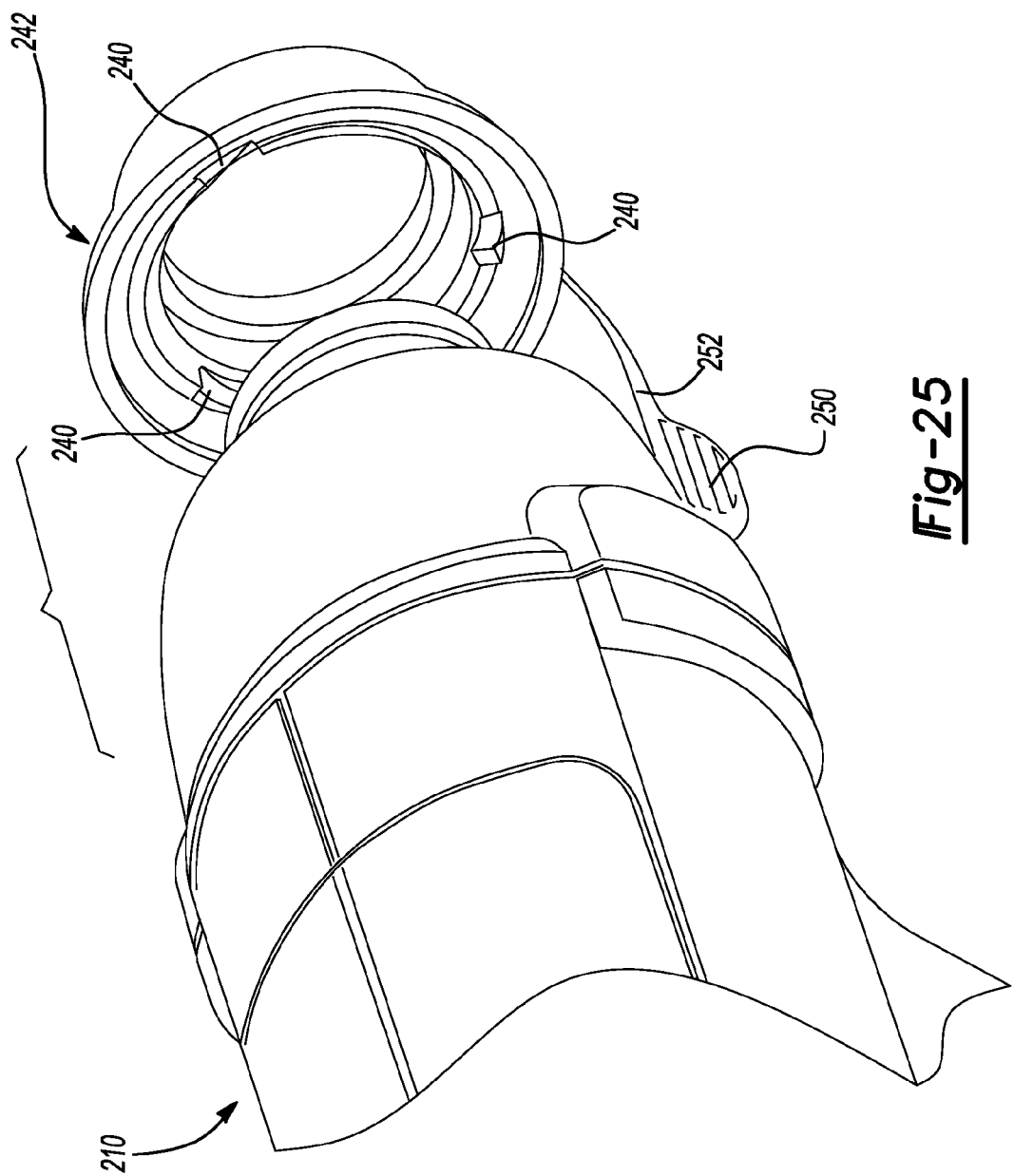
FIG. 25 is a partially exploded rear perspective view of the power tool with integrated bit retention mechanism shown in FIG. 22.
Figure 29:
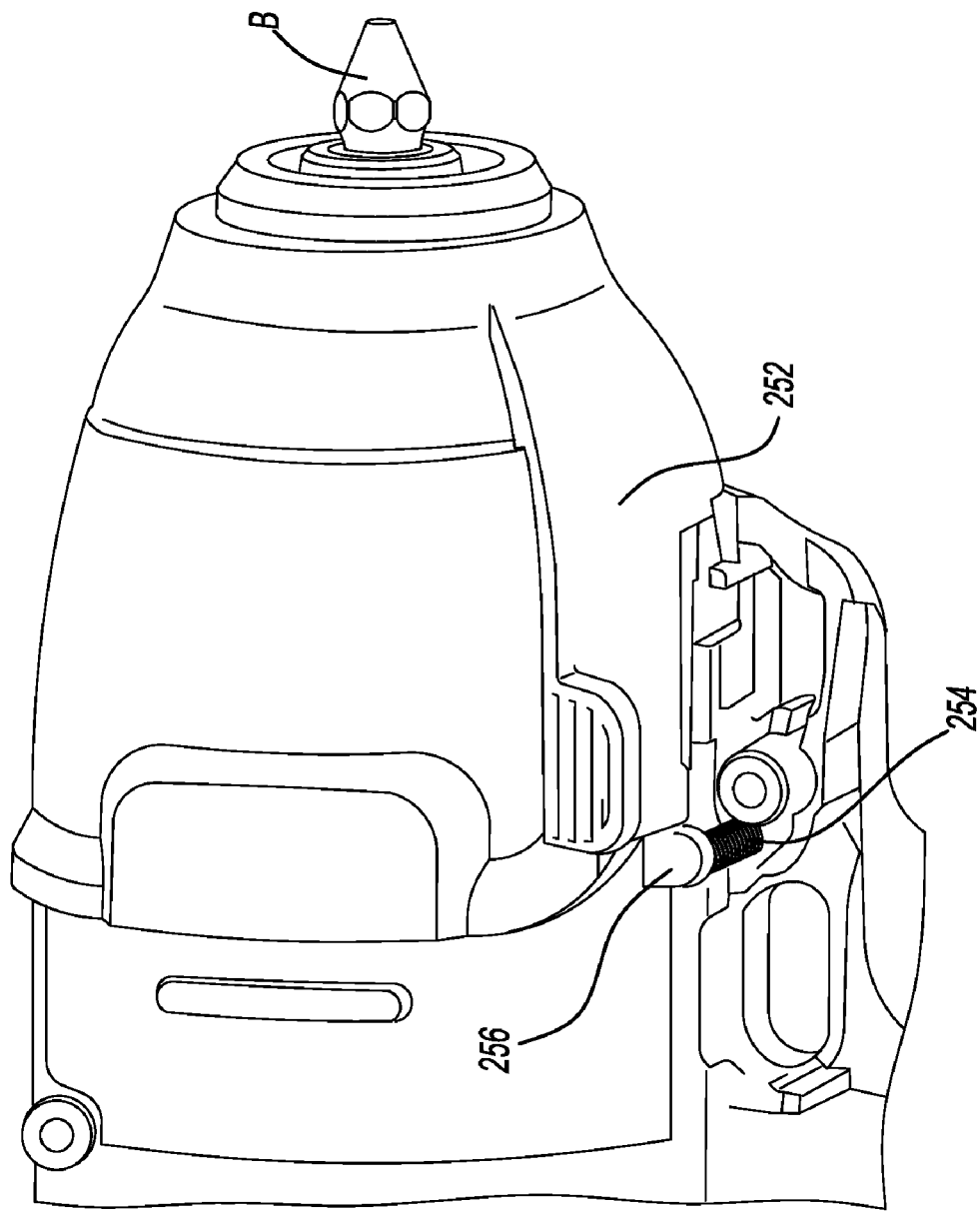
FIG. 29 is a partial cutaway perspective view of the power tool illustrating the nose ring return spring according to the principles of the present disclosure.

The nose ring 242 can be provided with an actuator tab 250 which can be supported by an extending arm portion 252. A spring 254 can be mounted between the housing 14 and a tab 256 supported by the arm 252 for biasing the nose ring 242 to its engaged position, as illustrated in FIG. 23. The cam surfaces 238 of the shift ring 236 can extend through the housing 14 as illustrated in FIG. 20 and engage with corresponding cam surfaces 240 on the interior of the nose ring 242. As the actuator tab 250 is engaged by the user, and rotated in a counter-clockwise direction, as illustrated in the drawings, the nose ring 242 rotates and causes the cam surfaces 238 of the shift ring 236 to ride up the corresponding cam surfaces 240 of the nose ring 242 which causes the shift ring 236 to translate rearwardly against the shoulder portions 234 of the spring portion 232 of the spring clip causing the clip portion 230 to move radially outward along the angled slot 228 out of engagement with the tool bit B. Therefore, the bit B can then be removed by the user using one hand while the other hand holds the power tool handle 16 with either the index finger or thumb holding the actuator tab 250 in the disengaged position. Upon release of the actuator tab 250, the spring 254 causes the nose ring 242 to move clockwise to its engaged position, thereby allowing the shift ring 236 to move forward thereby allowing the clip portion 230 to travel forward and inward along angled slot 228 into its engaged position as illustrated in FIG. 26. The insertion of a bit B into the bit retention mechanism 212 is again by "drop-in-to-load" insertion wherein the bit B pushes the clip portion 230 rearward and radially outward along the angled slot 228 until the bit B can be fully inserted.

Figure 22:
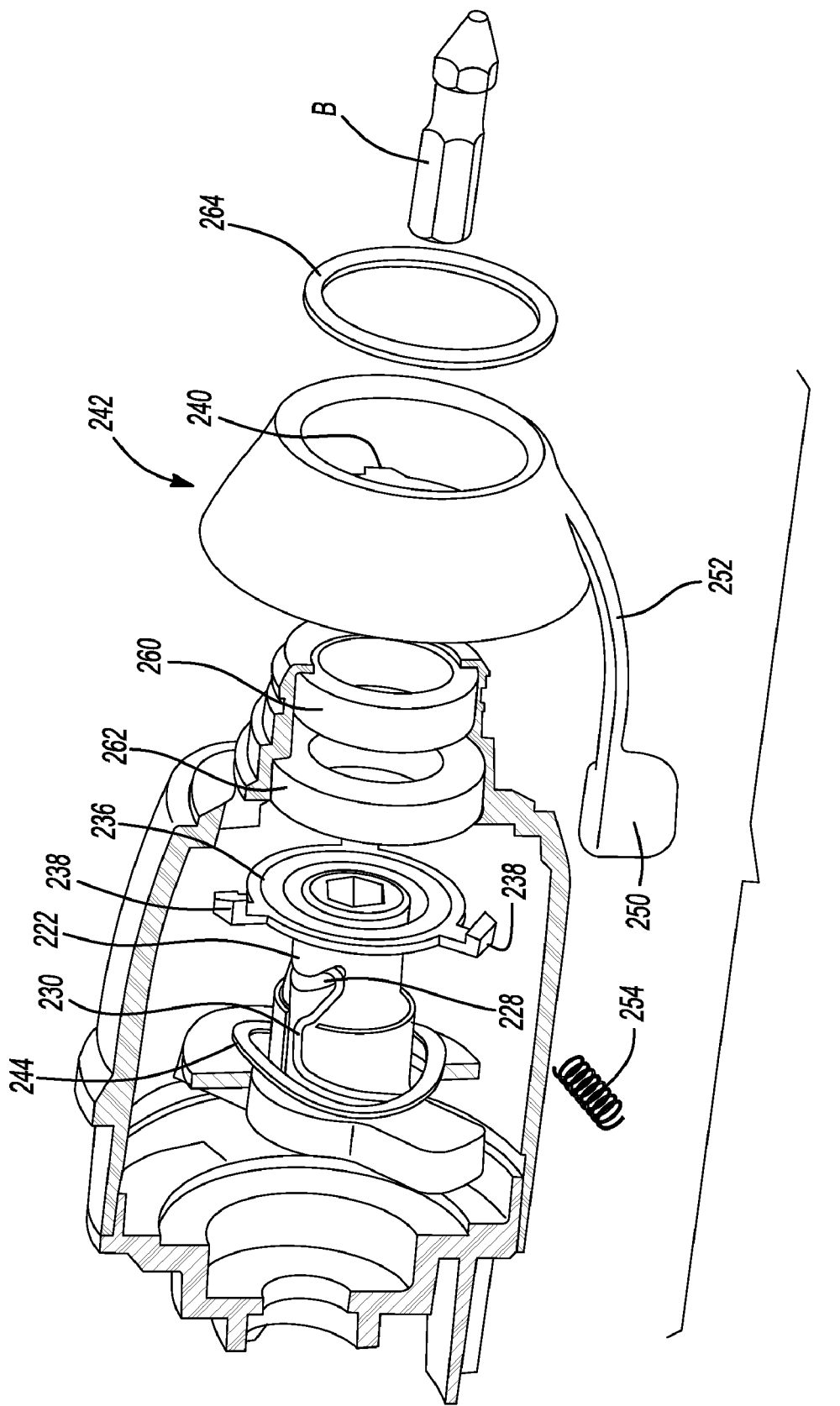
FIG. 22 is an exploded perspective view of the components of a power tool having an integrated bit retention mechanism according to a third embodiment of the present disclosure.

It is noted that the spindle 222 is supported by a forward bearing 260 and a rearward bearing 262 as illustrated in FIG. 22. A retaining ring 264 is provided in engagement with the housing portion 14a for retaining the nose ring 242 in its axial position. The entire bit retention mechanism 212 can be disposed axially between the forward end of the forward bearing set 260 and the forward end of the rearward bearing set 262.

The bit retention mechanism 212 can also be completely disposed within the housing 14 wherein the nose ring 242 defines a portion of the housing 14.

Figure 31:
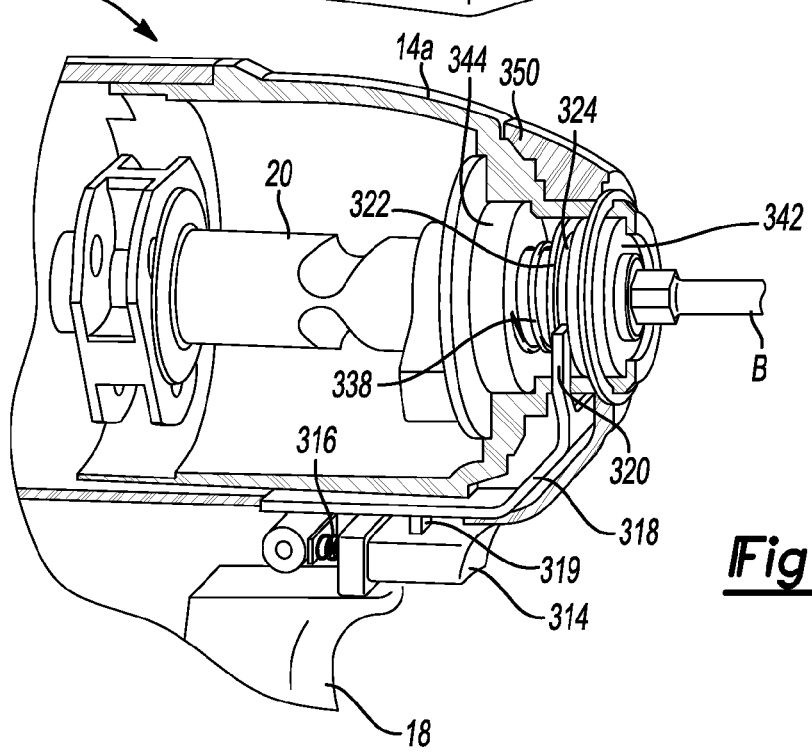
FIG. 31 is a partial cutaway perspective view of the power tool of FIG. 30 according to the principles of the present disclosure.
Figure 32:
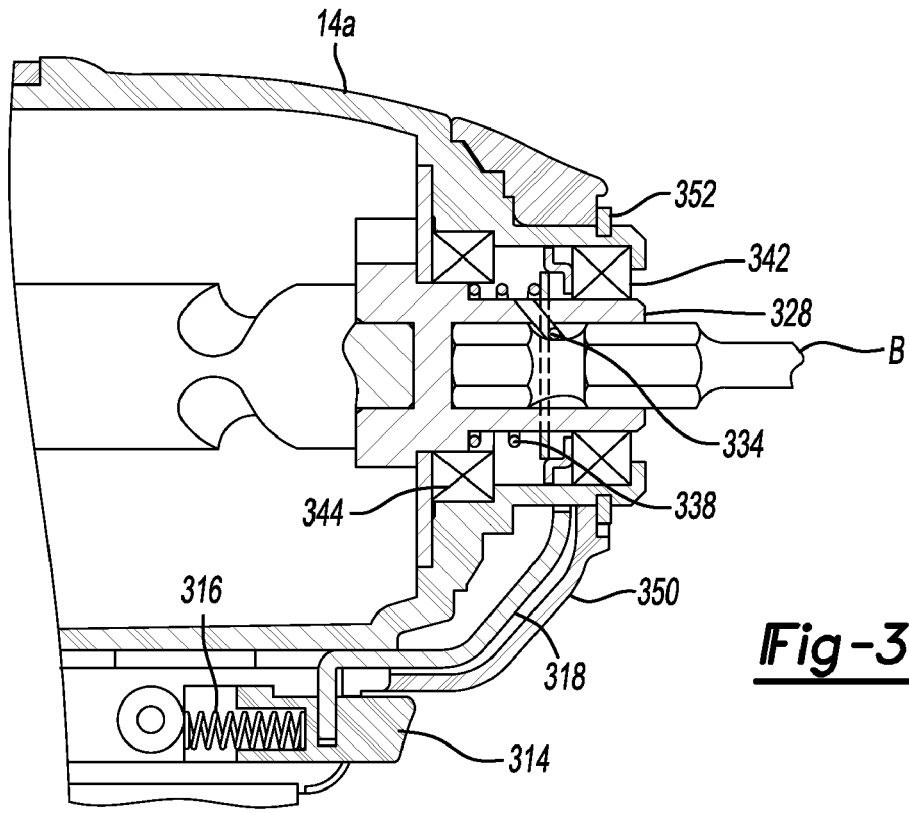
FIG. 32 is a detailed partial cross-sectional view of the power tool of FIG. 30 shown in an engaged position.
Figure 33:
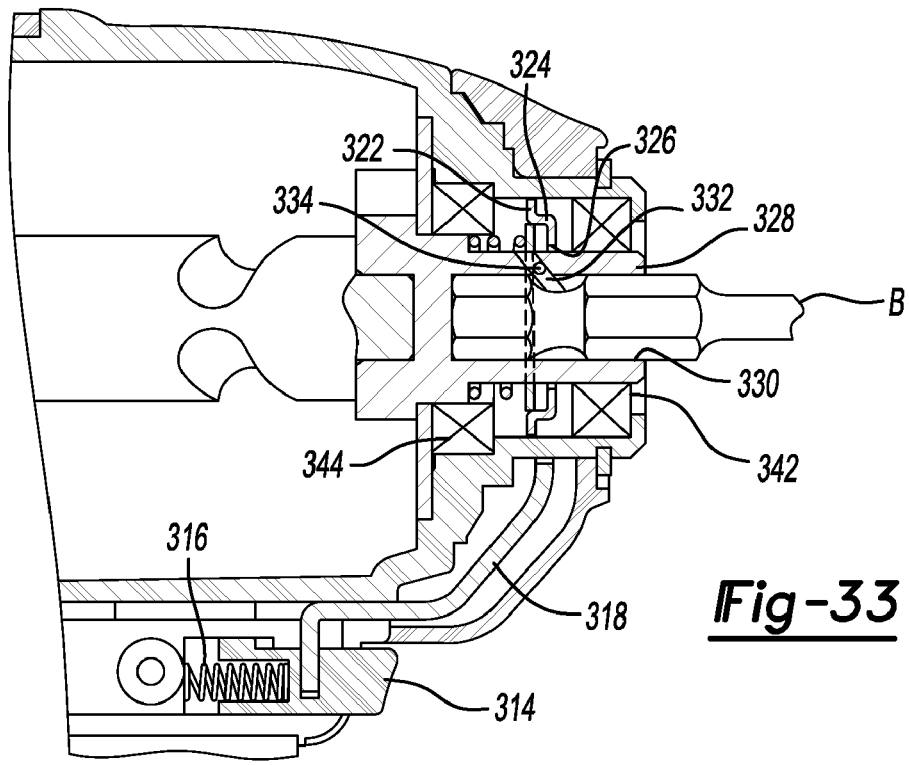
FIG. 33 is a detailed partial cross-sectional view of the power tool of FIG. 30 shown in a disengaged position.
Figure 34:
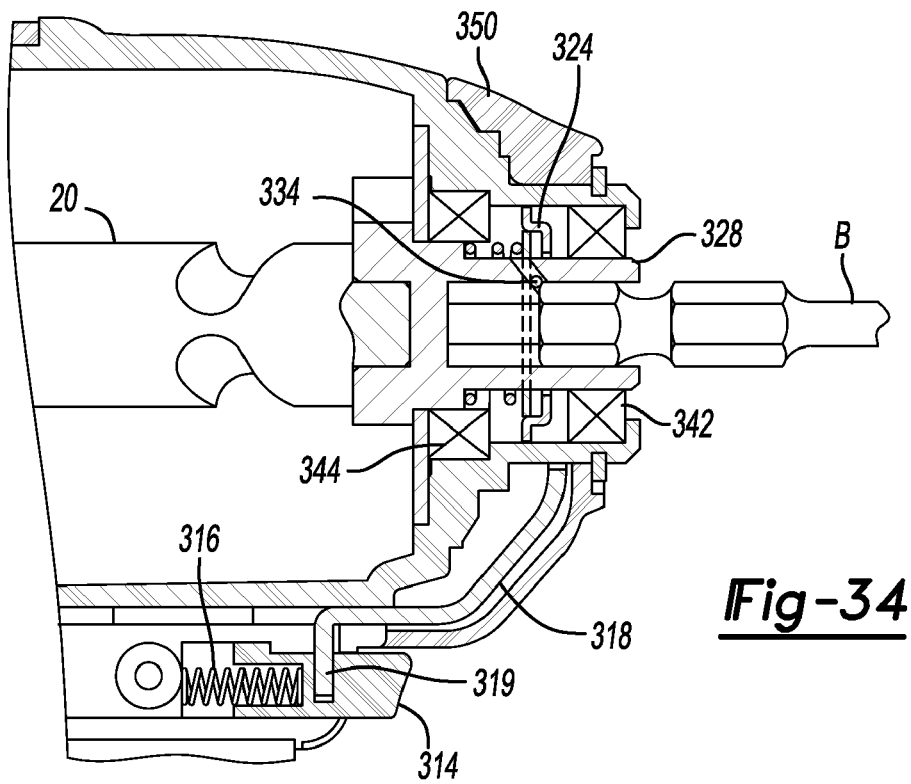
FIG. 34 is a detailed partial cross-sectional view of the power tool of FIG. 30 illustrating a bit being inserted therein.
Figure 35:
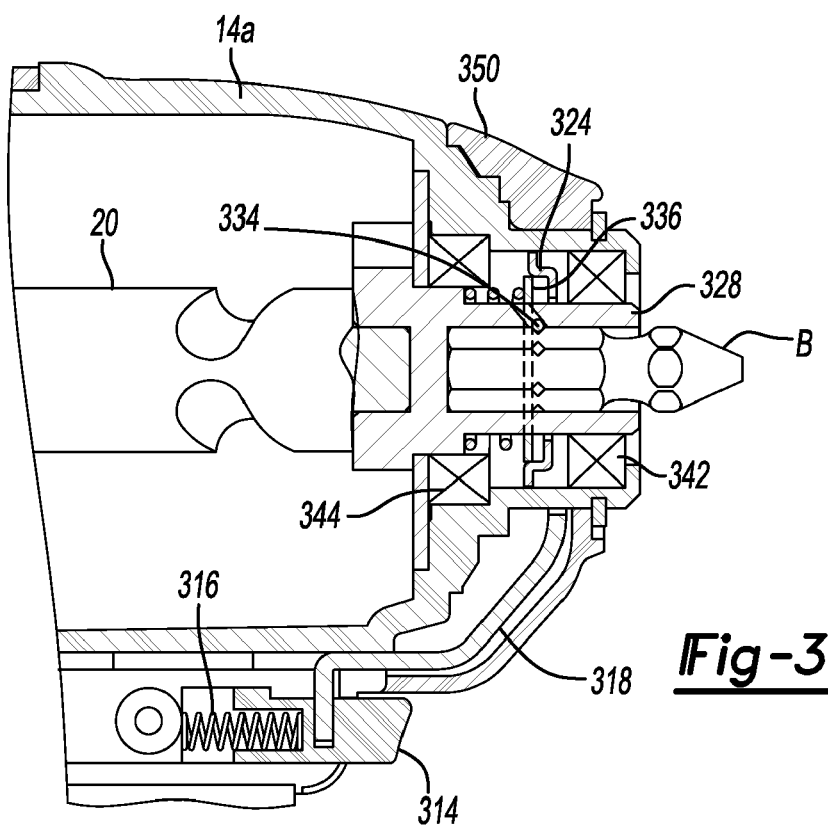
FIG. 35 is a detailed partial cross-sectional view of the power tool of FIG. 30 illustrating a 1" bit tip being inserted therein.
Figure 36:
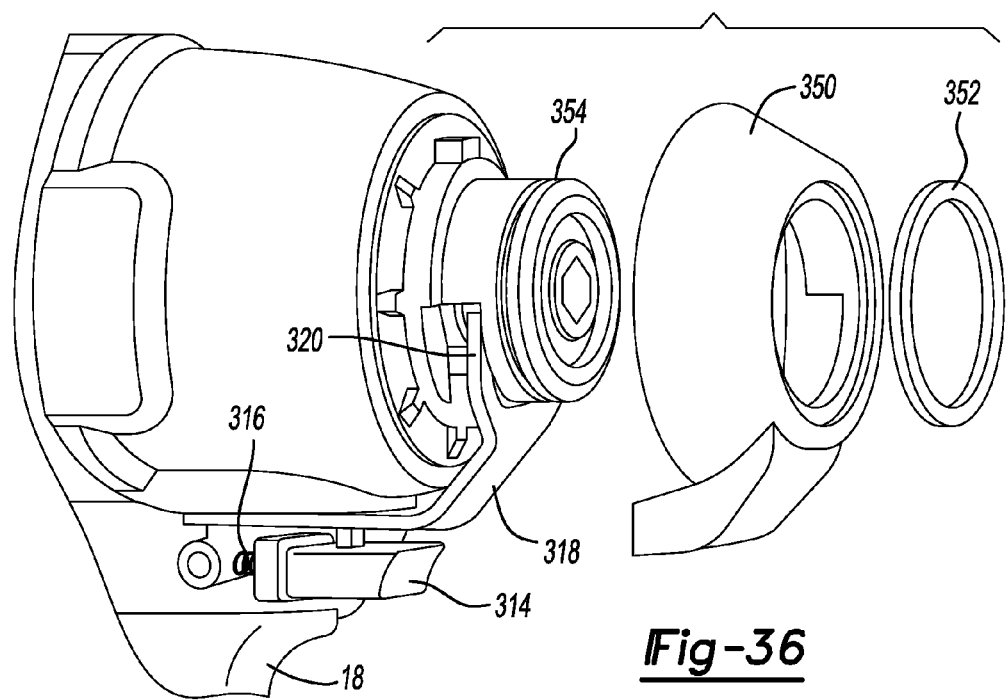
FIG. 36 is a partial cut-away and exploded perspective view of a bit retention mechanism according to the principles of the present disclosure.
Figure 37:
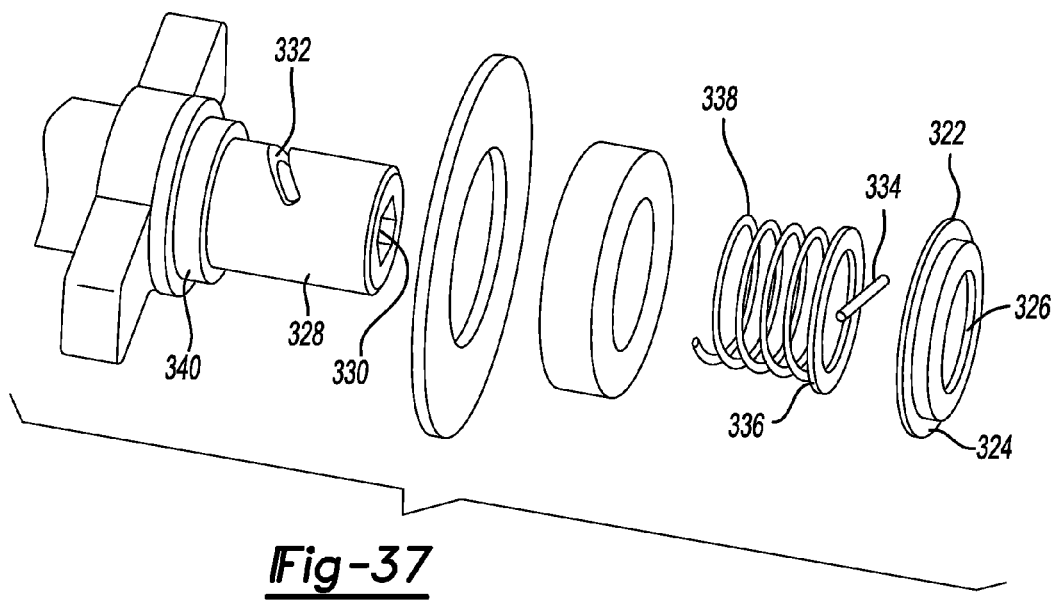
FIG. 37 is an exploded perspective view of the bit retention mechanism according to the present disclosure.
Figure 38:
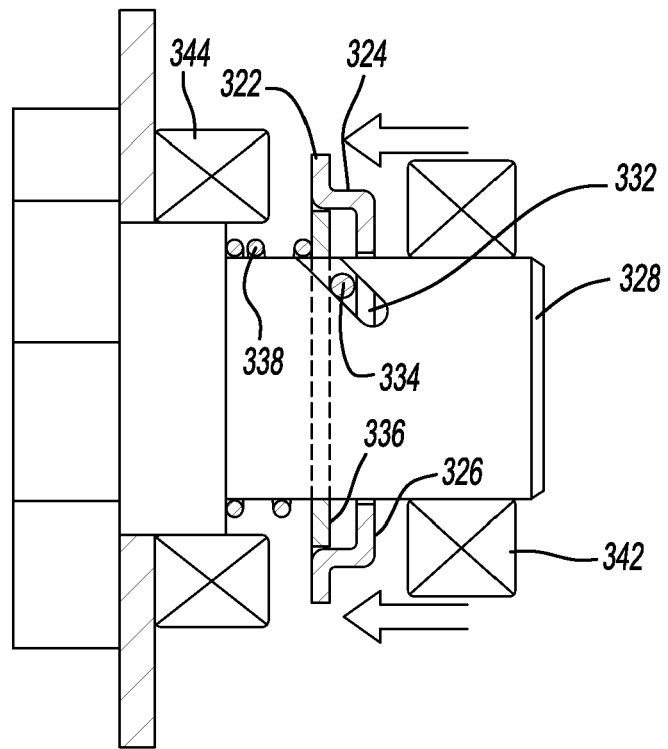
FIG. 38 is a side view of the bit retention mechanism shown in a disengaged position.
Figure 39:
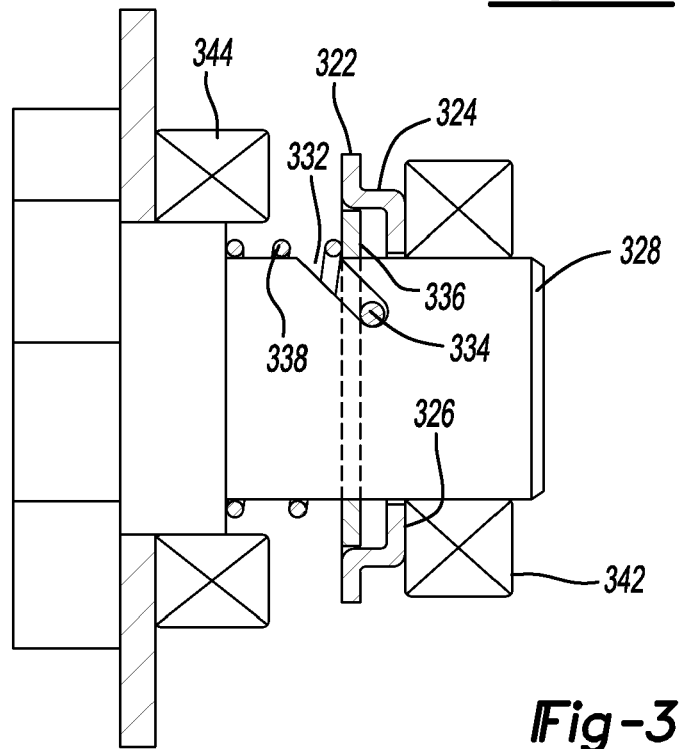
FIG. 39 is a side view of the bit retention mechanism shown in an engaged position.

With reference to FIGS. 30-41, a further embodiment of a power tool 310 having an integrated bit retention mechanism 312 will now be described. According to the embodiment as shown in FIG. 30, an actuator button 314 is disposed in a position forward of the trigger 18 and is pulled in a generally axial direction to release a bit B from the bit retention mechanism 312. With reference to FIG. 31, the actuator button 314 is disposed against a return spring 316 which biases the actuator button 314 in a forward direction. The actuator button 314 is connected to a shift fork 318 which is slidably received in a portion of the housing 14. The shift fork 318 includes an arm 319 connected to the actuator button 314. The shift fork 318 includes a pair of forward arms 320 which are received against a radially extending flange 322 of a cup member 324.

The cup member 324 has a central aperture 326 for being slidably received on a spindle 328. The spindle 328 includes a polygonal cavity 330 adapted for receiving a tool bit B therein. The spindle 328 also includes an angled slot 332 that communicates with the polygonal cavity 330. A clip 334 is received in the angled slot 332 of the spindle 328 and is movable along the angled slot 332 to engage and disengage a bit received within the polygonal cavity 330. The clip 334 is disposed against a hardened washer 336 which slidably surrounds the spindle 328. A compression spring 338 is disposed against the hardened washer 336 at a forward end and against a shoulder portion 340 of the spindle 328 at a rearward position. The shift fork 318 is operable in response to actuation of the actuator button 314 to slide the cup member 324 in a rearward direction, thereby pushing the clip member 334 rearward along the angled slot 332 so that the clip member 334 moves radially outward for disengaging the bit B received in the polygonal cavity 330.

Figure 40:
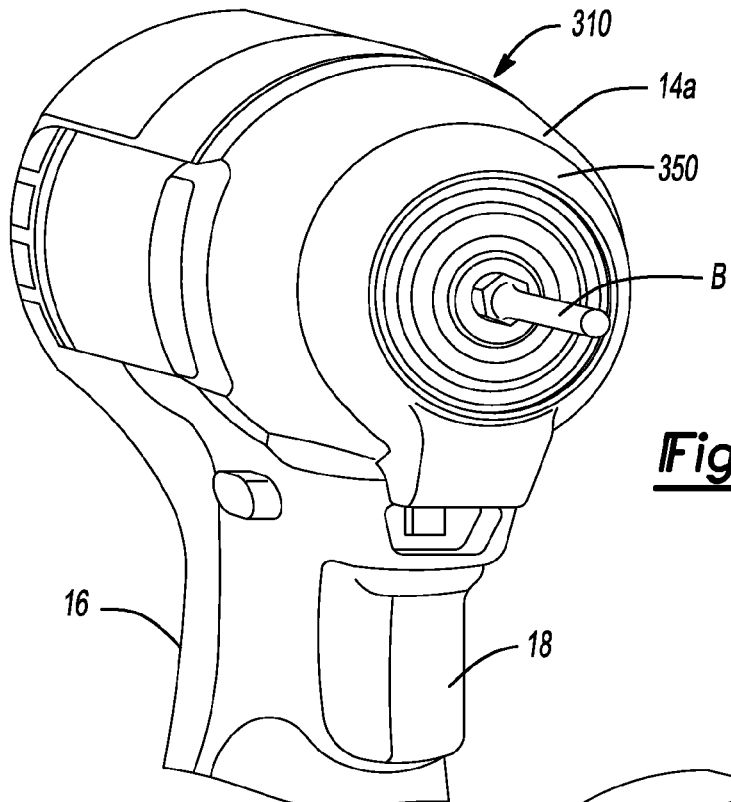
FIG. 40 is a front perspective view of the power tool shown in FIG. 30.
Figure 41:
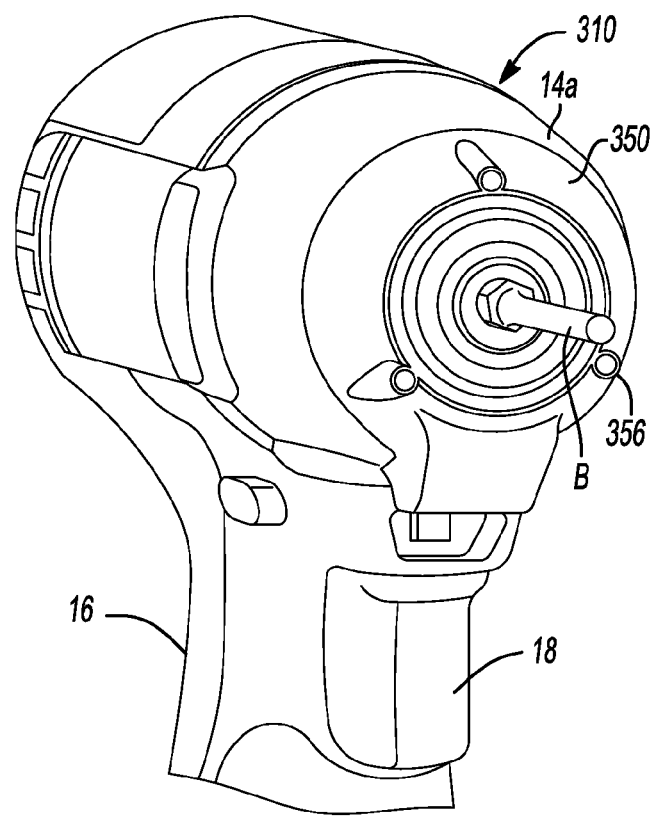
FIG. 41 is a front perspective view of an alternative power tool design having LED lights and sensors mounted in the nose cover.

When the actuator button 314 is released, the return spring 316 biases the actuator button 314 to its forward position along with the shift fork 318 thereby allowing the cup member 324 to move to its forward position. The compression spring 338 then biases the hardened washer 336 and clip member 334 to their forward position so that the clip member 334 is fully received within the angled slot 332 of the spindle 328. The spindle 328 is supported at a forward end by a forward bearing 342 and at a rearward end by a rearward bearing 344. A fixed nose cover 350 is supported over a forward end of the forward housing portion 14a and conceals the shift fork 318. A retaining ring 352 is engaged in a recessed groove 354 of the housing portion 14a and retains the nose cover 350 in place. As illustrated in FIG. 40, fixed nose cover 350 conceals the shift fork mechanism 318 and, as shown in FIG. 41, can house LED lights 356 and/or sensors therein.

The insertion of a bit B into the bit retention mechanism 312 is again by "drop-in-to-load" insertion wherein the bit B pushes the clip 334 rearward and radially outward along the angled slot 332 until the bit B can be fully inserted. The entire bit retention mechanism 312 can be disposed axially between the forward end of the forward bearing set 342 and the forward end of the rearward bearing set 344. The bit retention mechanism 312 can also be completely disposed within the housing 14 wherein the nose cover 350 defines a portion of the housing 14.

Figure 45:
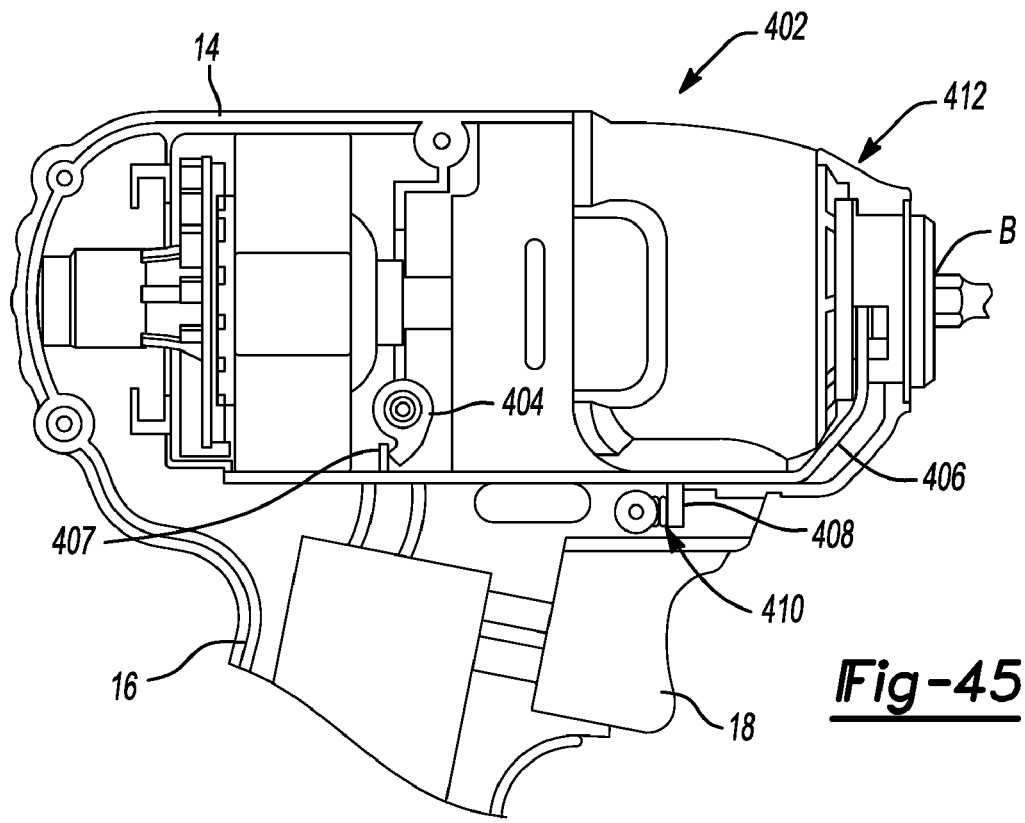
FIG. 45 is a partial cut-away side view similar to FIG. 42 with the bit retention mechanism in a disengaged position.
Figure 46:
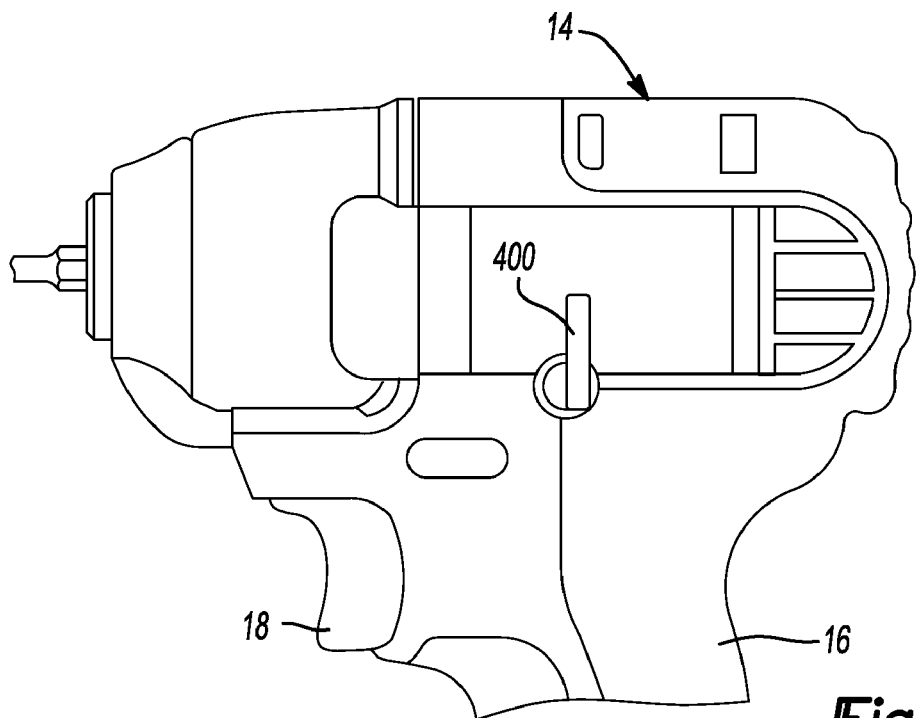
FIG. 46 is an opposite side view similar to FIG. 43 with the thumb lever in an actuated position.

As an alternative design as illustrated in FIGS. 42-46, an actuator lever 400 can be mounted to the side of the power tool 402 as illustrated in FIG. 43. The actuator lever 400 can be operated by a user's thumb while maintaining their hold of the grip portion 16 of the housing 14. The lever 400 as illustrated in FIG. 4 can be rotatably supported within the housing 14 and can include a cam member 404 that engages a tab member 407 of the shift fork 406 which is slidably received within the housing 14. The shift fork 406 can engage the bit retention mechanism in the same manner as described with reference to FIGS. 30-40 and, therefore, further description of this feature, will not be provided herein. The shift fork 406 can include a tab portion 408 that engages a return spring 410 for biasing the shift fork 406 in a forward direction. In order to release the bit engagement device, a user can use their thumb to push forward on the lever 400 as illustrated in FIG. 46 to cause the cam member 404 to rotate as illustrated in FIG. 45, thereby causing the shift fork 406 to move in a rearward direction, thus disengaging the bit engagement mechanism 412 to allow removal of a bit retained therein. Thus, with the embodiment as illustrated in FIGS. 42-46, axial movement of a shift lever provides disengagement of the integrated bit retention mechanism 412 disposed within the power tool 402.

Figure 47:
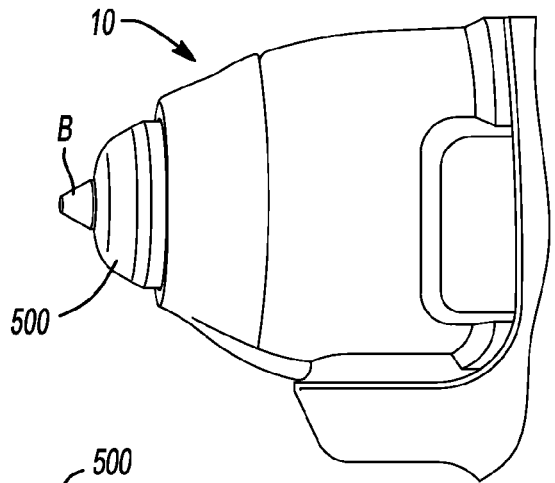
FIG. 47 is a side view of a power tool with an integrated bit retention device and having a magnetic nosepiece mounted thereon according to the principles of the present disclosure.
Figure 48:
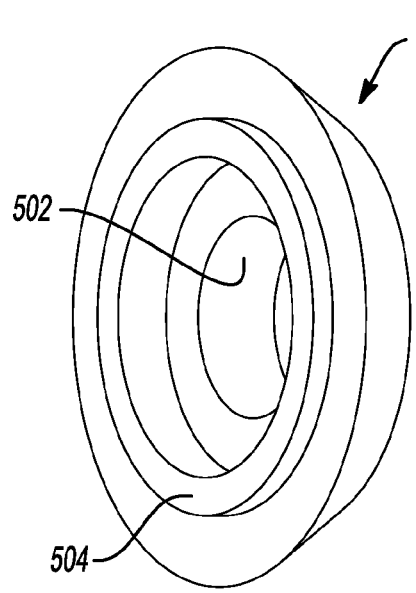
FIG. 48 is a rear perspective view of the magnetic nosepiece shown in FIG. 47.
Figure 49:
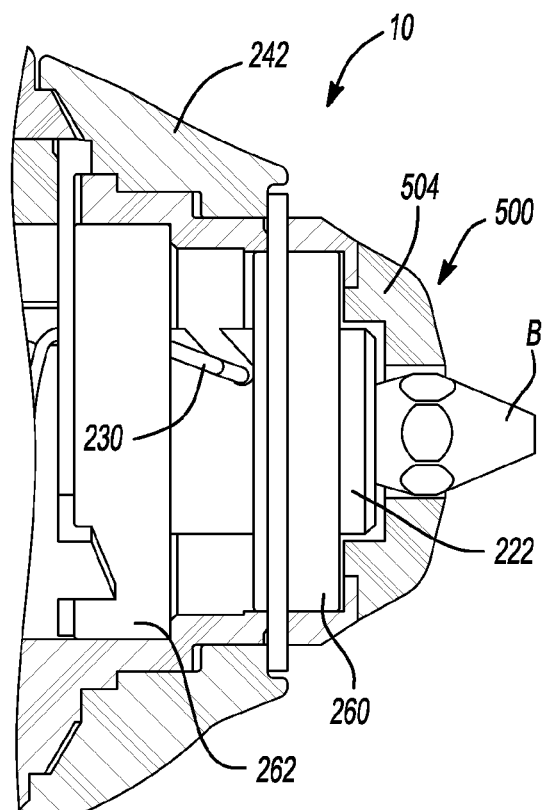
FIG. 49 is a cross-sectional view of the power tool with an integrated bit retention device and magnetic nosepiece shown in FIG. 47.

As shown in FIGS. 47-49, a nose magnet 500 can be mounted to the nose of the power tool 10 and can be held in place by being magnetically attracted to the steel front bearing 54. The nose magnet 500 can have an annular shape with a central aperture 502 and can have concentric ribs 504 that conform to the forward housing portion 14a or nose ring 46 and can be spaced from the spindle 22 to non-rotatably hold the nose magnet 500 concentric to the axis of the spindle 22. Because the nose magnet 500 is external to the bit retention device 12, it does not attract metal debris inside the bit retaining device 12 as would a magnet if it was internal to the bit retention device. The external location of the magnet also prevents ferrous metal debris from entering the device. The magnet 500 can be wiped off or blown clean to remove the accumulation of metal debris. Furthermore, the nose magnet 500 can be adhered to the nose ring 46 or housing portion 14a or can otherwise be connected thereto so that the nose magnet 500 does not become dislodged from the power tool 10.

Figure 50:
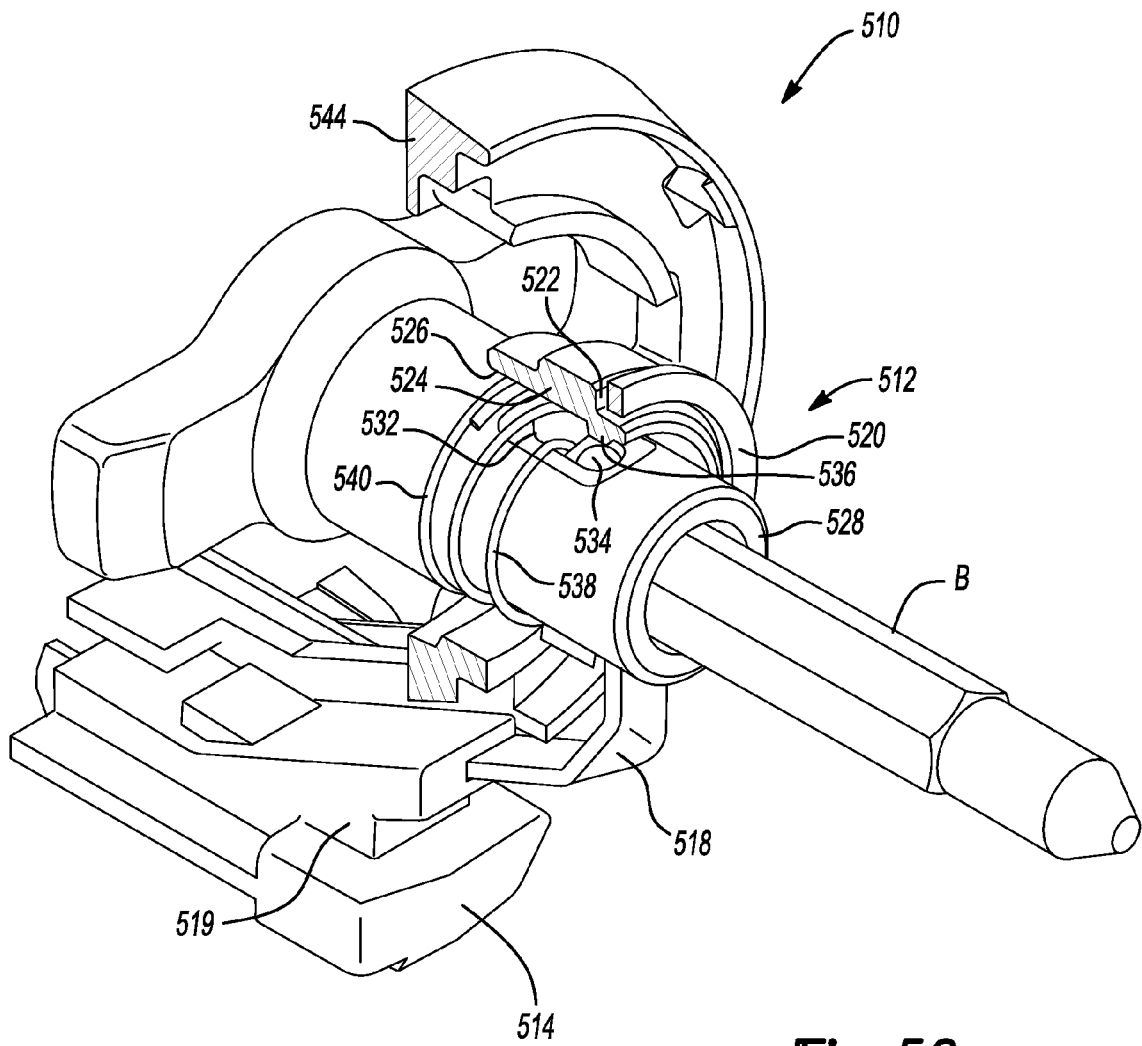
FIG. 50 is a perspective view of the bit retention mechanism employing a ball with the forward bearing removed for illustrative purposes.
Figure 51:
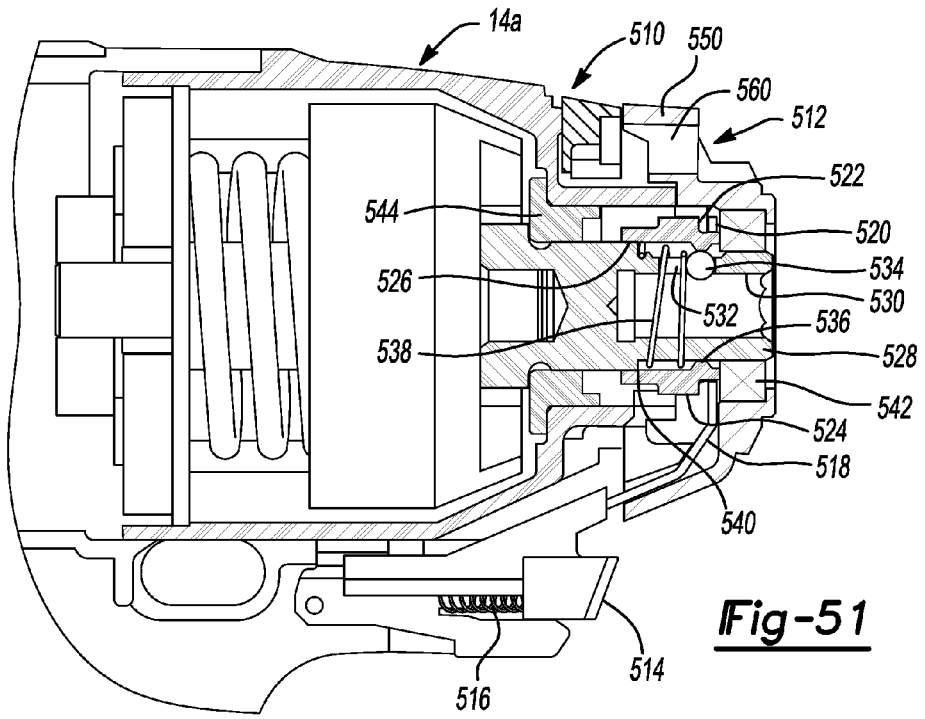
FIG. 51 is a detailed partial cross-sectional view of the power tool of FIG. 50 shown in a disengaged position.
Figure 52:
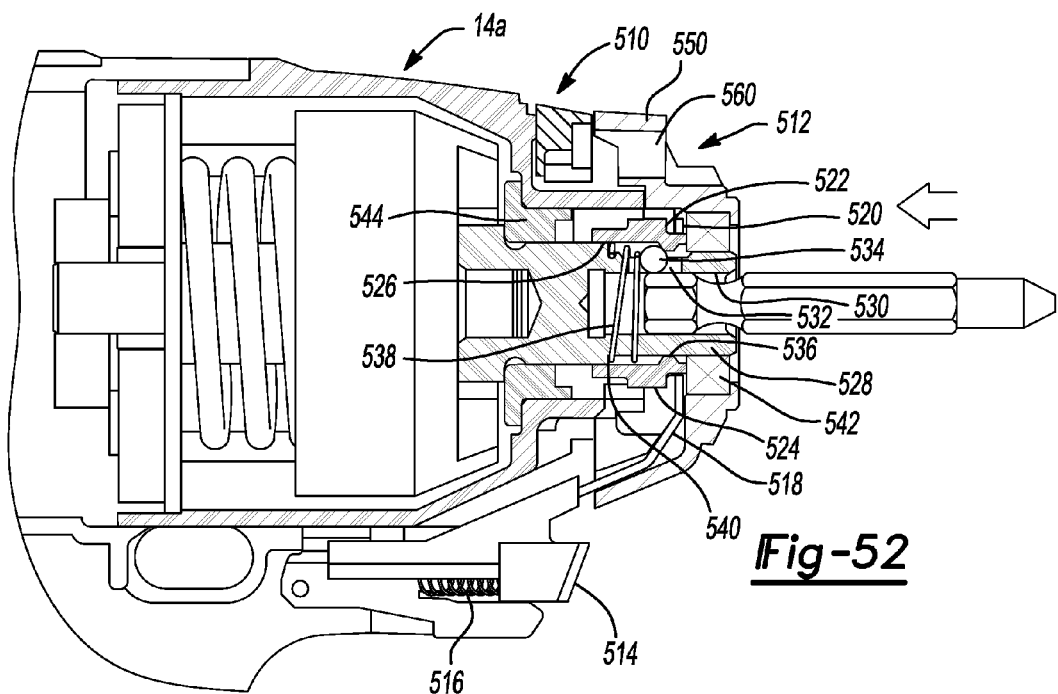
FIG. 52 is a detailed partial cross-sectional view of the power tool of FIG. 50 illustrating a bit being inserted therein.
Figure 53:
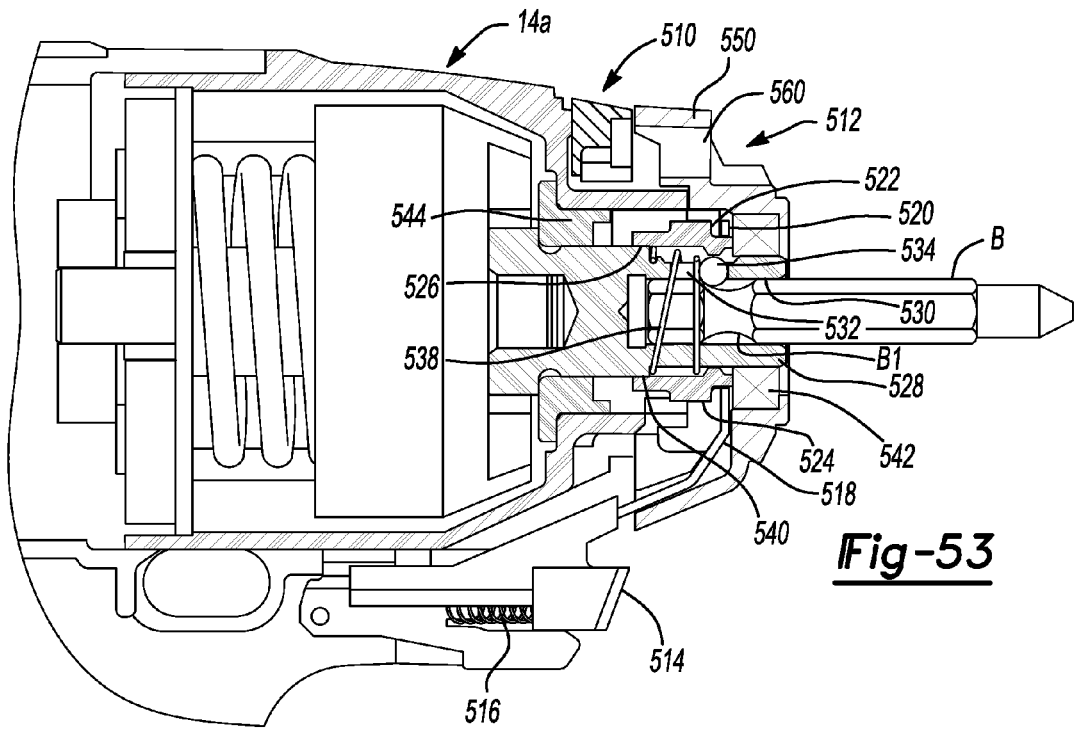
FIG. 53 is a detailed partial cross-sectional view of the power tool of FIG. 50 illustrating a bit fully inserted therein.
Figure 54:
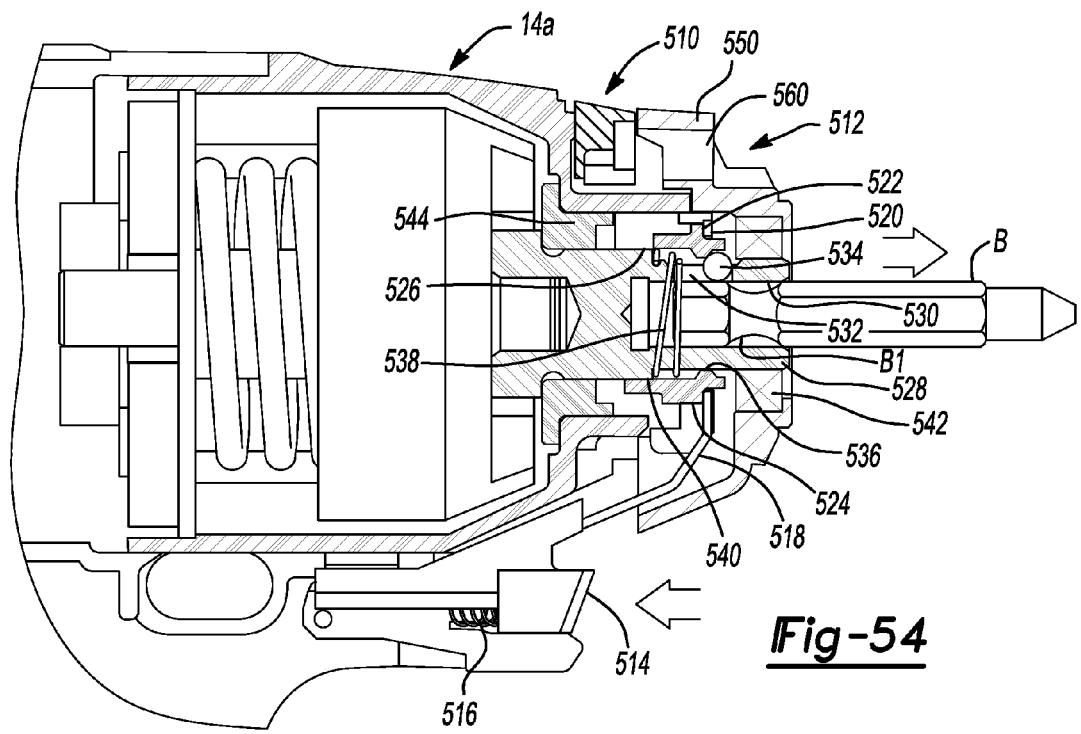
FIG. 54 is a detailed partial cross-sectional view of the power tool of FIG. 50 illustrating a bit being released therefrom.
Figure 55:
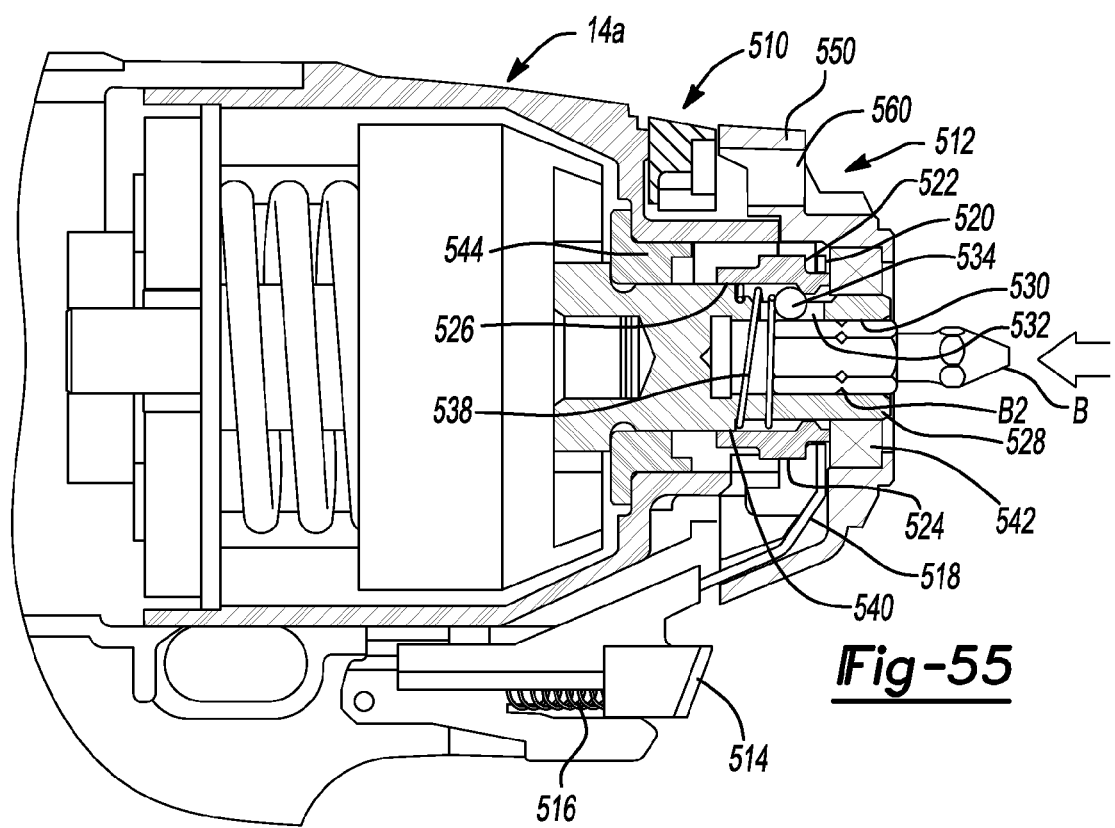
FIG. 55 is a detailed partial cross-sectional view of the power tool of FIG. 50 illustrating a 1" bit being inserted therein.
Figure 56:
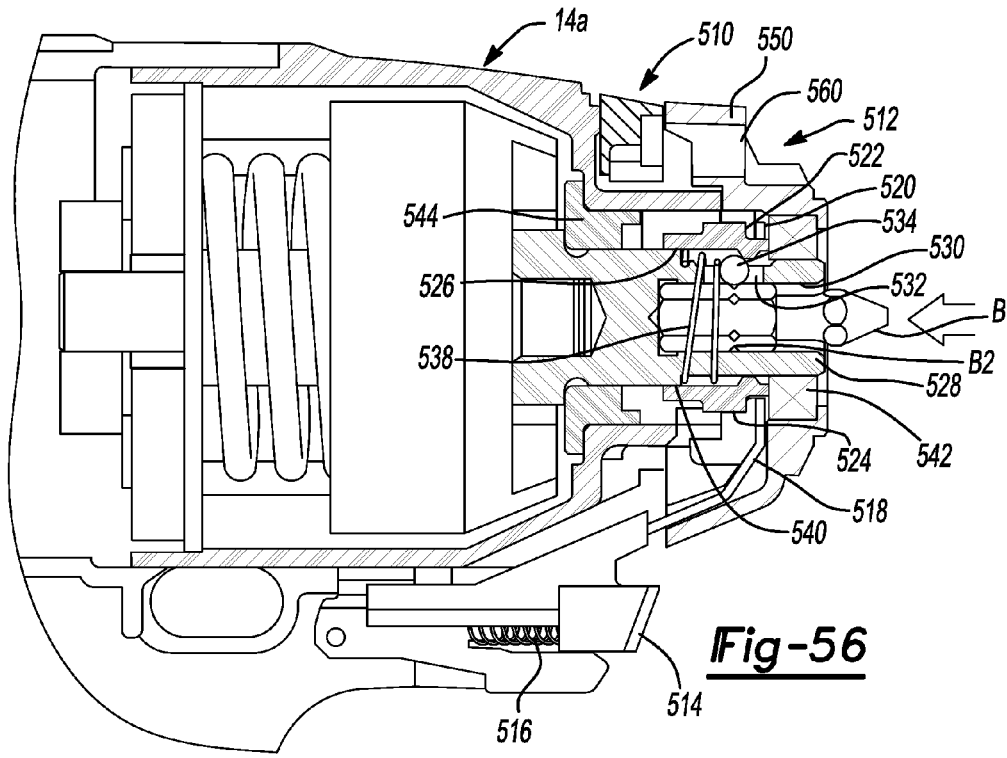
FIG. 56 is a detailed partial cross-sectional view of the power tool of FIG. 50 illustrating a 1" bit fully inserted therein.
Figure 57:
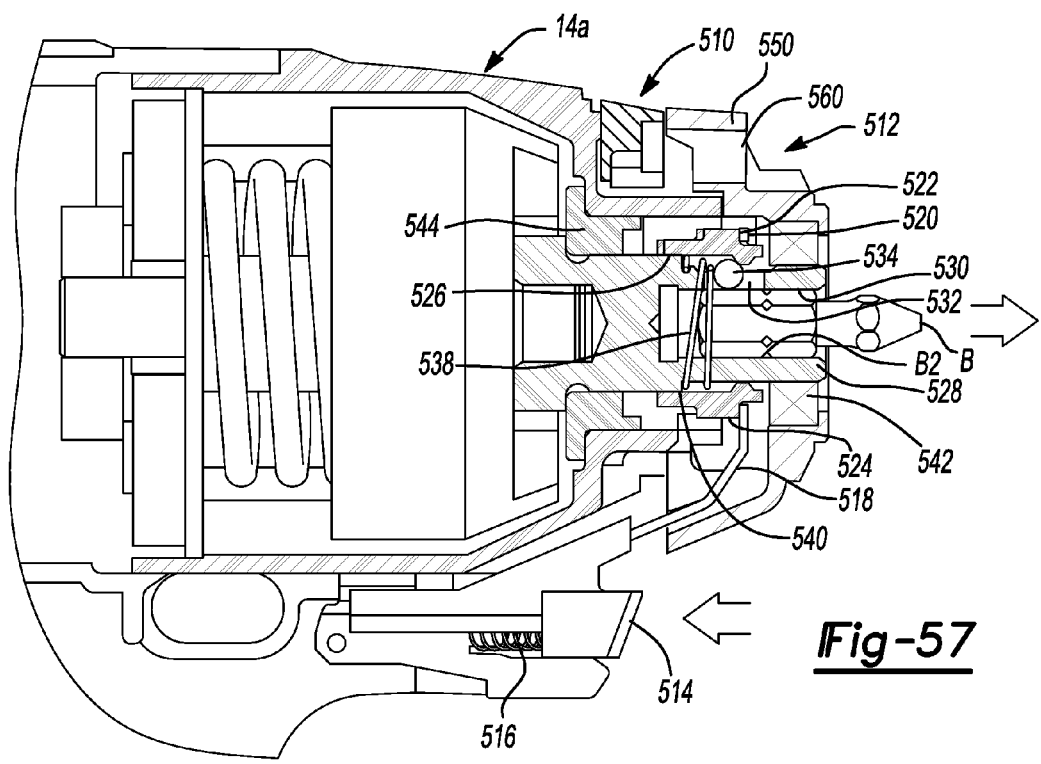
FIG. 57 is a detailed partial cross-sectional view of the power tool of FIG. 50 illustrating a 1" bit being released therefrom.

With reference to FIGS. 50-57, a further embodiment of a power tool 510 having an integrated bit retention mechanism 512 will now be described. According to the embodiment as shown in FIG. 50, an actuator button 514 is disposed in a position forward of the trigger 18 and is pulled in a generally axial direction to release a bit B from the bit retention mechanism 512. With reference to FIG. 51, the actuator button 514 is disposed against a return spring 516 which biases the actuator button 514 in a forward direction. The actuator button 514 is connected to a shift fork or member 518 which is slidably received in a portion of the housing 14. It should be appreciated that shift member 518 can comprise any mechanical interconnection system, including linkages, gearing, or other mechanical actuators. The shift member 518 includes an arm portion 519 connected to the actuator button 514. The shift member 518 includes a pair of forward arms or enclosed ring 520 which are/is received against a radially extending flange 522 of a sleeve member 524.

In some embodiments, as seen in FIGS. 60-64, actuation of actuator button 514 can be limited using a lock-out system 600. Specifically, lock-out system 600 can comprise a limit device 602, 602' mechanically limiting axial movement of actuator 514 to generally prevent or inhibit movement of actuator 514 into the rearward released position, thereby inhibiting release of the bit B. In some embodiments, this limit device 602, 602' can be disposed on a forward-reverse command button 606 (FIGS. 58-64) as will be discussed in detail herein. In this way, actuation of the bit retention assembly can be limited depending on the position of forward-reverse command button 606. However, it should be appreciated that lock-out system 600 can be incorporated with other structure of the device to selectively prevent actuation of the bit retention assembly based on other conditions, such as positioning of a separate locking switch or the like.

Figure 62:
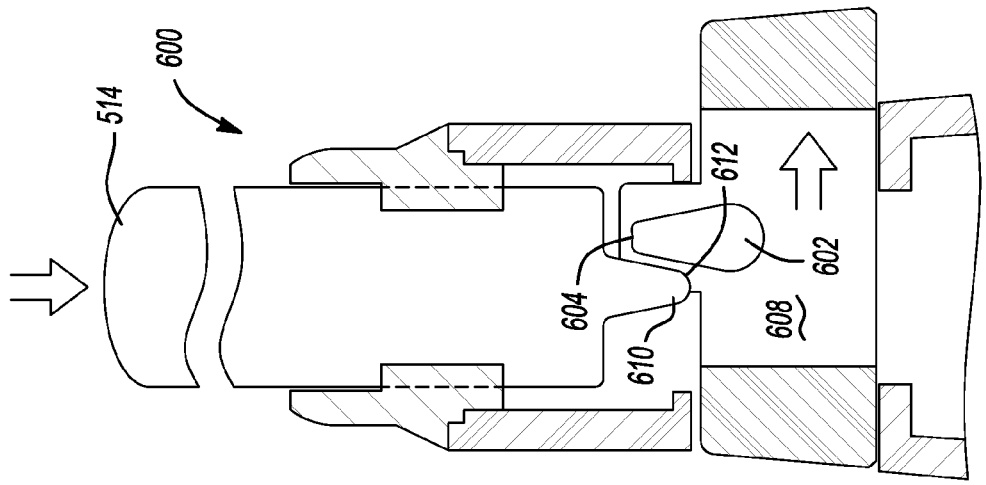
FIG. 62 is a detailed partial cross-sectional view of the neutral lock-out feature of FIG. 60 illustrating a release condition when the forward-reverse command button is in a reverse drive position.
Figure 61:
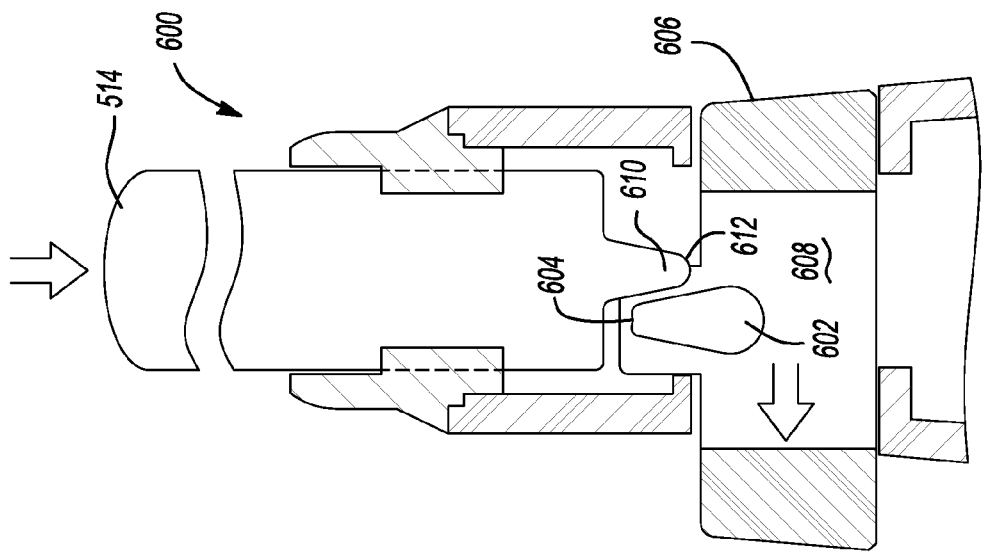
FIG. 61 is a detailed partial cross-sectional view of the neutral lock-out feature of FIG. 60 illustrating a release condition when the forward-reverse command button is in a forward drive position.
Figure 60:
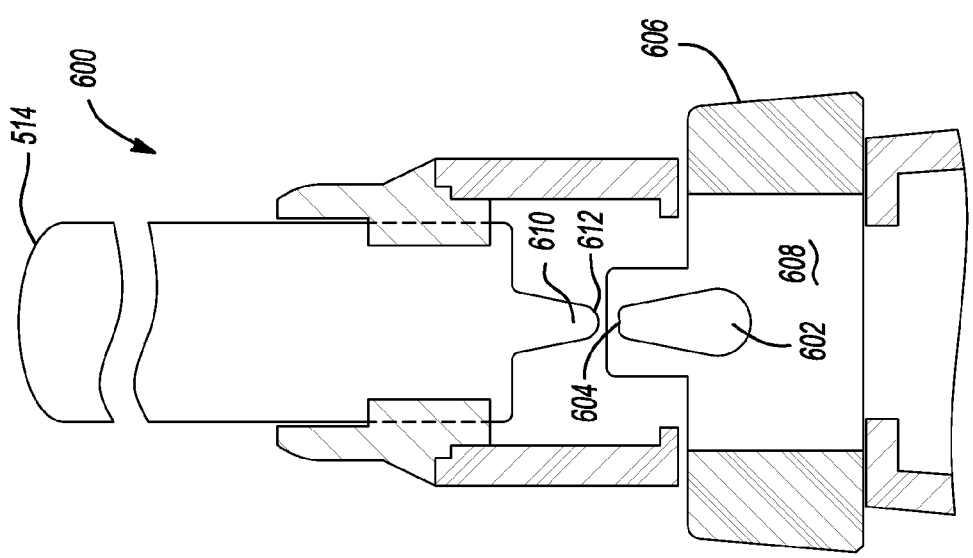
FIG. 60 is a detailed partial cross-sectional view of a neutral lock-out feature illustrating a lock-out condition when a forward-reverse command button is in a neutral position.

Generally, forward-reverse command button 606 can be provided for selecting a forward and a reverse drive direction of the motor (an exemplary motor is shown in FIG. 42) for driving bit B in a forward and reverse direction, respectively. Accordingly, an appropriate mechanical or electrical interconnect is provided (not shown) between forward-reverse command button 606 and the motor to effect such control. In some embodiments, forward-reverse command button 606 is positionable in a forward drive position (a first outboard transverse position relative to housing 14 as illustrated in FIGS. 61 and 63 (in phantom)), a reverse drive position (a second outboard transverse position relative to housing 14, opposite of the first outboard transverse position, as illustrated in FIGS. 62 and 63), and an intermediate neutral position (as illustrated in FIGS. 60 and 64). Therefore, lock-out system 600 can be incorporated with forward-reverse command button 606 to provide a lock-out function when forward-reverse command button 606 is in any one or a combination of the forward drive, reverse drive, or intermediate neutral positions.

In some embodiments, as illustrated in FIGS. 60-62, lock-out system 600 can provide a "neutral lock-out feature" such that movement of actuator 514 is generally prevented or inhibited when forward-reverse command button 606 is in the intermediate neutral position, thereby preventing disengagement of the integrated bit retention mechanism. In this embodiment, lock-out system 600 can comprise limit device 602 being in the form of an upstanding member having a stop surface 604 extending from forward-reverse command button 606. As illustrated in the figures, limit device 602 and associated stop surface 604 can extend above a top surface 608 of forward-reverse command button 606. However, it should be appreciated that limit device 602 could be merely a forward extension extending from forward-reverse command button 604 or define any other inhibiting structure. Actuator 514 can comprise a corresponding finger member 610 extending rearwardly. Finger member 610 and limit device 602 are each sized to permit free rearward axial movement of actuator 514 when forward-reverse command button 606 is in either the forward drive position or the reverse drive position (FIGS. 61 and 62)—in this position, finger member 610 is generally laterally offset relative to limit device 602 such that a distal tip 612 of finger member 610 passes along side stop surface 604 of limit device 602 permitting translation of actuator 514. Likewise, finger member 610 and limit device 602 are each sized to prevent or generally inhibit rearward axial movement of actuator 514 when forward-reverse command button 606 is in the intermediate neutral position (FIG. 60)—in this position, finger member 610 is generally aligned with limit device 602 such that distal tip 612 of finger member 610 engages stop surface 604 of limit device 602 preventing further translation of actuator 514.

In some embodiments, as illustrated in FIGS. 63 and 64, lock-out system 600 can provide a "forward and/or reverse lock-out feature" such that movement of actuator 514 is generally prevented or inhibited when forward-reverse command button 606 is in the forward drive and/or reverse drive position, thereby preventing disengagement of the integrated bit retention mechanism. In this embodiment, lock-out system 600 can comprise limit device 602' being in the form of a stop surface 604' centrally extending from forward-reverse command button 606. Actuator 514 can comprise a corresponding pair of finger members 610' extending rearwardly. Finger members 610' and limit device 602' are each sized to permit free rearward axial movement of actuator 514 when forward-reverse command button 606 is in the intermediate neutral position (see FIG. 64)—in this position, finger members 610' are generally laterally offset on either side of limit device 602' such that distal tips 612' of finger members 610' passes along the sides of limit device 602' permitting further translation of actuator 514. Likewise, finger members 610' and limit device 602' are each sized to prevent or generally inhibit rearward axial movement of actuator 514 when forward-reverse command button 606 is in the forward drive position or the reverse drive position (see FIG. 63)—in either of these positions, at least one of the finger members 610' is generally aligned with limit device 602' such that distal tip 612' of the corresponding finger member 610' contacts stop surface 604' of limit device 602' preventing further translation of actuator 514.

The sleeve member 524 has a central aperture 526 for being slidably received on a spindle 528. The spindle 528 includes a polygonal cavity 530 adapted for receiving a tool bit B therein. The spindle 528 also includes a ball slot 532 that communicates with the polygonal cavity 530. A ball 534 is received in the ball slot 532 of the spindle 528 and is movable along the ball slot 532 to engage and disengage a bit received within the polygonal cavity 530. The ball 534 engages and remains engaged against a stop member 536 extending from an inner surface of the central aperture 526 of sleeve member 524. In this way, stop member 536 can cooperate, as will be described, with other members to engage ball 534 with a retaining feature formed on bit B. However, during insertion and commanded release, ball 534 is permitted to move to a position adjacent stop member 536 to permit disengagement of ball 534 from the retaining feature formed on bit B.

A compression spring 538 is disposed against the ball 534 at a forward end of the spring and against a shoulder portion 540 of the spindle 528 at a rearward position, such that ball 534 is generally aligned with and engaging stop member 536. The shift member 518 is operable in response to actuation of the actuator button 514 to slide the sleeve member 524 in a rearward direction. In the case of a longer bit B having a ball groove B1, the rearward or aft translation of sleeve member 524 and stop member 536 permits ball 534 to move radially outward to a position forward of stop member 536 (see FIG. 54) for disengaging the bit B received in the polygonal cavity 530. However, in the case of a shorter bit B having a ball chamfer B2 that does not permit ball 534 to ride between stop member 536 and ball chamfer B2 (see FIG. 57), the rearward or aft translation of sleeve member 524 and stop member 536 causes ball 534 to be moved aft to a disengaged position with ball chamfer B2 for disengaging the bit B received in the polygonal cavity 530.

When the actuator button 514 is released, the return spring 516 biases the actuator button 514 to its forward position along with the shift member 518 thereby allowing the sleeve member 524 to move to its forward position. The stop member 536, having ramping surfaces 537, is then translated into a position radially adjacent ball 534, thereby urging ball 534 radially inward to polygonal cavity 530 (and into engagement with bit B, if present). Additionally, to some extent, compression spring 538 biases ball 534 forward against ramping surface 537 of stop member 536 causing ball 534 to translate along the ramping surface in a radially inward direction.

The insertion of a bit B into the bit retention mechanism 512 is again by "drop-in-to-load" insertion wherein the bit B pushes the ball 534 rearward against the biasing force of compression spring 538 to at least a position aft of stop member 536 (see FIGS. 52 and 55), thereby permitting ball 534 to move radially outward along the ball slot 532 until the bit B can be fully inserted. Once bit B is inserted a sufficient distance, ball 534, under the forward biasing force of compression spring 538, is caused to engage ball groove B1 or ball chamfer B2 of bit B (see FIGS. 53 and 56, respectively).

With reference to FIGS. 51-59, the spindle 528 is supported at a forward end by a forward bearing 542 and at a rearward end by a rearward bearing 544. The entire bit retention mechanism 512 can be disposed axially between the forward end of the forward bearing set 542 and the forward end of the rearward bearing set 544. The bit retention mechanism 512 can also be completely disposed within the housing 14 wherein the nose cover 550 defines a portion of the housing 14.

Figure 58:
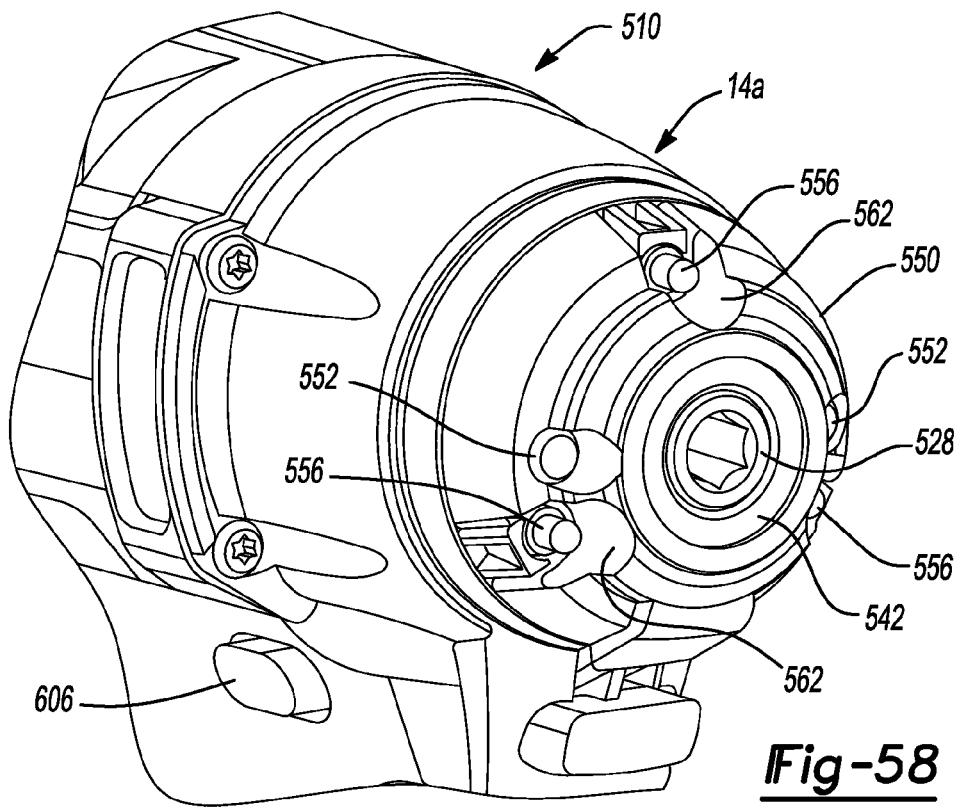
FIG. 58 is a front perspective view of an alternative power tool design having LED lights mounted in the nose cover.
Figure 59:
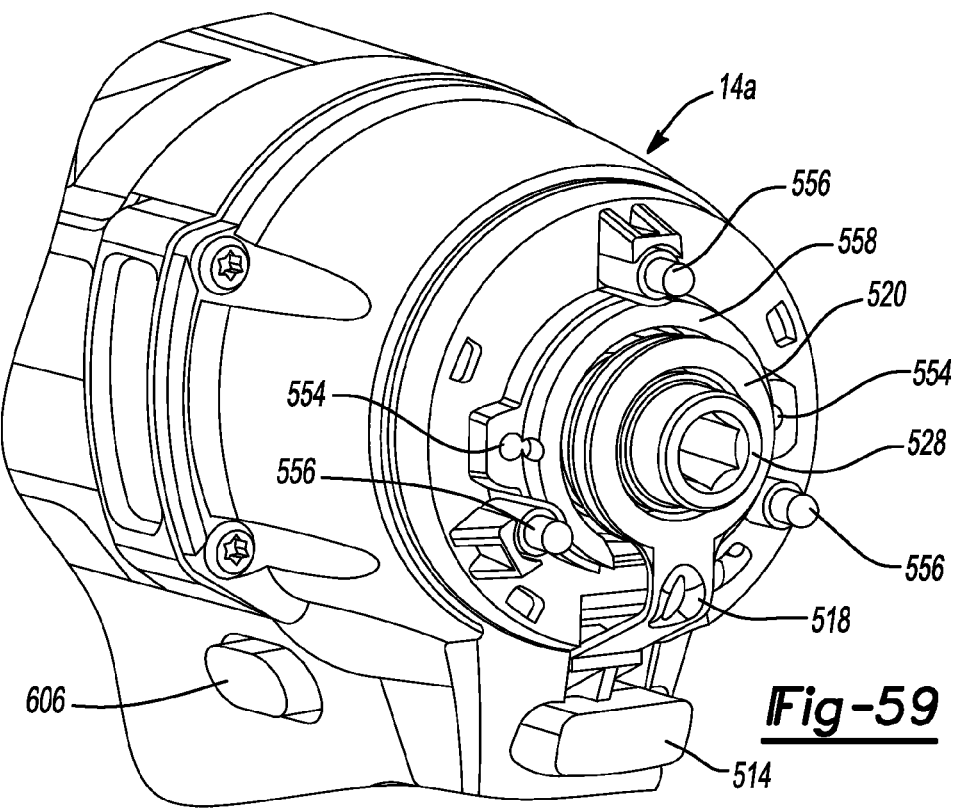
FIG. 59 is a front perspective view of the alternative power tool design of FIG. 58 having the nose cover removed for clarity.

A fixed nose cover 550 is supported over a forward end of the forward housing portion 14a and conceals the shift member 518. Fixed nose cover 550 can be fastened to forward housing 14a via a plurality of fasteners 552 (See FIG. 58). Fasteners 552 can be threadedly received within corresponding apertures 554 (see FIG. 59) formed in forward housing 14a. As illustrated in FIG. 58, fixed nose cover 550 conceals the shift fork mechanism 518 and, as shown in FIGS. 58 and 59, can house LED lights 556 and/or sensors therein. LED lights 556 can be supported by an LED ring 558, which is separately formed from or integrally formed with forward housing 14a. LED lights 556 can be electrically coupled to the power source of power tool 510. LED ring 558 can be captured between forward housing 14a and fixed nose cover 550 and retained in position according to any one of a number of conventional fastening systems, such as fasteners 552, additional fasteners, snap fit, friction fit, or the like. In this way, LED lights 556 can extend through apertures 560 formed in fixed nose cover 550 (see FIGS. 51-57) or through slots 562 formed in fixed nose cover 550 (see FIGS. 58 and 59) to provide uniform and direct lighting of a subject area, while maintaining positive and reliable positioning irrespective of tool vibration and use.

Moreover, according to the present arrangement, the simple removal of fixed nose cover 550 permits convenient access to LED lights 556 and LED ring 558 for service or maintenance, if necessary.

It should be noted that in each of the embodiments shown, a different bit engaging member is utilized in combination with different actuator devices for moving the bit engaging member into and out of engagement with the bit. It should be understood that the various types of actuator mechanisms can be interchangeable with the different types of bit engagement member and vice versa. Furthermore, other types of springs or biasing members can be utilized other than the return springs, compression springs and torsion springs shown herein. Furthermore, any of the cam surfaces shown herein can be replaced with cam surfaces having different configurations or with shifting wires and helical grooves as disclosed. The polygonal cavity of the spindle of each of the embodiments can be provided with a spring loaded plunger to assist with release of the bit from the cavity as is generally known in the art. An exemplary plunger device is shown in commonly assigned U.S. Pat. No. 6,929,266, which is herein incorporated by reference in its entirety. Further, the cavity within the spindle can be round or can have another shape. Furthermore, the designs are shown primarily with roller or needle bearing assemblies, however, other types of bearings could also be utilized. The system of the present disclosure also provides clips and pins for engaging the bit within the cavity, although other mechanisms such as spring loaded balls can also be utilized. Each design is shown as being implemented with a hex-shaped bit having an annular groove, known as a power bit. However, each design can also be implemented with a bit tip or with a round or other shaped bit cross-section. Each of the designs is also shown on an impact driver with the output shaft being coupled to an anvil that is struck by a rotating mass as is known in the art. However, each design could also be implemented on any type of power tool that holds bits, such as a drill or a powered screwdriver or a manual hand held screw driver.

A power tool with an integrated bit retention mechanism according to the principles of the present disclosure allows for the integration of the bit holder into the housing and allows the tool to have an overall shorter length as compared to conventional drills or power screwdrivers that incorporate an auxiliary quick-release chuck design. The integrated designs of the present disclosure enable a bit to be loaded in the tool ("drop-in-to-load") without requiring actuation of the bit retention mechanism to allow the bit to be inserted. Furthermore, one handed release of the tool bit without the user needing to change his or her grip on the tool also provides for more ergonomic functioning of the bit retention mechanism. Other benefits include greater ease of use, quicker bit changes and higher productivity.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A power tool, comprising:
   a housing;
   an electric motor disposed in the housing;
   a spindle drivingly attached to the electric motor, the spindle having a cavity adapted for receiving a bit therein and a window extending through the spindle in communication with the cavity;
   a retention device including a bit engaging member disposed within the housing and operable to extend through the window and retain a bit within the cavity;
   an actuator operable by a user externally of the housing to disengage the bit engaging member from retaining a bit received in the cavity; and
   a mechanical interconnection system operably coupled between the actuator and the retention device to actuate the retention device in response to the actuator, the mechanical interconnection being disposed within the housing;
   wherein when a bit is inserted into the cavity, the bit causes the retention device to move rearwardly relative to an axis of rotation of the spindle and the actuator need not be actuated in order to fully load the bit into the cavity and be retained by the bit engaging member.

2. The power tool according to claim 1, wherein the actuator includes a nose piece rotatably mounted to the housing, wherein rotation of the nose piece causes disengagement of the bit engaging member from a bit received in the cavity.

3. The power tool according to claim 1, wherein the housing includes a hand grip portion, the hand grip portion including a trigger on a forward portion thereof for activating the electric motor, the actuator including a tab disposed adjacent to the trigger and engageable by a user's finger to mechanically disengage the bit engaging member from a bit received in the cavity.

4. The power tool according to claim 3, wherein the tab is movable in a rotatable direction relative to the housing.

5. The power tool according to claim 3, wherein the tab is movable in an axial direction relative to an axis of the spindle.

6. The power tool according to claim 1, wherein the housing includes a hand grip portion, the hand grip portion including a trigger on a forward portion thereof for activating the electric motor, the actuator including a first tab disposed on a first side of the housing and a second tab disposed on a second side of the housing, the first and second tabs each being engageable by a user's finger to disengage the bit engaging member from a bit received in the cavity.

7. The power tool according to claim 1, further comprising:
   a hand grip and a switch coupled to the housing so that the hand grip can be gripped by the user's hand and the switch can be actuated by a user's thumb or finger to activate the electric motor, the actuator being positioned on the housing so that the actuator can be actuated by a user's finger or thumb on the same hand without changing a position of the user's hand on the hand grip.

8. The power tool according to claim 1, wherein the bit engaging member includes a clip and the window is an angled slot in the spindle that receives the clip.

9. The power tool according to claim 1, wherein the actuator includes an annular ring surrounding the spindle and including a first and a second slot, a shift ring surrounding the annular ring and including a shift wire supported thereon and engaging the first and second slots in the annular ring, the annular ring engaging the bit engaging member and being movable to a disengaged position to allow the bit engaging member to disengage a bit received in the cavity.

10. The power tool according to claim 9, wherein the shift ring includes a cam surface thereon for causing axial movement of the shift ring in response to activation of the actuator.

11. The power tool according to claim 10, wherein the actuator includes a nose piece rotatably mounted to the housing, the nose piece engaging the cam surface of the shift ring wherein rotation of the nose piece causes axial movement of the shift ring.

12. The power tool according to claim 1, wherein the bit engaging member is a ball disposed at least partially within the window and operable to extend through the window and retain the bit within the cavity.

13. The power tool according to claim 12, wherein the mechanical interconnection system comprises a moveable sleeve having a stop member, the stop member being engageable with the ball to retain the ball in an engaged position relative to the bit.

14. The power tool according to claim 13, wherein the stop member has at least one ramping surface urging the ball toward a radially inward direction.

15. The power tool according to claim 1, further comprising:
   a nose cover releasably coupled to the housing; and
   an LED light assembly mounted between the nose cover and the housing.

16. The power tool according to claim 1 further comprising a front bearing adjacent a front end of the housing, the front bearing supporting the spindle, the retention device being located rearward of the front bearing.

17. The power tool according to claim 1 further comprising a lock-out system selectively inhibiting the operation of the actuator to generally prevent disengagement of the bit from the bit engaging member.

18. The power tool according to claim 1, wherein the window in said spindle comprises an elongated slot that enables the retention device to move in a direction that is at least partially axially rearward when the bit is inserted into the cavity.

19. The power tool according to claim 1, further comprising an elastic member for biasing the actuator at least partially axially forward.

20. A power tool comprising:
a housing having a front end;
a rotary drive mechanism disposed within the housing;
a spindle disposed within the housing adjacent the front end and configured to be driven about a spindle axis by the rotary drive mechanism, the spindle including a cavity adapted to receive a bit therein;
a front bearing adjacent the front end for supporting the spindle;
a bit retention assembly including a bit engaging member configured to extend through an opening in the spindle to retain a bit in the cavity, wherein the bit retention assembly is located rearward of the front bearing; and
an actuator system coupled to the housing and operable by the user to disengage the bit engaging member from retaining a bit received in the cavity.

21. The power tool according to claim 20, wherein the bit engaging member is a ball.

22. The power tool according to claim 21, wherein the actuator system comprises a moveable sleeve having a stop member, the stop member being engagable with the ball to retain the ball in an engaged position relative to the bit.

23. The power tool according to claim 22, wherein the stop member has at least one ramping surface urging the ball toward a radially inward direction.

24. The power tool according to claim 20, further comprising:
a nose cover coupled to the housing; and
an LED light assembly mounted between the nose cover and the housing.

25. A power tool comprising:
a housing having a front end;
a rotary drive mechanism disposed within the housing;
a spindle disposed within the housing adjacent the front end and configured to be driven about a spindle axis by the rotary drive mechanism, the spindle including a cavity adapted to receive a bit therein and an opening extending through the spindle in communication with the cavity;
a front bearing adjacent the front end for supporting the spindle,
a bit retention assembly including a ball disposed at least partially within the opening and configured to extend through the opening to retain a bit in the cavity, the bit retention assembly permitting drop-in type loading, the bit retention assembly being located rearward of the front bearing;
an actuator extending from the housing and movable in a direction generally parallel to the spindle axis, the actuator being operable by the user to disengage the bit engaging member from a bit received in the cavity; and
a mechanical interconnection system operably coupled between the actuator and the bit retention assembly to actuate the bit retention assembly in response to the actuator, the mechanical interconnection being disposed within the housing and having a moveable sleeve and a stop member extending from the moveable sleeve, the stop member engagable with the ball to selectively retain the ball in an engaged position to retain the bit in the cavity,
wherein when the bit is inserted into the cavity, the bit causes the ball to move rearwardly relative to an axis of the spindle and the actuator need not be actuated in order to fully load a bit into the cavity and be retained by the ball.

* * * * *